US008802774B2

(12) United States Patent
Carnahan et al.

(10) Patent No.: US 8,802,774 B2
(45) Date of Patent: *Aug. 12, 2014

(54) BLOCK COMPOSITES AND IMPACT MODIFIED COMPOSITIONS

(75) Inventors: Edmund M. Carnahan, Pearland, TX (US); Colin LiPiShan, Pearland, TX (US); Kim L. Walton, Lake Jackson, TX (US); Gary R. Marchand, Gonzales, LA (US); Benjamin C. Poon, Lincolnshire, IL (US); Phillip D. Hustad, Manvel, TX (US); Brian A. Jazdzewski, Pearland, TX (US); Didem Oner-Deliormanli, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/499,857

(22) PCT Filed: Oct. 1, 2010

(86) PCT No.: PCT/US2010/051154
§ 371 (c)(1),
(2), (4) Date: Apr. 26, 2012

(87) PCT Pub. No.: WO2011/041696
PCT Pub. Date: Apr. 7, 2011

(65) Prior Publication Data
US 2012/0208961 A1    Aug. 16, 2012

Related U.S. Application Data

(60) Provisional application No. 61/248,170, filed on Oct. 2, 2009.

(51) Int. Cl.
*C08L 23/10* (2006.01)
*C08L 23/12* (2006.01)
*C08L 23/16* (2006.01)
*C08L 53/00* (2006.01)
*C08L 53/02* (2006.01)

(52) U.S. Cl.
USPC .................... 525/88; 525/95; 525/98

(58) Field of Classification Search
USPC ................................ 525/88, 95, 98
See application file for complete search history.

(56) References Cited

U.S. PATENT DOCUMENTS

| | | | | |
|---|---|---|---|---|
| 3,689,595 | A * | 9/1972 | Gwinn | 525/89 |
| 8,476,366 | B2 * | 7/2013 | Walton et al. | 525/95 |
| 2003/0166778 | A1 * | 9/2003 | Cassagnau et al. | 525/165 |
| 2003/0190458 | A1 * | 10/2003 | Spiewak et al. | 428/156 |
| 2005/0127558 | A1 | 6/2005 | Subramaniam et al. | |
| 2006/0199906 | A1 * | 9/2006 | Walton et al. | 525/191 |
| 2007/0010616 | A1 | 1/2007 | Kapur et al. | |
| 2007/0123668 | A1 | 5/2007 | Coates et al. | |
| 2008/0269412 | A1 | 10/2008 | Carnahan et al. | |

FOREIGN PATENT DOCUMENTS

| | | | |
|---|---|---|---|
| WO | 2006/091220 A1 | 8/2006 | |
| WO | 2007/035485 A1 | 3/2007 | |
| WO | 2007/117789 A1 | 10/2007 | |
| WO | 2009/027516 A1 | 3/2009 | |
| WO | 2009/042602 A1 | 4/2009 | |

OTHER PUBLICATIONS

Dharmarajan et al; Modifying polypropylene with a metallocene plastomer. Plastics Engineering (Brookfield, Connecticut); 1996; p. 33-35; 52(8); Exxon Chemical Company, Baytown, TX, USA.
Jeffries; Specialty Polyolefins Conference; SPO91; Sep. 24, 1991; p. 43-55.
Meiske et al; Engage polyolefin elastomers for impact modification of polypropylene. Annual Technical Conference—Society of Plastics Engineers; 1996; p. 2001-2005; 54th; vol. 2; Dow Chemical Co., Freeport, TX, USA.
Paul; Impact modification of polypropylene copolymer with a polyolefinic elastomer. Journal of Applied Polymer Science; 2000; p. 1480-1484; vol. 76; No. 9.
Rabinovitch et al; Impact modification of polypropylene. Journal of Vinyl & Additive Technology; 2003; p. 90-95; vol. 9; No. 2.
Ruokolainen et al; Morphology and Thermodynamic Behavior of Syndiotactic Polypropylene-Poly(ethylene-co-propylene) Block Polymers Prepared by Living Olefin Polymerization; Macromolecules; 2005; p. 851-860; vol. 38.
Varma-Nair et al; Structure-property relationships in metallocene based ethylene-octene plastomers. Annual Technical Conference—Society of Plastics Engineers; 2004; p. 2178-2185; 62nd; vol. 2.
Westphal; Impact modification of polypropylene. Annual Technical Conference—Society of Plastics Engineers; 2004; p. 3100-3106; 62nd; vol. 3.
U.S. Appl. No. 12/896,553.
U.S. Appl. No. 13/499,859.
U.S. Appl. No. 12/896,585.
U.S. Appl. No. 13/499,862.
U.S. Appl. No. 12/896,538.
U.S. Appl. No. 61/102,635.
PCT/US2010/051154 Intl Preliminary Report on Patentability.
PCT/US2010/051154 Intl Search Report.
PCT/US2010/051154 Written Opinion.

* cited by examiner

Primary Examiner — Jeffrey Mullis

(57) ABSTRACT

Embodiments of the invention provide block composites comprising a soft copolymer, a hard polymer and a block copolymer having a soft segment and a hard segment, wherein the hard segment of the block copolymer is the same composition as the hard polymer in the block composite and the soft segment of the block copolymer is the same composition as the soft copolymer of the block composite and their use as impact modifiers.

11 Claims, 31 Drawing Sheets

FIG. 5
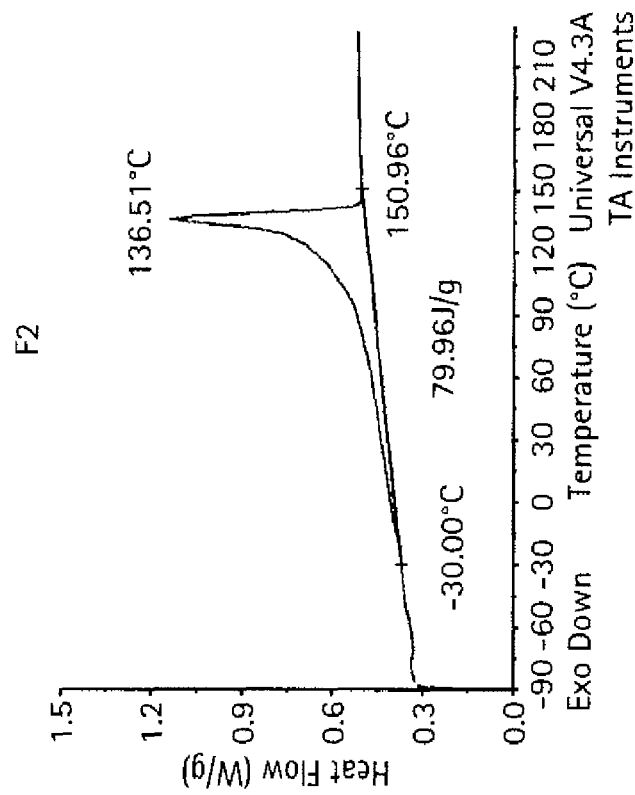
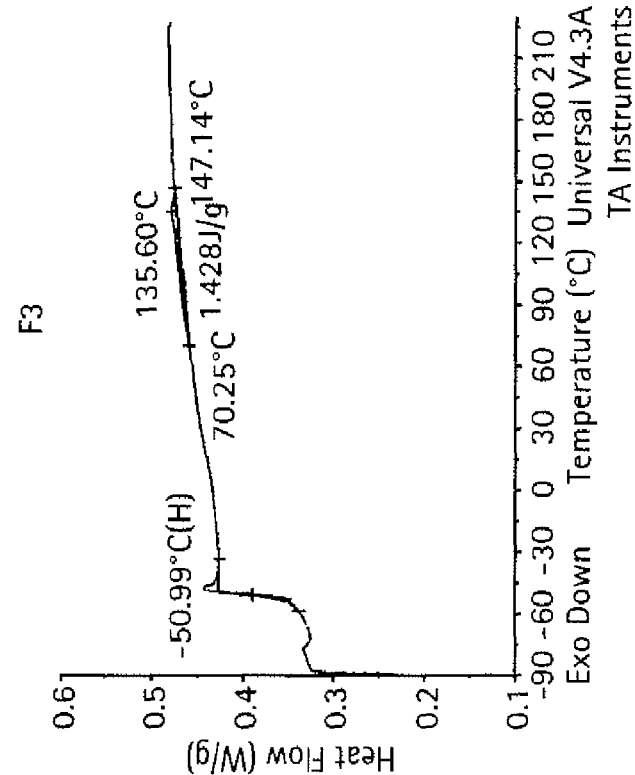

- Profax Ultra SG853 + Comparative C
- SG853 + Comp. C + 5% Inventive B1
- SG853 + Comp. C + 15% Inventive B1
- SG853 + Comp. C + 5% Inventive D1
- SG853 + Comp. C + 15% Inventive D1

- Profax Ultra SG853 + Comparative C
- SG853 + Comp. D + 5% Inventive B1
- SG853 + Comp. D + 15% Inventive B1
- SG853 + Comp. D + 5% Inventive D1
- SG853 + Comp. D + 15% Inventive D1

→ Profax Ultra SG853 + Comparative C
→ SG853 + Comp. C + Comparative A
── SG853 + Comp. C + Comparative A → Profax Ultra SG853 + Comparative D
→ SG853 + Comp. D + Comparative A
── SG853 + Comp. D + Comparative A

BLOCK COMPOSITES AND IMPACT MODIFIED COMPOSITIONS

CROSS-REFERENCE TO RELATED PATENT APPLICATIONS

This application claims priority from U.S. Provisional Application Ser. No. 61/248,170, filed Oct. 2, 2009. This application is also related to the following U.S. Provisional Patent Applications also filed Oct. 2, 2009 with Ser. Nos. 61/248,147; and 61/248,160. For purposes of United States patent practice, the contents of these applications are herein incorporated by reference in their entirety.

FIELD OF THE INVENTION

This invention relates to block composites and their use in impact modified polypropylene.

BACKGROUND OF THE INVENTION

Many different polymers and materials have been added to polymer compositions in attempting to enhance the composition's impact strength or maintain the impact strength while enhancing other properties. For example, U.S. Pat. No. 5,118,753 (Hikasa et al.), incorporated herein by reference, discloses thermoplastic elastomer compositions said to have low hardness and excellent flexibility and mechanical properties consisting essentially of a mixture of an oil-extended olefinic copolymer rubber and an olefinic plastic. The olefinic plastic is polypropylene or a copolymer of polypropylene and an alpha-olefin of 2 or more carbon atoms. Modern Plastics Encyclopedia/89, mid October 1988 Issue, Volume 65, Number 11, pp. 110-117, the disclosure of which is incorporated herein by reference, also discusses the use of various thermoplastic elastomers (TPEs) useful for impact modification. These include: elastomeric alloys TPEs, engineering TPEs, olefinic TPEs (also known as thermoplastic olefins or TPOs), polyurethane TPEs and styrenic TPEs.

Thermoplastic olefins (TPOs) are often produced from blends of an elastomeric material such as ethylene based random copolymers, ethylene/propylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. TPOs are often characterized by a balance of stiffness (modulus) and low temperature impact, good chemical resistance and broad use temperatures. Because of features such as these, TPOs are used in many applications, including automotive facia and wire and cable components, rigid packaging, molded articles, instrument panels, and the like.

Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. It may further comprise additional blocks of different type. Multi-block copolymers can be either linear multi-block, multi-block star polymers (in which all blocks bond to the same atom or chemical moiety) or comb-like polymers where the B blocks are attached at one end to an A backbone.

A block copolymer is created when two or more polymer molecules of different chemical composition are covalently bonded to each other. While a wide variety of block copolymer architectures are possible, a number of block copolymers involve the covalent bonding of hard plastic blocks, which are substantially crystalline or glassy, to elastomeric blocks forming thermoplastic elastomers. Other block copolymers, such as rubber-rubber (elastomer-elastomer), glass-glass, and glass-crystalline block copolymers, are also possible.

One method to make block copolymers is to produce a "living polymer". Unlike typical Ziegler-Natta polymerization processes, living polymerization processes involve only initiation and propagation steps and essentially lack chain terminating side reactions. This permits the synthesis of predetermined and well-controlled structures desired in a block copolymer. A polymer created in a "living" system can have a narrow or extremely narrow distribution of molecular weight and be essentially monodisperse (i.e., the molecular weight distribution is essentially one). Living catalyst systems are characterized by an initiation rate which is on the order of or exceeds the propagation rate, and the absence of termination or transfer reactions. In addition, these catalyst systems are characterized by the presence of a single type of active site. To produce a high yield of block copolymer in a polymerization process, such catalysts must exhibit living characteristics to a substantial extent.

Polypropylene (PP) homopolymers or PP random copolymers provide the desirable stiffness and clarity for many applications, but can suffer from poor impact properties due to a high Tg (0° C. for homopolymer PP, hPP). To overcome this deficiency, PP homopolymer is blended with PP copolymers and/or elastomers to improve its toughness, but often at the expense of its clarity and modulus.

Ideally the elastomer or compatibilizer should promote or produce elastomer particles that are small enough scale to improve the impact performance without adversely affecting the modulus of the blend.

An improvement would be to develop a propylene-containing elastomer that exhibits a Tg low enough for the needed application and improves the impact performance without adversely affecting its clarity. Ideally, the modulus and clarity of the PP/propylene-containing elastomer blend product should be comparable to that of PP homopolymer.

SUMMARY OF THE INVENTION

Formulated compositions have now been discovered to have this combination of good low temperature impact performance and modulus. The invention provides a formulated composition comprising:
a) polypropylene;
b) a compatibilizer, preferably comprising a block composite; and,
c) optionally an elastomer
wherein the composition exhibits an Izod strength in $kJ/m^2$ as measured by ASTM D256 or ISO180 at 0° C. or 23° C. that is at least 10% higher than that of the composition without (b); and exhibits a flexural modulus that is less than 10% reduced as compared to that of the composition without (b).

BRIEF DESCRIPTION OF THE DRAWINGS

FIG. 5 shows DSC curves of Examples F2 and F3.

DESCRIPTION OF EMBODIMENTS OF THE INVENTION

Definitions

Figure 1:
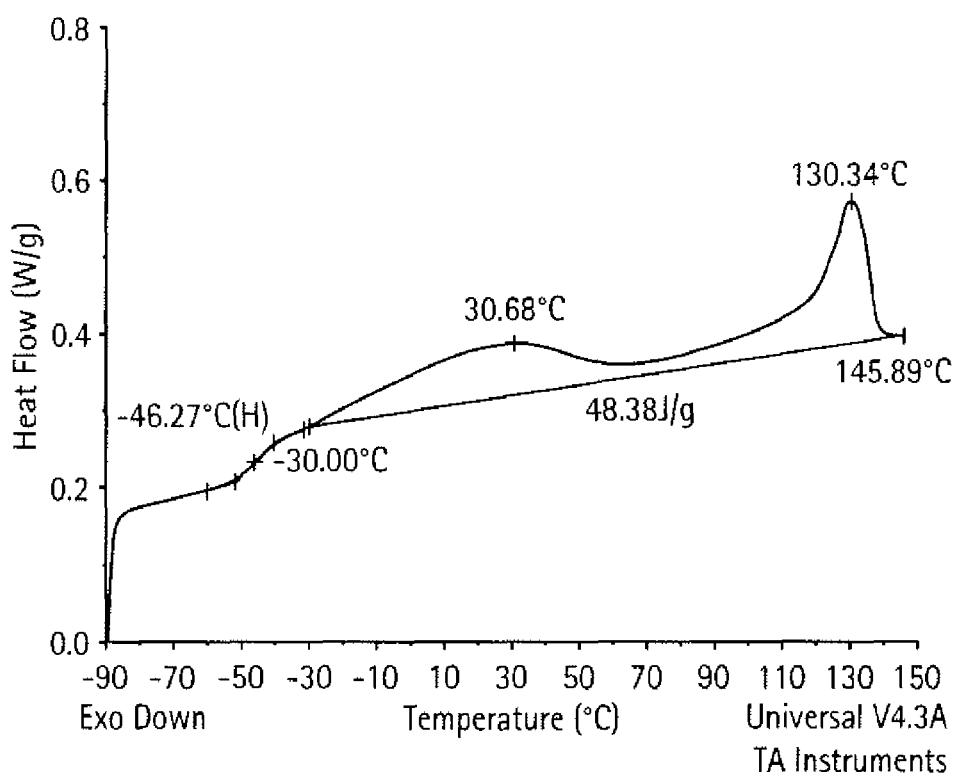
FIG. 1 shows the DSC melting curve for Example B1.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer", includes both conventional homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer. More specifically, the term "polyethylene" includes homopolymers of ethylene and copolymers of ethylene and one or more $C_{3-8}$ α-olefins in which ethylene comprises at least 50 mole percent. The term "propylene copolymer" or "propylene interpolymer" means a copolymer comprising propylene and one or more copolymerizable comonomers, wherein a plurality of the polymerized monomer units of at least one block or segment in the polymer (the crystalline block) comprise propylene, preferably at least 90 mole percent, more preferably at least 95 mole percent, and most preferably at least 98 mole percent. A polymer made primarily from a different α-olefin, such as 4-methyl-1-pentene would be named similarly. The term "crystalline" if employed, refers to a polymer or polymer block that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point. The term, "isotactic" is defined as polymer repeat units having at least 70 percent isotactic pentads as determined by $^{13}$C-NMR analysis. "Highly isotactic" is defined as polymers having at least 90 percent isotactic pentads.

The term "block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the invention are characterized by unique distributions of both polymer polydispersity (PDI or Mw/Mn), block length distribution, and/or block number distribution, due, in a preferred embodiment, to the effect of the shuttling agent(s) in combination with the catalyst(s).

The term "block composite" refers to the novel polymers of the invention comprising a soft copolymer, a hard polymer and a block copolymer having a soft segment and a hard segment, wherein the hard segment of the block copolymer is the same composition as the hard polymer in the block composite and the soft segment of the block copolymer is the same composition as the soft copolymer of the block composite. The block copolymers can be linear or branched. More specifically, when produced in a continuous process, the block composites desirably possess PDI from 1.7 to 15, preferably from 1.8 to 3.5, more preferably from 1.8 to 2.2, and most preferably from 1.8 to 2.1. When produced in a batch or semi-batch process, the block composites desirably possess PDI from 1.0 to 2.9, preferably from 1.3 to 2.5, more preferably from 1.4 to 2.0, and most preferably from 1.4 to 1.8.

"Hard" segments refer to highly crystalline blocks of polymerized units in which the monomer is present in an amount greater than 90 mol percent, and preferably greater than 93 mol percent, and more preferably greater than 95 mol percent, and most preferably greater than 98 mol percent. In other words, the comonomer content in the hard segments is most preferably less than 2 mol percent, and more preferably less than 5 mol percent, and preferably less than 7 mol percent, and less than 10 mol percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol % and less than 90 mol % and preferably greater than 20 mol % and less than 80 mol %, and most preferably greater than 33 mol % and less than 75 mol %.

The block composite polymers of the invention are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions.

In a preferred embodiment, the block composites of the invention comprise a fraction of block polymer which possesses a most probable distribution of block lengths. Preferred polymers according to the invention are block copolymers containing 2 or 3 blocks or segments. In a polymer containing three or more segments (that is blocks separated by a distinguishable block) each block may be the same or chemically different and generally characterized by a distribution of properties. In a process for making the polymers, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The following mathematical treatment of the resulting polymers is based on theoretically derived parameters that are believed to apply and demonstrate that, especially in two or more steady-state, continuous reactors or zones connected in series, having differing polymerization conditions to which the growing polymer is exposed, the block lengths of the polymer being formed in each reactor or zone will conform to a most probable distribution, derived in the following manner, wherein pi is the probability of polymer propagation in a reactor with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths, and the assumption that polymer chain growth is completed in a very short time compared to the mean reactor residence time. Such methods have been previously disclosed in W. H. Ray, J. Macromol. Sci., Rev. Macromol. Chem., C8, 1 (1972) and A. E. Hamielec and J. F. MacGregor, "Polymer Reaction Engineering", K. H. Reichert and W. Geisler, Eds., Hanser, Munich, 1983. In addition, it is assumed that each incidence of the chain shuttling reaction in a given reactor results in the formation of a single polymer block, whereas transfer of the chain shuttling agent terminated polymer to a different reactor or zone and exposure to different polymerization conditions results in formation of a different block. For catalyst i, the fraction of sequences of length n being produced in a reactor is given by Xi[n], where n is an integer from 1 to infinity representing the total number of monomer units in the block.

$$Xi[n] = (1 - pi) \, pi(n - 1) \quad \text{most probable distribution of block lengths}$$

$$Ni = \frac{1}{1 - pi} \quad \text{number average block length}$$

If more than one catalyst is present in a reactor or zone, each catalyst has a probability of propagation (pi) and therefore has a unique average block length and distribution for polymer being made in that reactor or zone. In a most preferred embodiment the probability of propagation is defined as:

$$pi = \frac{Rp[i]}{Rp[i] + Rt[i] + Rs[i] + [Ci]} \quad \text{for each catalyst } i = \{1, 2 \ldots \},$$

where,
Rp[i]=Local rate of monomer consumption by catalyst i, (moles/L/time),
Rt[i]=Total rate of chain transfer and termination for catalyst i, (moles/L/time), and Rs[i]=Local rate of chain shuttling with dormant polymer, (moles/L/time).

For a given reactor the polymer propagation rate, Rp[i], is defined using an apparent rate constant, $\overline{kpi}$, multiplied by a total monomer concentration, [M], and multiplied by the local concentration of catalyst i, [Ci], as follows:

$$Rp[i]=\overline{kpi}[M][Ci]$$

The chain transfer, termination, and shuttling rate is determined as a function of chain transfer to hydrogen (H2), beta hydride elimination, and chain transfer to chain shuttling agent (CSA). The quantities [H2] and [CSA] are molar concentrations and each subscripted k value is a rate constant for the reactor or zone:

$$Rt[i]=kH2i[H2][Ci]+k\beta i[Ci]+kai[CSA][Ci]$$

Dormant polymer chains are created when a polymer moiety transfers to a CSA and all CSA moieties that react are assumed to each be paired with a dormant polymer chain. The rate of chain shuttling of dormant polymer with catalyst i is given as follows, where [CSAf] is the feed concentration of CSA, and the quantity ([CSAf]−[CSA]) represents the concentration of dormant polymer chains:

$$Rs[i]=kai[Ci]([CSAf]-[CSA])$$

As a result of the foregoing theoretical treatment, it may be seen that the overall block length distribution for each block of the resulting block copolymer is a sum of the block length distribution given previously by Xi[n], weighted by the local polymer production rate for catalyst i. This means that a polymer made under at least two different polymer forming conditions will have at least two distinguishable blocks or segments each possessing a most probable block length distribution.

Monomers

Suitable monomers for use in preparing the copolymers of the present invention include any addition polymerizable monomer, preferably any olefin or diolefin monomer, more preferably any α-olefin, and most preferably propylene and at least one copolymerizable comonomer having from 2 or 4 to 20 carbons, or 1-butene and at least one copolymerizable comonomer having 2 or from 5 to 20 carbons, 4-methyl-1-pentene and at least one different copolymerizable comonomer having from 4 to 20 carbons. Preferably, the copolymers comprise propylene and ethylene. Examples of suitable monomers include straight-chain or branched α-olefins of 2 to 30, preferably 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono- or poly-alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene and α-methylstyrene, vinylchloride, 1,2-difluoroethylene, 1,2-dichloroethylene, tetrafluoroethylene, and 3,3,3-trifluoro-1-propene, provided the monomer is polymerizable under the conditions employed. Preferred monomers or mixtures of monomers for use in combination with at least one CSA herein include ethylene; propylene; mixtures of ethylene with one or more monomers selected from the group consisting of propylene, 1-butene, 1-hexene, 4-methyl-1-pentene, 1-octene, and styrene; and mixtures of ethylene, propylene and a conjugated or non-conjugated diene.

Catalysts and Chain Shuttling Agents

Suitable catalysts and catalyst precursors for use in the present invention include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts.

Particularly preferred catalysts are those of the following formula:

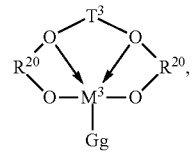

where:
R²⁰ is an aromatic or inertly substituted aromatic group containing from 5 to 20 atoms not counting hydrogen, or a polyvalent derivative thereof;

T³ is a hydrocarbylene or silane group having from 1 to 20 atoms not counting hydrogen, or an inertly substituted derivative thereof;

M³ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and bonds and electron donative interactions are represented by lines and arrows respectively.

Preferably, such complexes correspond to the formula:

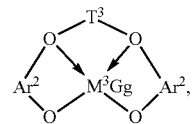

wherein:
T³ is a divalent bridging group of from 2 to 20 atoms not counting hydrogen, preferably a substituted or unsubstituted, $C_{3-6}$ alkylene group; and Ar² independently each occurrence is an arylene or an alkyl- or aryl-substituted arylene group of from 6 to 20 atoms not counting hydrogen;

M³ is a Group 4 metal, preferably hafnium or zirconium;

G independently each occurrence is an anionic, neutral or dianionic ligand group;
g is a number from 1 to 5 indicating the number of such X groups; and
electron donative interactions are represented by arrows.

Preferred examples of metal complexes of foregoing formula include the following compounds:

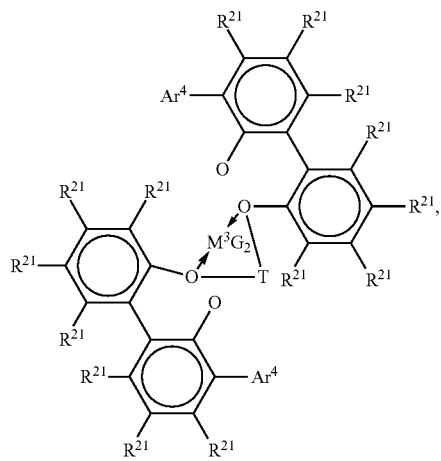

where
$M^3$ is Hf or Zr;
$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and
$T^4$ independently each occurrence comprises a $C_{3-6}$ alkylene group, a $C_{3-6}$ cycloalkylene group, or an inertly substituted derivative thereof;
$R^{21}$ independently each occurrence is hydrogen, halo, hydrocarbyl, trihydrocarbylsilyl, or trihydrocarbylsilylhydrocarbyl of up to 50 atoms not counting hydrogen; and
G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

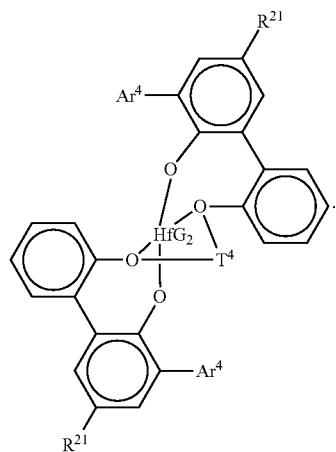

wherein
$Ar^4$ is 3,5-di(isopropyl)phenyl, 3,5-di(isobutyl)phenyl, dibenzo-1H-pyrrole-1-yl, or anthracen-5-yl,
$R^{21}$ is hydrogen, halo, or $C_{1-4}$ alkyl, especially methyl
$T^4$ is propan-1,3-diyl or butan-1,4-diyl, and
G is chloro, methyl or benzyl.

Other suitable metal complexes are those of the formula:

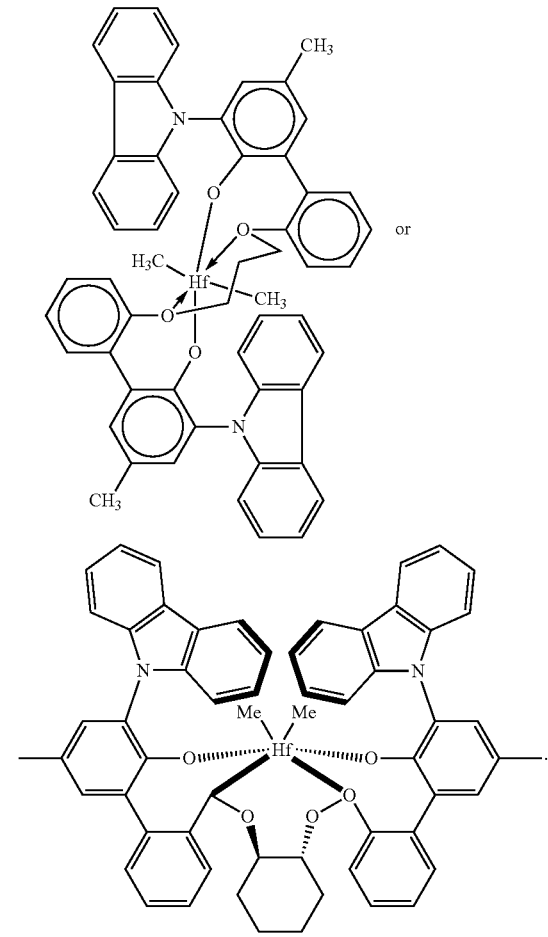

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, 6,953,764 and International Publication Nos WO 02/38628 and WO 03/40195.

Suitable co-catalysts are those disclosed in WO2005/090426, in particular, those disclosed on page 54, line 1 to page 60, line 12, which is herein incorporated by reference.

Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

Block Composite Polymer Product

Utilizing the present process, novel block composite polymers are readily prepared. Preferably, the block composite polymers comprise propylene, 1-butene or 4-methyl-1-pentene and one or more comonomers. Preferably, the block polymers of the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds.

Comonomer content in the resulting block composite polymers may be measured using any suitable technique, with techniques based on nuclear magnetic resonance (NMR) spectroscopy preferred. It is highly desirable that some or all of the polymer blocks comprise amorphous or relatively amorphous polymers such as copolymers of propylene, 1-butene or 4-methyl-1-pentene and a comonomer, especially random copolymers of propylene, 1-butene or 4-methyl-1-pentene with ethylene, and any remaining polymer blocks (hard segments), if any, predominantly comprise propylene, 1-butene or 4-methyl-1-pentene in polymerized form. Preferably such segments are highly crystalline or stereospecific polypropylene, polybutene or poly-4-methyl-1-pentene, especially isotactic homopolymers.

Further preferably, the block copolymers of the invention comprise from 10 to 90 percent crystalline or relatively hard segments and 90 to 10 percent amorphous or relatively amorphous segments (soft segments), preferably from 20 to 80 percent crystalline or relatively hard segments and 80 to 20 percent amorphous or relatively amorphous segments (soft segments), most preferably from 30 to 70 percent crystalline or relatively hard segments and 70 to 30 percent amorphous or relatively amorphous segments (soft segments). Within the soft segments, the mole percent comonomer may range from 10 to 90 mole percent, preferably from 20 to 80 mole percent, and most preferably from 33 to 75 mol % percent. In the case wherein the comonomer is ethylene, it is preferably present in an amount of 10 mol % to 90 mol %, more preferably from 20 mol % to 80 mol %, and most preferably from 33 mol % to 75 mol % percent. Preferably, the copolymers comprise hard segments that are 90 mol % to 100 mol % propylene. The hard segments can be greater than 90 mol % preferably greater than 93 mol % and more preferably greater than 95 mol % propylene, and most preferably greater than 98 mol % propylene. Such hard segments have corresponding melting points that are 80° C. and above, preferably 100° C. and above, more preferably 115° C. and above, and most preferably 120° C. and above.

The block composite polymers of the invention may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block index and block composite index, as described below; from a physical blend by characteristics such as block index, block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites of the invention have a Block Composite Index (BCI), as defined below, that is greater than zero but less than about 0.4 or from about 0.1 to about 0.3. In other embodiments, BCI is greater than about 0.4 and up to about 1.0. Additionally, the BCI can be in the range of from about 0.4 to about 0.7, from about 0.5 to about 0.7, or from about 0.6 to about 0.9. In some embodiments, BCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, BCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

The block composites preferably have a Tm greater than 100° C., preferably greater than 120° C., and more preferably greater than 125° C. Preferably the MFR of the block composite is from 0.1 to 1000 dg/min, more preferably from 0.1 to 50 dg/min and more preferably from 0.1 to 30 dg/min.

Other desirable compositions according to the present invention are elastomeric block copolymers of propylene, 1-butene or 4-methyl-1-pentene with ethylene, and optionally one or more α-olefins or diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to isobutylene, 1-butene, 1-pentene, 1-hexene, 4-methyl-1-pentene (when copolymerized with propylene), and 1-octene. Suitable dienes for use in preparing such polymers, especially multi-block EPDM type polymers include conjugated or non-conjugated, straight or branched chain-, cyclic- or polycyclic-dienes containing from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene. The resulting product may comprise isotactic homopolymer segments alternating with elastomeric copolymer segments, made in situ during the polymerization. Preferably, the product may be comprised solely of the elastomeric block copolymer of propylene, 1-butene or 4-methyl-1-pentene with one or more comonomers, especially ethylene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

Further preferably, the block composites of this embodiment of the invention have a weight average molecular weight (Mw) from 10,000 to about 2,500,000, preferably from 35000 to about 1,000,000 and more preferably from 50,000 to about 300,000, preferably from 50,000 to about 200,000.

The polymers of the invention may be oil extended with from 5 to about 95 percent, preferably from 10 to 60 percent, more preferably from 20 to 50 percent, based on total composition weight, of a processing oil. Suitable oils include any oil that is conventionally used in manufacturing extended EPDM rubber formulations. Examples include both naphthenic- and paraffinic-oils, with paraffinic oils being preferred.

If the polymers of the invention contain a pendent diene termonomer, any cross-linking agent which is capable of curing an EPDM can be used in embodiments of the invention. Suitable curing agents include, but are not limited to, phenolic resin, peroxides, azides, aldehyde-amine reaction products, vinyl silane grafted moieties, hydrosilylation, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. Suitable cross-linking agents may also be used such as those disclosed in U.S. Pat. No. 7,579,408, col. 31, line 54 through col. 34, line 52, which disclosure is herein incorporated by reference.

An elastomer composition according to this embodiment of the invention may include carbon black. Preferably, the carbon black is present in the amount of from 10 to 80 percent, more preferably from 20 to 60 percent, based on total composition weight.

Thermoplastic compositions according to embodiments of the invention may also contain organic or inorganic fillers or other additives such as starch, talc, calcium carbonate, glass fibers, glass beads, hollow glass spheres, polymeric fibers (including nylon, rayon, cotton, polyester, and polyaramide), natural organic fibers including wood fiber and cotton, metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes and montmorillonite, wollastonite, graphite, zeolites, and ceramics, such as silicon carbide, silicon nitride or titania. Silane based, or other coupling agents may also be employed for better filler bonding.

Additional components of the present formulations usefully employed according to the present invention include various other ingredients in amounts that do not detract from the properties of the resultant composition. These ingredients include, but are not limited to, activators such as calcium or magnesium oxide; fatty acids such as stearic acid and salts thereof such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof; plasticizers such as dialkyl esters of dicarboxylic acids; antidegradants; softeners; waxes such as polyethylene wax, oxidized polyethylene wax, and montan ester wax; and pigments, such as titanium dioxide and iron oxide.

For conventional TPO, applications, carbon black is often the additive of choice for UV absorption and stabilizing properties. Representative examples of carbon blacks include ASTM N110, N121, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 $cm^3/100$ g. Generally, smaller particle sized carbon blacks are employed, to the extent cost considerations permit. For many such applications the present block composites and blends thereof require little or no carbon black, thereby allowing considerable design freedom to include alternative pigments or no pigments at all.

Compositions, including thermoplastic blends according to embodiments of the invention may also contain anti-ozonants or anti-oxidants that are known to a chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl)phenol, p-phenylenediamines, butylated reaction products of p-cresol and dicyclopentadiene (DCPD), polyphenolic antioxidants, hydroquinone derivatives, quinoline, diphenylene antioxidants, thioester antioxidants, phosphite antioxidants and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Irganox™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Specialty Chemicals, and Chemisorb™ T944, available from Cytex Plastics, Houston Tex., USA. A Lewis acid may be additionally included with a HALS compound in order to achieve superior surface quality, as disclosed in U.S. Pat. No. 6,051, 681.

For some compositions, additional mixing processes may be employed to pre-disperse the anti-oxidants, anti-ozonants, carbon black, UV absorbers, and/or light stabilizers to form a masterbatch, and subsequently to form polymer blends there from.

Impact Modified Compositions

Impact modified compositions consist of a matrix polymer toughened via blending with an elastomer composition In one embodiment, the matrix polymer is a polypropylene. Any polypropylene known to a person of ordinary skill in the art may be used to prepare the polymer blends disclosed herein. Non-limiting examples of polypropylene include low density polypropylene (LDPP), high density polypropylene (HDPP), high melt strength polypropylene (HMS-PP), high impact polypropylene (HIPP), isotactic polypropylene (iPP), syndiotactic polypropylene (sPP) and the like, and combinations thereof.

The amount of the polypropylene in the polymer blend can be from about 0.5 to about 99 wt %, from about 10 to about 90 wt %, from about 20 to about 80 wt %, from about 30 to about 70 wt %, from about 5 to about 50 wt %, from about 50 to about 95 wt %, from about 10 to about 50 wt %, or from about 50 to about 90 wt % of the total weight of the polymer blend. In one embodiment, the amount of the polypropylene in the polymer blend is about 50%, 60%, 70% or 80% by total weight of the polymer blend.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5-7 wt % ethylene copolymerized with the propylene), however, can also be used in the TPO formulations disclosed herein. A complete discussion of various polypropylene polymers is contained in Modern Plastics Encyclopedia/89, mid October 1988 Issue, Volume 65, Number 11, pp. 86-92, the entire disclosure of which is incorporated herein by reference. The molecular weight and hence the melt flow rate of the polypropylene for use in the present invention varies depending upon the application.

The melt flow rate for the polypropylene useful herein is generally from about 0.1 grams/10 minutes (g/10 min) to about 200 g/10 min, preferably from about 0.5 g/10 min to about 150 g/10 min, and especially from about 4 g/10 min to about 100 g/10 min. The propylene polymer can be a polypropylene homopolymer, or it can be a random copolymer or even an impact copolymer (which already contains a rubber phase). Examples of such propylene polymers include—impact copolymers, Profax Ultra SG583 from LyondellBasell Polyolefins or INSPIRE 114 from the Dow Chemical Company; homopolymer, H110N or D221.00, from the Dow Chemical Company; random copolymer, 6D43 from The Dow Chemical Company; random propylene-ethylene plastomers and elastomers such as VISTAMAXX™ (made by ExxonMobil), and VERSIFY™ (from The Dow Chemical Co.).

The elastomer composition used to toughen the polypropylene may be any elastomer with sufficient polypropylene compatibility and sufficiently low enough glass transition temperature to impart impact toughness to the polypropylene. In one embodiment, the elastomer is a randomly copolymerized ethylene/α-olefin copolymer.

The ethylene/α-olefin random copolymers used as the toughening elastomer in the embodiments of the invention are preferably copolymers of ethylene with at least one $C_3$-$C_{20}$ α-olefin. Copolymers of ethylene and a $C_3$-$C_{20}$ α-olefin are especially preferred. Non-limiting examples of such copolymers are linear, homogeneously branched copolymers such as EXACT from ExxonMobil and Tafmer from Mitsui, and substantially linear, homogeneously branched copolymers such as ENGAGE copolymers from the Dow Chemical Company. The copolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin copolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable elastomers that can be made in accordance with embodiments of the invention are elastomers of ethylene, a $C_3$-$C_{20}$ α-olefin, especially propylene, and optionally one or more diene monomers. Preferred α-olefins for use in this embodiment of the present invention are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene containing polymers are generally referred to in the art as EP or EPDM polymers. Suitable dienes for use in preparing such polymers, especially EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

In another embodiment, ethylene/α-olefin block interpolymers may be used as the toughening elastomer. The ethylene/α-olefin interpolymer comprises polymerized units of ethylene and α-olefin, wherein the interpolymer is characterized by an average block index greater than zero and up to about 1.0 and a molecular weight distribution, $M_w/M_n$, greater than about 1.3. In another aspect, the invention relates to an ethylene/α-olefin interpolymer comprising polymerized units of ethylene and α-olefin, wherein the average block index is greater than 0 but less than about 0.5 and a molecular weight distribution, $M_w/M_n$, greater than about 1.3. Preferably, the interpolymer is a linear, multi-block copolymer with at least three blocks. Also preferably, the ethylene content in the interpolymer is at least 50 mole percent. These are described in and may be produced via polymerization techniques as illustrated in, for example, U.S. Pat. No. 7,608,668 B2, which is herein incorporated by reference. Another type of ethylene/α-olefin block interpolymers that may be used are those referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nm in the mesophase separated block copolymers of the instant invention. Examples of these interpolymers may be found in, for example, International Publication Nos. WO/2009/097560, WO/2009/097565, WO/2009/097525, WO/2009/097529, WO/2009/097532, and WO/2009/097535, all of which are herein incorporated by reference.

In yet another embodiment, selectively hydrogenated block copolymers can be used as the toughening elastomer including block copolymers of conjugated dienes and vinyl aromatic hydrocarbons which exhibit elastomeric properties and which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial, symmetric, or asymmetric and which have structures represented by the formulae, A-B, A-B-A, A-B-A-B, B-A, B-A-B, B-A-B-A, $(AB)_{0,1,2}$... BA and the like wherein A is a polymer block of a vinyl aromatic hydrocarbon or a conjugated diene/vinyl aromatic hydrocarbon tapered copolymer block and B is a polymer block of a conjugated diene.

The block styrenic copolymers may be produced by any well known ionic block polymerization or copolymerization procedures including the well known sequential addition of monomer techniques, incremental addition of monomer techniques or coupling techniques as illustrated in, for example, U.S. Pat. Nos. 3,251,905, 3,390,207, 3,598,887, and 4,219,627, all of which are incorporated herein by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905, 3,265,765, 3,639,521, and 4,208,356, the disclosures of which are incorporated herein by reference Preferably, the impact modified compositions of the invention have an elastomer weight average particle size wherein the weight average particle size is less than 3.5 µm, preferably less than 2.5 µm, and more preferably less than 2.2 µm.

Preferably, the impact modified compositions of the invention have an average elastomer weight average particle size that is more than 20% less than that of the impact modified composition of the polypropylene and the elastomer alone, more preferably more than 35% less than that of the impact modified composition of the polypropylene and the elastomer alone, and most preferably more than 50% less than that of the impact modified composition of the polypropylene and the elastomer alone.

Also, preferably, the impact modified compositions have a ductile to brittle transition temperature of at least 2° C. less, more preferably of at least 5° C. less, even more preferably of at least 10° C. less, and most preferably of at least 20° C. less as compared to the unmodified impact copolymer.

When the block composite comprises polypropylene hard blocks and ethylene-propylene soft blocks, it compatibilizes both the iPP matrix and/or the elastomer (dispersed) phase of an impact copolymer. Upon blending with the propylene-containing block copolymer, an unexpected and significant reduction in domain size of both the PP and elastomer phase is observed.

Preferably, the compatibilizer of the formulated composition comprises a block composite. The block composite may be present in an amount of from 0.50 wt % to 20 wt %, preferably from 0.5 wt % to 15% and more preferably in an amount of from 1 wt % to 10 wt %.

High clarity impact modified polypropylene may be obtained by either blending PP homopolymer or random copolymer and the block composite or blending a PP homopolymer or random copolymer, a properly selected toughening elastomer and the block composite of the invention. The resultant blends yield smaller and more discrete rubber domains than a simple PP/elastomer blend. When the rubber domain sizes are smaller than the wavelengths of visible light (400-700 nm), less scattering of the light occurs, and the polymer blend remains clear. Since the block copolymer of the block composite contains compatibilized rubber, this new impact-modified PP exhibits improved toughness at low temperatures, and has similar clarity as PP homopolymer. Similarly, a toughening elastomer that has been sized via the block composite to a particle size smaller than the wavelengths of visible light will also scatter less light, and the polymer blend remains clear. Also, toughening elastomers that are refractively index matched with a matrix polypropylene will yield improved toughening efficiency in PP when blended with the block composite. For example, a refractive index matched blend of isotactic PP homopolymer with 0.895-0.905 g/cc density ethylene/1-octene elastomers exhibits improved impact toughening when combined with the block composite.

This new impact-modified PP has the potential use for producing high clarity PP for freezer packaging (films or rigid packaging) such as clear ice cream containers which are not available today.

Methods for Making Blended Compositions

The blended compositions of the present invention are made by any convenient method, including dry blending the individual components and subsequently melt mixing, either directly in the extruder used to make the finished article (e.g., the automotive part), or by pre-melt mixing in a separate extruder (e.g., a Banbury mixer). Typically, the blends are prepared by mixing or kneading the respective components at a temperature around or above the melt point temperature of one or both of the components. For most multiblock copolymers, this temperature may be above 130° C., most generally above 145° C., and most preferably above 150° C. Typical polymer mixing or kneading equipment that is capable of reaching the desired temperatures and melt plastifying the mixture may be employed. These include mills, kneaders, extruders (both single screw and twin-screw), Banbury mixers, calenders, and the like. The sequence of mixing and method may depend on the final composition. A combination of Banbury batch mixers and continuous mixers may also be employed, such as a Banbury mixer followed by a mill mixer followed by an extruder.

General Article Fabrication

The compositions of this invention can be fabricated into parts, sheets or other article of manufacture, using any conventional extrusion, calendering, blow molding (e.g., that described in Modern Plastics Encyclopedia/89, Mid October 1988 Issue, Volume 65, Number 11, pp. 217-218, "Extrusion-Blow Molding", the disclosure of which is incorporated herein by reference), injection molding, (e.g., that described in Modern Plastics Encyclopedia/89, Mid October 1988 Issue, Volume 65, Number 11, pp. 264-268, "Introduction to Injection Molding" and on pp. 270-271, "Injection Molding Thermoplastics", the disclosures of which are incorporated herein by reference), foaming or thermoforming process. Specific examples of such processes include sheet extrusion, profile extrusion, and injection molding. Such processes can produce articles or products having smooth or embossed surfaces. The components of the composition can be fed to the process either pre-mixed, or, in a preferred embodiment, the components can be fed directly into the process equipment, such as a converting extruder, such that the composition is formed in the extruding, calendering, blow molding, foaming or thermoforming process. The compositions also may be blended with another polymer, prior to fabrication of an article. Such blending may occur by any of a variety of conventional techniques, one of which is dry blending of pellets of the thermoplastic elastomer compositions of this invention with pellets of another polymer.

In addition to sheet extrusion processes, the inventive compositions may also be used in extrusion blow molding processes to form blow molded articles. In addition, the inventive compositions can be extruded to form various profiles. The inventive compositions may also be used to form calendered articles.

A partial, far from exhaustive, listing of articles that can be fabricated from the compositions of the invention includes automobile body parts, such as instrument panels, instrument panel foam, fuel tanks, automotive containers, bumper fascia, body side moldings, automotive structural ribbing, interior pillars, exterior trim, interior trim, air dams, air ducts, grills and wheel covers, and non-automotive applications, such as polymer films, polymer sheets, foams, tubing, fibers, coatings, trash cans, storage or packaging containers, including, for example, freezer containers. Of course, one skilled in the art can also combine polymers to advantageously use refractive index to improve, or maintain clarity of end use articles, such as freezer containers.

Additional articles include lawn furniture, lawn mower and other garden appliance parts, refrigerator and other home appliance parts, recreational vehicle parts, golf cart parts, utility cart parts, desk edging, toys and water craft parts. The compositions can also be used in roofing applications such as roofing articles. The compositions can further be used in building applications such as plastic lumber, decking, siding, fascia, soffit, and other building interior and exterior trim articles. The compositions can further be used in fabricating components of footwear. The compositions can further be used in fabricating components of hand held electronic devices such as cellular telephones, personal digital players, personal digital assistants, etc. A skilled artisan can readily augment this list without undue experimentation. Additional articles include extrusion profiles.

Polymerization Methods

Suitable processes useful in producing the block composites of the invention may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, between the first reactor or zone and the second or any subsequent reactor or zone, or even solely to the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

Each reactor in the series can be operated under high pressure, solution, slurry, or gas phase polymerization conditions. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the cocatalyst is only poorly soluble is disclosed in U.S. Pat. No. 5,783,512. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes, allows the use of elevated reactor temperatures which results in the economical production of the present block copolymers in high yields and efficiencies.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

At all times, the individual ingredients as well as any active catalyst composition must be protected from oxygen, moisture and other catalyst poisons. Therefore, the catalyst components, shuttling agent and activated catalysts must be prepared and stored in an oxygen and moisture free atmosphere, preferably under a dry, inert gas such as nitrogen.

Without limiting in any way the scope of the invention, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization. Examples of suitable loop reactors and a variety of suitable operating conditions for use therewith, including the use of multiple loop reactors, operating in series, are found in U.S. Pat. Nos. 5,977,251, 6,319,989 and 6,683,149.

Catalyst along with cocatalyst and optionally chain shuttling agent are continuously or intermittently introduced in the reactor liquid phase or any recycled portion thereof at a minimum of one location. The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen, as is well known in the art. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. Preferably for use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent.

The resulting polymer product is recovered by flashing off volatile components of the reaction mixture such as residual monomers or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

The catalyst composition may also be prepared and employed as a heterogeneous catalyst by adsorbing the requisite components on an inert inorganic or organic particulated solid, as previously disclosed. In a preferred embodiment, a heterogeneous catalyst is prepared by co-precipitating the metal complex and the reaction product of an inert inorganic compound and an active hydrogen containing activator, especially the reaction product of a tri($C_{1-4}$ alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. As with a solution polymerization, the α-olefin comonomer or a mixture of different α-olefin monomers may be used in whole or part as the diluent. Most preferably at least a major part of the diluent comprises the α-olefin monomer or monomers to be polymerized.

Analytical Testing Methods

The overall composition of each resin is determined by DSC, NMR, GPC, DMS, and TEM morphology. Xylene fractionation and HTLC fractionation can be further used to estimate the yield of block copolymer.

Differential Scanning Calorimetry (DSC)

Differential Scanning calorimetry is performed on a TA Instruments Q1000 DSC equipped with an RCS cooling accessory and an auto sampler. A nitrogen purge gas flow of 50 ml/min is used. The sample is pressed into a thin film and melted in the press at about 190° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 190° C. and held isothermal for 3 minutes in order to remove any previous thermal history. The sample is then cooled to −90° C. at 10° C./min cooling rate and held at −90° C. for 3 minutes. The sample is then heated to 150° C. at 10° C./min heating rate. The cooling and second heating curves are recorded.

$^{13}$C Nuclear Magnetic Resonance (NMR)

Sample Preparation

The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters

The data is collected using a Bruker 400 MHz spectrometer equipped with a Bruker Dual DUL high-temperature Cryo-Probe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

Gel Permeation Chromatography (GPC)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polypropylene}=0.645(M_{polystyrene})$.

Polypropylene equivalent molecular weight calculations are performed using Viscotek TriSEC software Version 3.0.

Fast-Temperature Rising Elution Fractionation (F-TREF)

In F-TREF analysis, the composition to be analyzed is dissolved in ortho-dichlorobenzene and allowed to crystallize in a column containing an inert support (stainless steel shot) by slowly reducing the temperature to 30° C. (at a preferred rate of 0.4° C./min). The column is equipped with an infra-red detector. An F-TREF chromatogram curve is then generated by eluting the crystallized polymer sample from the column by slowly increasing the temperature of the eluting solvent (o-dichlorobenzene) from 30 to 140° C. (at a preferred rate of 1.5° C./min).

High Temperature Liquid Chromatography (HTLC)

HTLC is performed according to the methods disclosed in US Patent Application Publication No. 2010-0093964 and U.S. patent application Ser. No. 12/643,111, filed Dec. 21, 2009, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IRS detector was provided by PolymerChar, Valencia, Spain.

Columns: The D1 column was a high temperature Hypercarb graphite column (2.1×100 mm) purchased from Thermo Scientific. The D2 column was a PLRapid-H column purchased from Varian (10×100 mm).

Reagents: HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation: 0.01-0.15 g of polyolefin sample was placed in a 10-mL Waters autosampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the autosampler for injection. Please note that the actual volume of the solution was more than 7 mL due to the thermal expansion of the solvent.

HT-2DLC: The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean Step:
1. 490 min: flow=0.01 min; // Maintain the constant flow rate of 0.01 mL/min from 0-490 min.
2. 491 min: flow=0.20 min; // Increase the flow rate to 0.20 mL/min.
3. 492 min: % B=100; // Increase the mobile phase composition to 100% TCB
4. 502 min: % B=100; // Wash the column using 2 mL of TCB Equilibrium Step:
5. 503 min: % B=0; // Change the mobile phase composition to 100% of 1-decanol or decane
6. 513 min: % B=0; // Equilibrate the column using 2 mL of weak eluent
7. 514 min: flow=0.2 mL/min; // Maintain the constant flow of 0.2 mL/min from 491-514 min
8. 515 min: flow=0.01 mL/min; // Lower the flow rate to 0.01 mL/min.

After step 8, the flow rate and mobile phase composition were the same as the initial conditions of the run gradient.

The D2 flow rate was at 2.51 mL/min. Two 60 µL loops were installed on the 10-port switch valve. 30-µL of the eluent from D1 column was loaded onto the SEC column with every switch of the valve.

The IR, LS15 (light scattering signal at 15°), LS90 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

The weight % of isolated PP is measured as the area that corresponds to the hard block composition based on the isolated peak and the retention volume as determined by a composition calibration curve.

Xylene Soluble Fractionation Analysis

A weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed.

Alternatively, if the solution crystallization temperature of the soft block polymer is above room temperature, the fractionation step can be carried out at a temperature 10-20° C. above the soft blocks crystallization temperature but below the hard blocks crystallization temperature. The temperature of separation can be determined by TREF or CRYSTAF measurement as described by reference, TREF and CRYSTAF technologies for Polymer Characterization, Encyclopedia of Analytical Chemistry. 2000 Issue, Pages 8074-8094. This fractionation can be carried out in a laboratory heated dissolution and filtration apparatus or a fractionation instrument such as the Preparatory mc$^2$ (available from Polymer Char, Valencia, Spain).

Dynamic Mechanical Spectroscopy (DMS)

The dynamic mechanical measurements (loss and storage modulus vs. temperature) are measured on TA instruments ARES. The dynamic modulus measurements are performed in torsion on a solid bar of ca. 2 mm thickness, 5 mm wide and ca. 10 mm in length. The data is recorded at a constant frequency of 10 rad/s and at a heating/cooling rate of 5° C./min. The temperature sweeps are performed from −90 to 190 C at 5° C./min.

Transmission Electron Microscopy

Polymer films are prepared by compression molding followed by fast quenching.

The polymer is pre-melted at 190° C. for 1 minute at 1000 psi and then pressed for 2 minutes at 5000 psi and then quenched between chilled platens (15-20° C.) for 2 minutes.

The compression molded films are trimmed so that sections could be collected near the core of the films. The trimmed samples are cryopolished prior to staining by removing sections from the blocks at −60° C. to prevent smearing of the elastomer phases. The cryopolished blocks are stained with the vapor phase of a 2% aqueous ruthenium tetraoxide solution for 3 hrs at ambient temperature. The staining solution is prepared by weighing 0.2 gm of ruthenium (I10) chloride hydrate ($RuCl_3 \times H_2O$) into a glass bottle with a screw lid and adding 10 ml of 5.25% aqueous sodium hypochlorite to the jar. The samples are placed in the glass jar using a glass slide having double sided tape. The slide is placed in the bottle in order to suspend the blocks about 1 inch above the staining solution. Sections of approximately 90 nanometers in thickness are collected at ambient temperature using a diamond knife on a Leica EM UC6 microtome and placed on 600 mesh virgin TEM grids for observation.

Image Collection—TEM images are collected on a JEOL JEM-1230 operated at 100 kV accelerating voltage and collected on a Gatan-791 and 794 digital cameras.

Atomic Force Microscopy

The specimens were scanned with a Digital Instruments NanoScope V, Dimension 3100 AFM in Tapping Mode with phase detection. Software version is 5.30r3. Mikro Masch tips were used in all experiments. The parameters of the tip: L=230 um, tip radius=5-10 nm, Spring constant=45 N/m, Fo=170 kHz. Tapping ratio: 0.80. Free amplitude setpoint voltage was set to 3.0 v. Post processing of images was conducted using SPIP image analysis software v5.04.

Sample Preparation

Twin Screw Extrusion Compounding and Preparation of the Examples:

The TPO compounds in this study were prepared by melt blending on a 25 mm, Coperion WP-25 ZSK, co-rotating, twin-screw extruder at a speed of 500 RPM. The polypropylene, elastomer, and additional block composite were fed into the extruder using individual loss/weight feeders. The antioxidant additive was tumble blended with the elastomer ahead of compounding. Talc was fed through a side arm feeder that was introduced into the third zone of the extruder barrel and vacuum was used during extrusion to remove volatiles. The compounding extruder rate was 0.38 kg/minute (50 lb/hour) with a melt temperature of about 220° C. (430° F.). The extruded strand was water-cooled and chopped into pellets.

Haake Brabender Compounding and Preparation of the Examples:

The blends were prepared on a Haake batch mixer using a 50 or 200 gram bowl. The blends were mixed at 230° C. at 50 rpm for fifteen to twenty minutes. During that time, the melt torque was monitored to ensure that the torque reached a steady state after melting of the components.

Compression Molding Conditions

Polymer films and specimens (unless otherwise specified) are prepared by compression molding followed by fast quenching using a Carver Press (such as Model #4095-4PR1001R). The polymer is pre-melted at 190° C. for 1 minute at 1000 psi and then pressed for 2 minutes at 5000 psi and then quenched between chilled platens (15-20° C.) for 2 minutes.

Injection Molding

Test samples are injection molded utilizing a Toyo injection molder and universal insert tools that allow different insert to be utilized to make tensile dog-bones or 4 inch (about 10 cm) diameter and 0.125 inch (about 0.32 cm) thick instrumented dart impact test disks. For the instrumented dart impact specimens, the injection rate utilized is 28 cubic centimeters per second. The melt temperature is controlled at 400° F. (about 200° C.) and the tool temperature at 100° F. (about 37° C.). All samples are conditioned in the lab at room temperature for at least seven days before testing.

In recognition that the properties of polypropylene based systems change with the development of crystallinity, the following aging was used prior to testing the specimens:

Notched IZOD and Charpy Testing: Notching for Izod testing to be done within 1 to 6 hrs after molding and conditioning for 40 hours at 73° F. and 50% relative humidity prior to testing.

Flex Mod Testing: After conditioning for 40 hours at 73° F. and 50% relative humidity Instrumented Dart Impact: Aging time of 7 days of the TPO specimen.

Physical Property Testing

Density

Samples for density measurement are prepared according to ASTM D1928. Measurements are made within one hour of sample pressing using ASTM D792, Method B.

Melt Flow Rate and Melt Index

Melt flow rate or $I_2$ of the samples is measured using ASTM D 1238, Condition 230° C., 2.16 kg. Melt Index is measured using ASTM D 1238, Condition 190° C., 2.16 kg. Melt flow rate or $I_{10}$ of the samples is measured using ASTM D1238, Condition 230° C., 10 kg. Melt Index is measured using ASTM D 1238, Condition 190° C., 10 kg.

Tensile Testing

Stress-strain behavior in uniaxial tension is measured using ASTM D638. Injection molded tensile specimens are used unless otherwise specified. Samples are stretched with an Instron at 50 mm/min at 23° C. Tensile strengths and elongation at break are reported for an average of 5 specimens.

Flex Modulus

Flexural and 1 or 2 percent secant moduli and chord moduli are measured according to ASTM D-790. Samples are prepared by injection molding of tensile bars (approx. 165 mm×19 mm×3 mm) and conditioned for at least 40 hours at room temperature.

Heat Distortion Under Load

The heat distortion temperature (HDT) is a measure of a polymer's resistance to distortion under a given load at elevated temperatures. The common ASTM test is ASTM D 648 and 0.455 MPa load was used. Injected tensile specimens were used for the test. The deflection temperature is the temperature at which a test bar, loaded to the specified bending stress, deflects by 0.010 inch (0.25 mm).

Optical Properties

Haze was measured according to ASTM D1003 using 0.5 mm compression molded films. Clarity was measured according to ASTM D1746 using 0.5 mm compression molded films. The polymer films are prepared by compression molding followed by fast quenching. 60° gloss is measured using BYK Gardner Glossmeter Microgloss 60° as specified in ASTM D-2457.

Charpy Impact Strength

Notched Charpy impact strength was measured according to ASTM E23. The notched Charpy impact tests were done on injection molded ASTM tensile specimens. The samples were notched using a notcher to produce a notch depth 10.16±0.05 mm according to ASTM E23. Five specimens of each sample were tested using ASTM E23 at room temperature, 23° C., 0° C., −10° C., −20° C., and −30° C.

IZOD Impact Strength

The notched Izod impact tests were done on injection molded ASTM specimens cut from tensile bars to have the dimensions of 62 mm×19 mm×3.175 mm. The samples were notched using a notcher to produce a notch depth 10.16±0.05 mm according to ASTM D256. Five specimens of each sample were tested using ASTM D256 at room temperature, 23° C., 0° C., −10° C., −20° C., and −30° C.

Instrumented Dart Impact Strength

The instrumented dart impact was determined according to ASTM D3763. Injection molded 4" disk specimens of each were tested at room temperature, 23° C., 0° C., −10° C., −20° C., and −30° C. A hemispherical dart with a 0.5 inch diameter tip was used in a MTS 819 High Rate Test System equipped with 793 Flex Test GT System Software. Prior to testing, the four inch diameter, 0.125 inch thick specimens were brought to test temperature in a commercial chest freezer accurate to 2° C. Equilibration time in the chest freezer was a minimum of 4 hours. Specimen discs were placed in the center with a 3 inch diameter opening. The grip frame was mounted in a Vemco environmental chamber. The clamped specimen was moved into the fixed dart at a constant velocity of 6.7 m/s. The total energy absorbed by the specimen during the impact was reported. The failed discs were also visually inspected and categorized as a brittle or ductile failure. The average impact energy for five specimens is reported.

EXAMPLES

Examples

General

Catalyst-1 ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[$C_6F_5$)$_4$], substantially as disclosed in U.S. Pat. No. 59,199,883, Ex. 2., are purchased from Boulder Scientific and used without further purification.

CSA-1 (diethylzinc or DEZ) and modified methylalumoxane (MMAO) were purchased from Akzo Nobel and used without further purification. The solvent for the polymerization reactions is a hydrocarbon mixture (SBP 100/140) obtainable from Shell Chemical Company and purified through beds of 13-X molecular sieves prior to use.

All examples except A1, E1, U1 and Y1 have an iPP hard block. Runs B through D have a semi-crystalline, ethylene-propylene soft block containing 60-65 wt % C2 while runs F through H have an amorphous, ethylene-propylene soft block containing 40 wt % C2. With increasing alphabetical letter, the weight fraction and length of the iPP hard block is independently controlled from 30 to 60 weight percent by increasing the production rate in the reactor (in this case, reactor 2).

Examples V1, W1, X1 and Y1, Z1, AA are similar in design to B, C, D but made at different reactor conditions. The effect of higher propylene conversion and reactor temperature will be discussed later.

Examples A1 through AB1 are run with no hydrogen. The CSA concentration in Reactor 1 for all examples is 153 mmol/kg. The MMAO concentration in Reactor 2 for all examples is 6 mmol/kg.

Samples A1-D1

Inventive propylene/ethylene copolymers were prepared using two continuous stirred tank reactors (CSTR) connected in series. Each reactor is hydraulically full and set to operate at steady state conditions. Sample A1 is prepared by flowing monomers, solvent, catalyst-1, cocatalyst-1, and CSA-1 to the first reactor according to the process conditions outlined in Table 1A. To prepare sample B1, the first reactor contents as described in Table 1A were flowed to a second reactor in series. Additional catalyst-1 and cocatalyst-1 were added to the second reactor, as well as a small amount of MMAO as a scavenger. Samples C1 and D1 were prepared by controlling the conditions of the two reactors as described in Table 1A and 1B.

Samples E1-AB1

Each set of diblock samples F1-H1, V1-X1, Y1-AB1 were prepared as above for examples B1-D1 but according to the process conditions outlined in Table 1A and 1B. For each set, a first reactor product (E1, U1, Y1) is prepared targeting the first block composition.

extraction procedure to produce sample B2 (the xylene insoluble fraction) and sample B3 (the xylene soluble fraction).

Table 2 shows the analytical results for runs B1 through AB1. The molecular weight distributions of the polymers are relatively narrow with Mw/Mn's ranging from 2.1-2.3 for

TABLE 1A

First reactor process conditions to produce diblock copolymers B1-D1, F1-H1, V1-X1, Z1-AB1.

| Example | Solvent feed (kg/hr) | Propylene feed (kg/hr) | Ethylene feed (kg/Hr) | Temp °C. | Catalyst conc (mmol/Kg) | Catalyst sol. flow (g/hr) | Cocatalyst conc. (mmol/kg) | Cocatalyst sol. Flow (g/hr) | CSA flow (g/hr) | C3 conversion (%) | Calculated split (%) | Efficiency (gPoly/gM)*10$^{-6}$ |
|---|---|---|---|---|---|---|---|---|---|---|---|---|
| A1§ | 25 | 0.87 | 1.4 | 90 | 0.3 | 47 | 0.36 | 47 | 230 | 91 | 100 | 0.79 |
| B1 | 25 | 0.87 | 1.4 | 90 | 0.3 | 43 | 0.36 | 43 | 222 | 91 | 66.6 | 0.87 |
| C1 | 25 | 0.87 | 1.4 | 90 | 0.3 | 40 | 0.36 | 40 | 222 | 90 | 50 | 0.93 |
| D1 | 17.5 | 0.65 | 1.05 | 90 | 0.3 | 22 | 0.36 | 22 | 165 | 90 | 40 | 1.27 |
| E1§ | 14 | 1.06 | 0.65 | 90 | 0.3 | 14 | 0.36 | 24 | 120 | 90 | 100 | 2.00 |
| F1 | 14 | 1.06 | 0.65 | 91 | 0.3 | 16 | 0.36 | 25 | 120 | 90 | 66.6 | 1.75 |
| G1 | 14 | 1.06 | 0.65 | 92 | 0.3 | 16.5 | 0.36 | 20.1 | 120 | 91 | 50 | 1.70 |
| H1 | 14 | 1.06 | 0.65 | 91 | 0.3 | 20 | 0.36 | 20 | 120 | 90 | 40 | 1.40 |
| U1§ | 17.5 | 0.61 | 1.02 | 91 | 0.3 | 50 | 0.36 | 50 | 162 | 95 | 100 | 0.56 |
| V1 | 17.5 | 0.61 | 1.02 | 90 | 0.3 | 50 | 0.36 | 50 | 160 | 96 | 66.6 | 0.56 |
| W1 | 17.5 | 0.61 | 1.02 | 91 | 0.3 | 52 | 0.36 | 52 | 160 | 96 | 50 | 0.54 |
| X1 | 16.3 | 0.61 | 1.02 | 91 | 0.3 | 52 | 0.36 | 52 | 160 | 95 | 40 | 0.54 |
| Y1§ | 11 | 0.66 | 1.08 | 120 | 0.03 | 140 | 0.036 | 140 | 163 | 91 | 100 | 2.00 |
| Z1 | 11 | 0.66 | 1.02 | 120 | 0.03 | 140 | 0.036 | 140 | 163 | 91 | 66.6 | 2.00 |
| AA1 | 11 | 0.66 | 1.08 | 120 | 0.03 | 140 | 0.036 | 140 | 163 | 91 | 50 | 2.00 |
| AB1 | 11 | 0.66 | 1.08 | 120 | 0.03 | 140 | 0.03 | 140 | 163 | 91 | 40 | 2.00 |

§1$^{st}$ reactor products only

TABLE 1B

Second reactor process conditions to produce diblock copolymers B1-D1, F1-H1, V1-X1, Z1-AB1.

| Example | Solvent feed (kg/hr) | Propylene feed (kg/hr) | Temp °C. | Catalyst conc (mmol/Kg) | Catalyst sol. Flow (g/hr) | Cocatalyst conc. (mmol/kg) | Cocatalyst sol. Flow (g/hr) | MMAO flow (gr/hr) | C3 conversion (%) | Efficiency (gPoly/gM) *10$^{-6}$ |
|---|---|---|---|---|---|---|---|---|---|---|
| A1§ | — | — | — | — | — | — | — | — | — | — |
| B1 | 13 | 1.11 | 90 | 0.3 | 90 | 0.36 | 90 | 45 | 91 | 0.41 |
| C1 | 20 | 2.22 | 90 | 0.3 | 120 | 0.36 | 120 | 50 | 91 | 0.46 |
| D1 | 21 | 2.5 | 90 | 0.3 | 177 | 0.36 | 177 | 50 | 91 | 0.32 |
| E1§ | | | | | | | | | | |
| F1 | 10 | 0.83 | 91 | 0.3 | 24 | 0.36 | 24 | 100 | 91 | 1.11 |
| G1 | 16 | 1.66 | 90.2 | 0.3 | 92 | 0.36 | 92 | 80 | 91 | 0.52 |
| H1 | 21 | 2.5 | 90 | 0.3 | 175 | 0.36 | 175 | 80 | 91 | 0.37 |
| U1§ | | | | | | | | | | |
| V1 | 10 | 0.78 | 90.2 | 0.3 | 90 | 0.36 | 90 | 100 | 96 | 0.30 |
| W1 | 15 | 1.36 | 90.2 | 0.3 | 177 | 0.36 | 177 | 110 | 95 | 0.24 |
| X1 | 20.5 | 2.36 | 90.5 | 0.3 | 260 | 0.36 | 260 | 220 | 95 | 0.22 |
| Y1§ | | | | | | | | | | |
| Z1 | 10 | 0.83 | 120 | 0.03 | 160 | 0.036 | 160 | 100 | 90 | 1.40 |
| AA1 | 11 | 1.66 | 120.1 | 0.03 | 250 | 0.036 | 250 | 100 | 90 | 1.44 |
| AB1 | 16 | 2.5 | 120 | 0.3 | 60 | 0.3 | 60 | 100 | 90 | 0.95 |

§1$^{st}$ reactor products only

Preparation of Fractionated Samples

Two to four grams of polymer is dissolved in 200 ml o-xylene under reflux conditions for 2 hours. The solution is then cooled in a temperature controlled water bath to 25° C. to allow the crystallization of the xylene insoluble fraction. Once the solution is cooled and the insoluble fraction precipitates from the solution, the separation of the xylene soluble fraction from the xylene insoluble fraction is done by filtration through a filter paper. The remaining o-xylene solvent is evaporated from the filtrate. Both xylene soluble (XS) and xylene insoluble (XI) fractions are dried in a vacuum oven at 100° C. for 60 min and then weighed.

For each set of samples, the xylene insoluble fraction is given the number "2" and the xylene soluble fraction the number "3". For example, sample B1 is subjected to the samples B1 through D1, and 2.2-2.8 for samples F1 through H1. For samples V1 through AB1, Mw/Mn's range from 2.1-2.5. For the corresponding xylene insoluble and soluble fractions for each of the runs (designated by the number 2 or 3), the Mw/Mn's range from 2.0 to 2.8.

Table 2 also shows the wt % of isolated PP identified by High Temperature Liquid Chromatography separation. The amount of isolated PP indicates to the amount of PP that is not incorporated into the block copolymer. The weight fraction of isolated PP and the weight fraction of xylene solubles substracted from 1 can be related to the yield of diblock polymer produced.

FIG. 1 shows the DSC melting curve for the B1 sample. The peak at 130° C. corresponds to the iPP "hard" polymer and the broader peak at 30° C. corresponds to the EP "soft"

polymer; the glass transition temperature at −46° C. also corresponds to the EP "soft" polymer containing 64 wt % ethylene ($C_2$).

Figure 2:
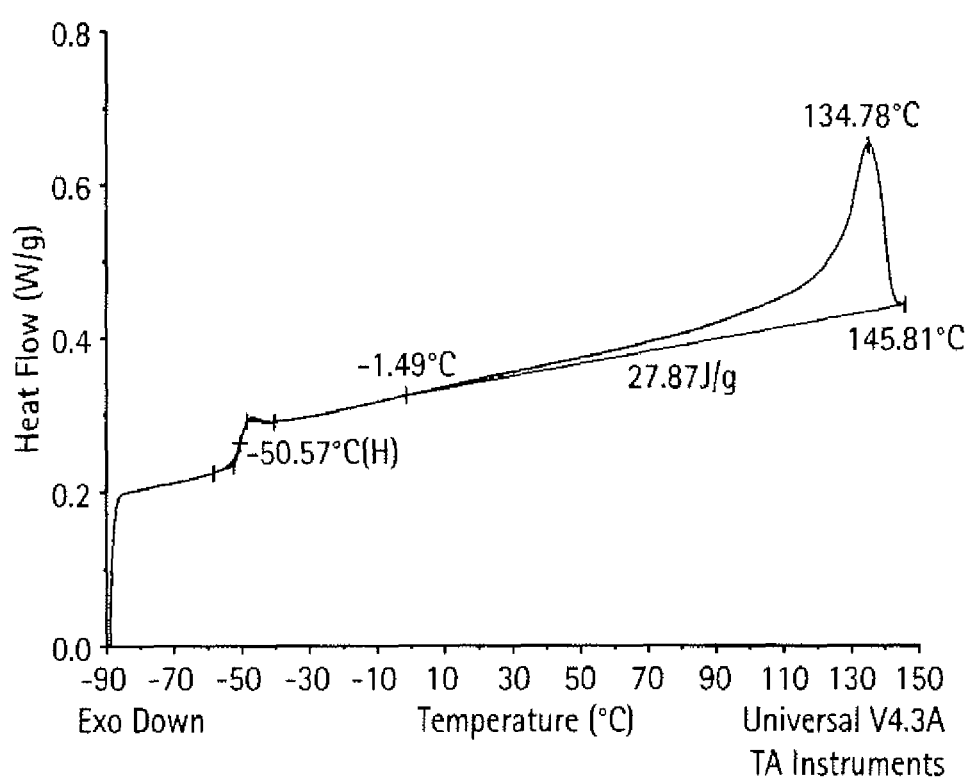
FIG. 2 shows the DSC melting curve for Example F1.

FIG. 2 shows the DSC melting curve for the F1 sample. The peak at 135° C. corresponds to the iPP "hard" polymer and the absence of crystallinity below room temperature corresponds to the EP "soft" polymer containing 40 wt % $C_2$. The −50° C. Tg confirms the presence of the EP "soft" polymer containing 40 wt % $C_2$.

Conversely, the insoluble fraction (designated as number 2) can contain an amount of iPP polymer and iPP-EP diblock. Since the crystallization and elution of the polymer chain is governed by its longest crystallizable propylene sequence, the diblock copolymer will precipitate along with the iPP polymer. This is verified by the NMR and DSC analysis that shows an appreciable, and otherwise unexplainable, amount of ethylene present in the "insoluble" fraction. In a typical separation of an iPP and EP rubber blend, the isotactic PP will

TABLE 2

Analytical Summary Examples B1-AB1 and Fractions

| Example | Wt % from Extraction | Mw Kg/mol | Mw/Mn | Wt % $C_2$ | Tm (° C.) | Tc (° C.) | Melt Enthalpy (J/g) | Tg (° C.) | Wt % PP from HTLC Separation |
|---|---|---|---|---|---|---|---|---|---|
| B1 | NA | 123 | 2.2 | 45 | 130 | 85 | 43 | −46 | 11.8 |
| B2 | 37.8 | 165 | 2.0 | 20.3 | 131 | 93 | 80 | ND | 26 |
| B3 | 62.2 | 124 | 2.1 | 64.4 | 23 | 26.11 | 27 | −49 | <0.1 |
| C1 | NA | 128 | 2.1 | 34 | 134 | 92 | 56 | −57 | — |
| C2 | 50.4 | 243 | 2.8 | 12.4 | 137 | 99 | 83 | ND | — |
| C3 | 49.6 | 136 | 2.1 | 61.1 | 9 | 5 | 26 | −51 | — |
| D1 | NA | 180 | 2.3 | 26 | 138 | 93 | 56 | −49 | 28.1 |
| D2 | 63.3 | 284 | 2.1 | 10.1 | 138 | 100 | 86 | ND | 44.1 |
| D3 | 37.7 | 130 | 2.1 | 61.5 | 11 | 6 | 28 | −51 | <0.1 |
| F1 | NA | 149 | 2.2 | 27 | 135 | 91 | 28 | −50 | 22 |
| F2 | 33.9 | 207 | 2.3 | 8.3 | 137 | 99 | 80 | ND | 49 |
| F3 | 66.1 | 143 | 2.1 | 38.5 | ND | ND | 1.4 | −51 | 0.8 |
| G1 | NA | 210 | 2.5 | 18.2 | 139 | 99 | 49 | −52 | — |
| G2 | 51.9 | 302 | 2.3 | 5.8 | 140 | 102 | 76 | −51 | — |
| G3 | 48.1 | 139 | 2.1 | 39.8 | ND | ND | ND | ND | — |
| H1 | NA | 251 | 2.8 | 14.8 | 141 | 103 | 61 | −53.5 | — |
| H2 | 60.6 | 371 | 2.5 | 4.4 | 142 | 105 | 83.5 | ND | — |
| H3 | 39.4 | 141 | 2.2 | 38.1 | ND | ND | 1.4 | −51 | — |
| V1 | NA | 120 | 2.1 | 45 | 131.1 | 88.3 | 59.3 | −44 | — |
| V2 | 41.7 | — | — | 20.4 | — | — | — | — | — |
| V3 | 58.3 | — | — | 67 | — | — | — | — | — |
| W1 | NA | 148 | 2.1 | 34 | 135.2 | 96.7 | 68.2 | −44.2 | — |
| W2 | 57 | — | — | 15.9 | — | — | — | — | — |
| W3 | 43.0 | — | — | 67.8 | — | — | — | — | — |
| X1 | NA | 198 | 2.5 | 26 | 138.4 | 101.4 | 73.7 | −48.2 | — |
| X2 | 65.5 | — | — | 11.3 | — | — | — | — | — |
| X3 | 34.5 | — | — | 64.1 | — | — | — | — | — |
| Z1 | NA | 114 | 2.2 | 27 | 120.4 | 71.4 | 54.4 | −43.9 | — |
| Z2 | 31.7 | — | — | 18.9 | — | — | — | — | — |
| Z3 | 68.3 | — | — | 65.9 | — | — | — | — | — |
| AA1 | NA | 136 | 2.2 | 20 | 129.6 | 88.8 | 64.1 | −45.3 | — |
| AA2 | 50.7 | — | — | 14.9 | — | — | — | — | — |
| AA3 | 49.3 | — | — | 69 | — | — | — | — | — |
| AB1 | NA | 168 | 2.4 | 15 | 134.7 | 97.6 | 67.9 | −47.5 | — |
| AB2 | 64.4 | — | — | 11.8 | — | — | — | — | — |
| AB3 | 35.6 | — | — | 67.7 | — | — | — | — | — |

Figure 3:
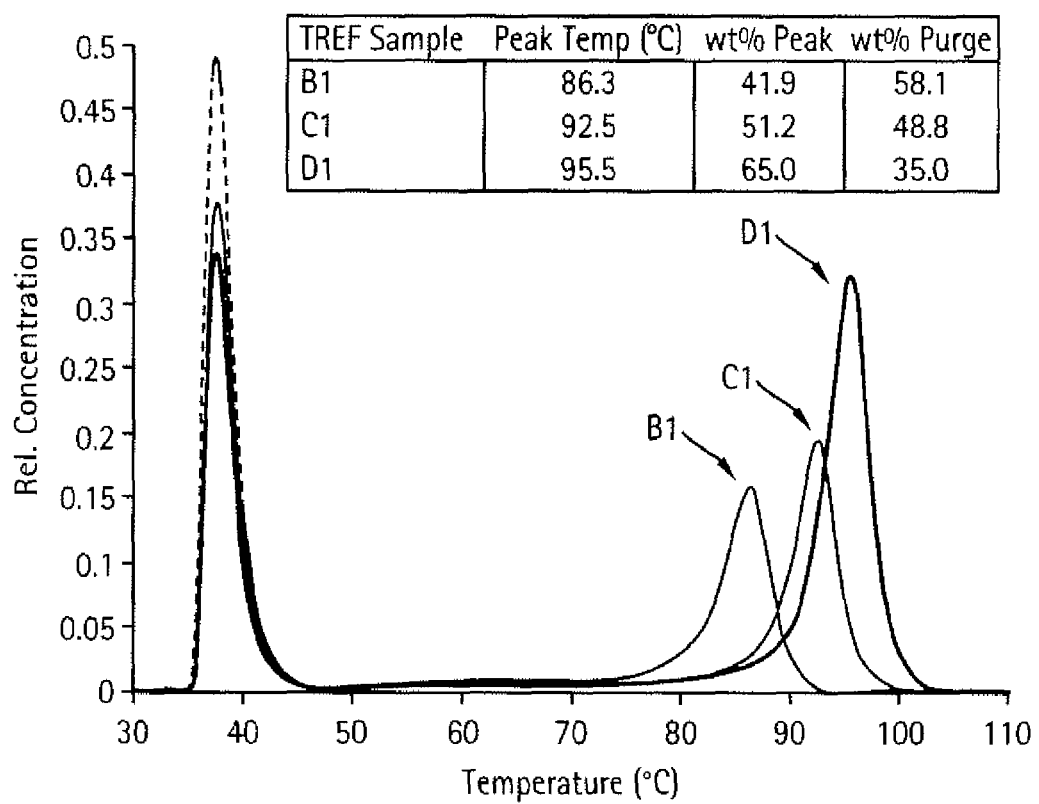
FIG. 3 compares the TREF profiles of Examples B1, C1 and D1.

The presence of block copolymer can alter the crystallization characteristics of a polymer chain if measured by TREF or solution fractionation. FIG. 3 compares the TREF profiles of samples B1 through D1. The TREF profiles are consistent with the DSC results, showing a highly crystalline fraction (elution above 40° C.) and a low crystallinity, soluble fraction (remaining material that elutes at less than 40° C.). The elution temperature increases with the amount of iPP present. An EP block connected to an iPP block may enhance the chains' solubility in the solvent and/or interfere with the crystallization of the iPP block.

Figure 4:
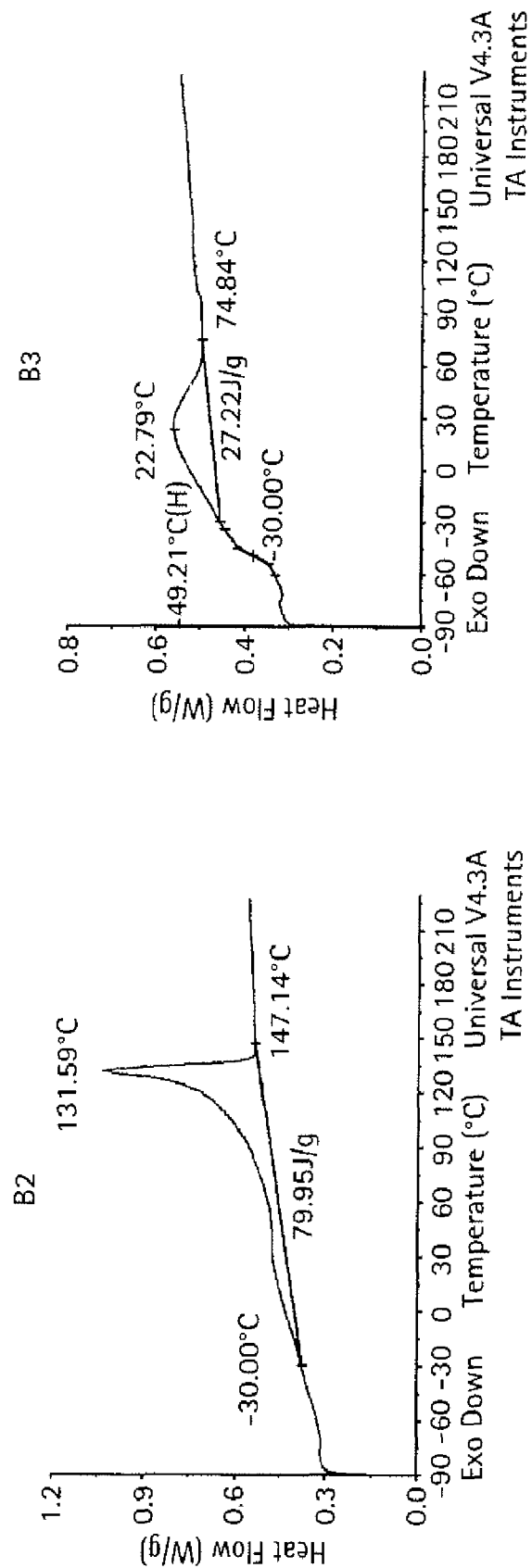
FIG. 4 shows DSC curves of Examples B2 and B3.

FIGS. 4 and 5 show the corresponding DSC curves of the fractions of B2, B3 and F2, F3. In this analysis, the xylene soluble fraction is an estimate of the amount of non-crystallizable soft polymer. For the xylene soluble fractions from samples B1-D1, the weight percent of ethylene is between 61 and 65 wt % ethylene with no detection of residual isotactic propylene. The DSC of the xylene soluble fraction confirms that no high crystallinity polypropylene is present.

be cleanly separated by this analysis. The fact that there is "additional" ethylene present in the insoluble fraction, verifies that a fraction of diblock is present. By accounting for the total mass balance of monomer between the fractions, a block composite index can be estimated.

Another indication of the presence of diblock is the increase in molecular weight of the insoluble fractions with the increasing amount of iPP. As the polymer chains are being coordinatively coupled while passing from the first reactor to the second reactor, it is expected that the molecular weight of the polymer will increase. Table 3 shows that the molecular weight of the soluble fractions remains relatively constant (120-140 kg/mol). This is expected because the reactor conditions to make the EP soft block were unchanged from run to run. However, the molecular weight of the insoluble fractions increases with the increase in production rate of reactor 2, to create longer iPP blocks.

Estimating the Block Composite Index

The inventive examples show that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \%} C_{2_{Overall}} = w_{Insoluble}(\text{wt \%} C_{2_{Insoluble}}) + w_{soluble}(\text{wt \%} C_{2_{soluble}}) \quad \text{Eq. 1}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \%} C_{2_{Overall\ or\ xylene\ insoluble}} = \quad \text{Eq. 2}$$
$$w_{iPPHard}(\text{wt \%} C_{2_{iPP}}) + w_{EP\ soft}(\text{wt \%} C_{2_{EPsoft}})$$

$$w_{iPPhard} = \frac{\text{wt \%} C_{2_{overall\ or\ xyleneinsoluble}} - \text{wt \%} C_{2_{EPsoft}}}{\text{wt \%} C_{2_{iPPhard}} - \text{wt \%} C_{2_{EPsoft}}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. Refer to Table 3 for the estimated ratio of iPP and EP present in the diblock copolymer for all the runs. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

TABLE 3

Block Composite Index Estimations for Examples B1 through AB3

| Sample | wt fraction EP Soft | wt fraction iPP Hard | Block Composite Index |
|---|---|---|---|
| B1 | 0.30 | 0.70 | 0.16 |
| B2 | 0.32 | 0.68 | 0.42 |
| B3 | 0 | 100 | 0 |
| C1 | 0.56 | 0.44 | 0.17 |
| C2 | 0.20 | 0.80 | 0.34 |
| C3 | 0 | 100 | 0 |
| D1 | 0.42 | 0.58 | 0.22 |
| D2 | 0.16 | 0.84 | 0.35 |
| D3 | 0 | 100 | 0 |
| F1 | 0.70 | 0.30 | 0.10 |
| F2 | 0.22 | 0.78 | 0.29 |
| F3 | 0 | 100 | 0 |
| G1 | 0.46 | 0.54 | 0.15 |
| G2 | 0.15 | 0.85 | 0.29 |
| G3 | 0 | 100 | 0 |
| H1 | 0.39 | 0.61 | 0.18 |
| H2 | 0.12 | 0.88 | 0.29 |
| H3 | 0 | 100 | 0 |
| V1 | 0.67 | 0.33 | 0.18 |
| V2 | 0.30 | 0.70 | 0.43 |
| V3 | 0 | 100 | 0 |
| W1 | 0.50 | 0.50 | 0.24 |
| W2 | 0.23 | 0.77 | 0.42 |
| W3 | 0 | 100 | 0 |
| X1 | 0.41 | 0.59 | 0.25 |
| X2 | 0.18 | 0.82 | 0.39 |
| X3 | 0 | 100 | 0 |
| Z1 | 0.41 | 0.59 | 0.12 |
| Z2 | 0.29 | 0.71 | 0.38 |
| Z3 | 0 | 100 | 0 |
| AA1 | 0.29 | 0.71 | 0.18 |
| AA2 | 0.22 | 0.78 | 0.35 |
| AA3 | 0 | 100 | 0 |
| AB1 | 0.22 | 0.78 | 0.24 |
| AB2 | 0.17 | 0.83 | 0.38 |
| AB3 | 0 | 100 | 0 |

For example, if an inventive iPP-EP polymer contains an overall of 47 wt % $C_2$ and is made under the conditions to produce an EP soft polymer with 67 wt % $C_2$ and an iPP homopolymer containing zero ethylene, the amount of EP soft and iPP hard is 70 wt % and 30 wt %, respectively (as calculated using Equations 3 and 4). If the percent of EP is 70 wt % and the iPP is 30 wt %, the relative ratio of the EP:iPP blocks could be expressed as 2.33:1.

Hence, if one skilled in the art, carries out a xylene extraction of the polymer and recovers 40 wt % insoluble and 60 wt % soluble, this would be an unexpected result and this would lead to the conclusion that a fraction of inventive block copolymer was present. If the ethylene content of the insoluble fraction is subsequently measured to be 25 wt % $C_2$, Equations 2 thru 4 can be solved to account for this additional ethylene and result in 37.3 wt % EP soft polymer and 62.7 wt % iPP hard polymer present in the insoluble fraction.

Since the insoluble fraction contains 37.3 wt % EP copolymer, it should be attached to an additional 16 wt % of iPP polymer based on the EP:iPP block ratio of 2.33:1. This brings the estimated amount of diblock in the insoluble fraction to be 53.3 wt %. For the entire polymer (unfractionated), the composition is described as 21.3 wt % iPP-EP Diblock, 18.7 wt % iPP polymer, and 60 wt % EP polymer. As the compositions of these polymers are novel, the term block composite index (BCI) is herein defined to equal the weight percentage of diblock divided by 100% (i.e. weight fraction). The value of the block composite index can range from 0 to 1, wherein 1 would be equal to 100% inventive diblock and zero would be for a material such as a traditional blend or random copolymer. For the example described above, the block composite index for the block composite is 0.213. For the insoluble fraction, the BCI is 0.533, and for the soluble fraction the BCI is assigned a value of zero.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EP polymer chain must be connected to an iPP polymer block (or else it would have been extracted into the xylene soluble fraction).

More specifically, example H1, contains an overall of 14.8 wt % $C_2$ and the weight % C2 in the xylene solubles (H3) was measured to be 38.1 wt % (as a representation of the composition of the EP soft polymer) and an iPP homopolymer containing zero ethylene, the amount of EP soft and iPP hard is 61 wt % and 39 wt %, respectively (as calculated using Equations 3 and 4). If the percent of EP is 61 wt % and the iPP is 39 wt %, the relative ratio of the EP:iPP blocks could be expressed as 1.56:1.

After xylene extraction of the H1 polymer, 60.6 wt % insoluble (H2) and 39.4 wt % soluble (B3) polymer was recovered. The B2 insoluble fraction is subsequently measured to have 4.4 wt % $C_2$, Equations 2 thru 4 can be solved to account for this additional ethylene and result in 11.5 wt % EP soft polymer and 88.5 wt % iPP hard polymer.

Since the insoluble fraction contains 11.5 wt % EP copolymer, it should be attached to an additional 7.35 wt % of iPP polymer based on the EP:iPP block ratio of 1.56:1. This brings the estimated amount of diblock in the insoluble fraction to be 29.6 wt %. For the entire polymer (unfractionated), the composition is described as 18 wt % iPP-EP Diblock, 42.6 wt % iPP polymer, and 39.4 wt % EP polymer. For this H1 example described above, the block composite index for the block composite is 0.18. For the insoluble fraction (H2), the BCI is 0.29, and for the H3 soluble fraction the BCI is assigned a value of zero.

Figure 6:
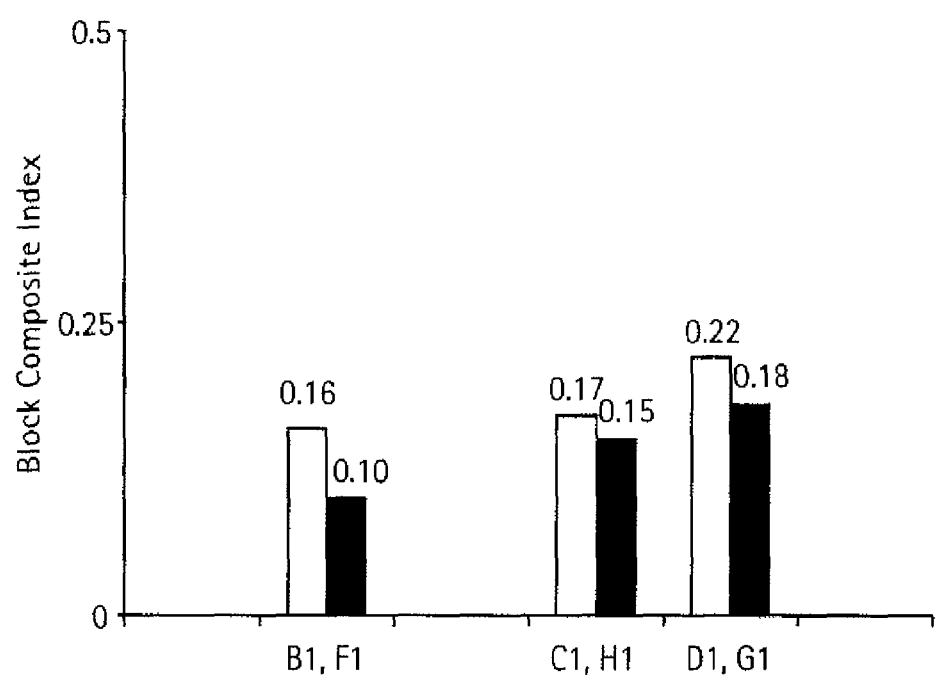
FIG. 6 shows Block Composite Index for Examples B1, F1, C1, H1, D1 and G1.

Table 3 and FIG. 6 show the block composite indices for runs B1 through AB1. For runs B1, C1, and D1, the BCI values are 0.16, 0.17, and 0.22, respectively. For the associated xylene insoluble fractions, fractions B2, C2, D2, the BCI values are 0.42, 0.34, and, 0.35, respectively. For runs F1, G1, and H1, the BCI values are 0.10, 0.15, and 0.18, respectively. For the associated xylene insoluble fractions, fractions F2, G2, H2, the BCI values are 0.29, 0.29, and, 0.29, respectively.

Figure 7:
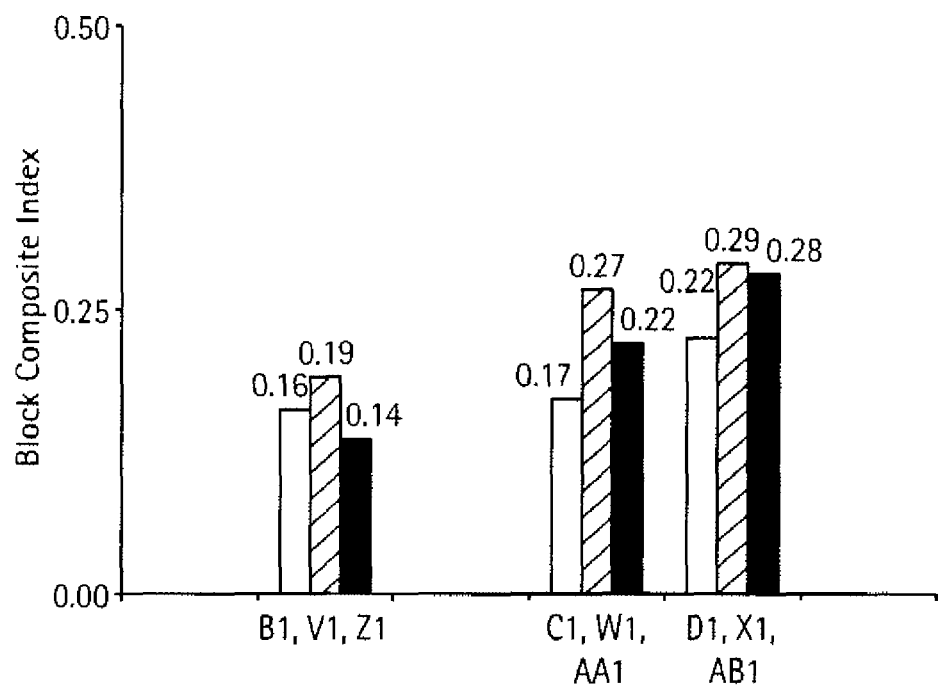
FIG. 7 shows Block Composite Index for Examples B1, V1, Z1, C1, W1, AA1, D1, X1, and AB1.

Table 3 and FIG. 7 show for runs V1, W1, X1, increasing the propylene reactor conversion from 90 to 95% increases the BCI by 0.03 to 0.09 to result in BCI values of 0.18, 0.24, and 0.25.

Table 3 and FIG. 7 show for runs Z1, AA1, AB1 increasing the reactor temperature from 90 to 120° C. resulted in BCI values of 0.12, 0.18, and 0.24, respectively.

Dynamic Mechanical Analysis

Figure 8:
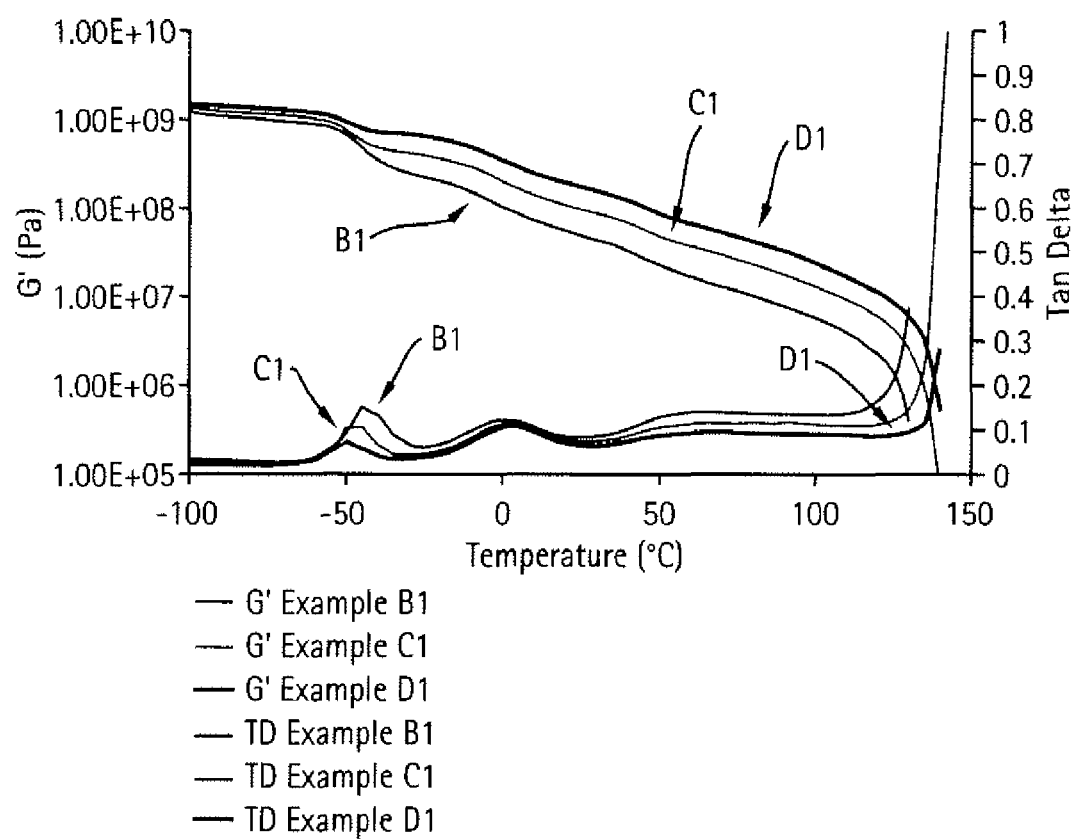
FIG. 8 shows Dynamic Mechanical Analysis of Examples B1, C1 and D1.

FIG. 8 shows the dynamic mechanical properties of samples B1 through D1; shown is the G' and Tan delta values versus temperature. By increasing the amount of iPP, the G' modulus increases and the high temperature plateau is extended. Sample D1 shows that the modulus decreases with increasing temperature up to about 140° C. before completely softening after its melting transition.

For each sample, the tan delta curve shows a characteristic Tg between −48 to −50° C. for the ethylene-propylene copolymer and a second Tg at about 0° C. from the isotactic polypropylene. Above 50° C., the tan delta response remains constant until melting begins and the modulus decreases rapidly.

Figure 9:
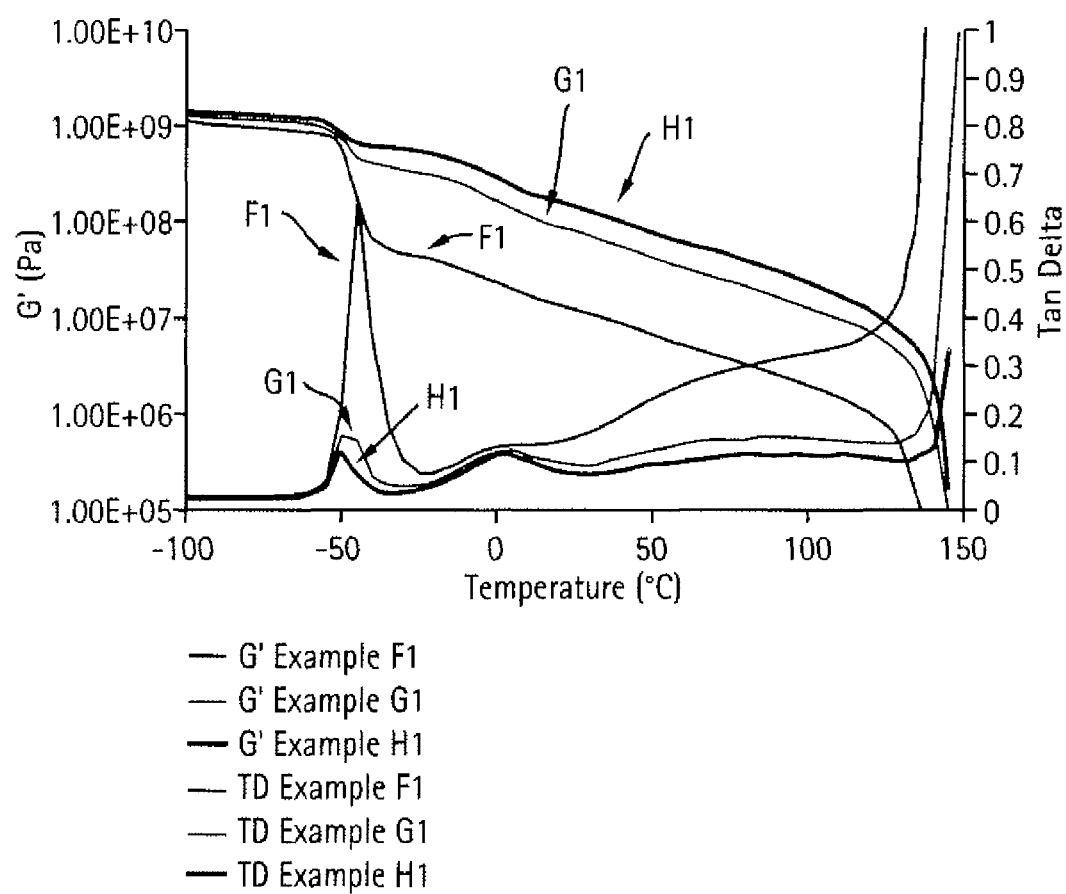
FIG. 9 shows Dynamic Mechanical Analysis of Examples F1, G1 and H1.

FIG. 9 shows the dynamic mechanical properties of samples F1 through H1; shown are the G' and Tan delta values versus temperature. Similar to the 65 wt % $C_2$ case, by increasing the amount of iPP, the G' modulus increases and the high temperature plateau is extended. Sample H1 shows that the modulus decreases with increasing temperature up to about 140° C. before completely softening after its melting transition.

The tan delta curves for these samples, also show a characteristic Tg between −48 to −50° C. for the ethylene-propylene copolymer and a second Tg about 0° C. relating to the isotactic polypropylene. Above 50° C., the tan delta response remains constant for samples G1 & H1 until melting begins and the modulus decreases rapidly.

Morphology Discussion

Figure 10:
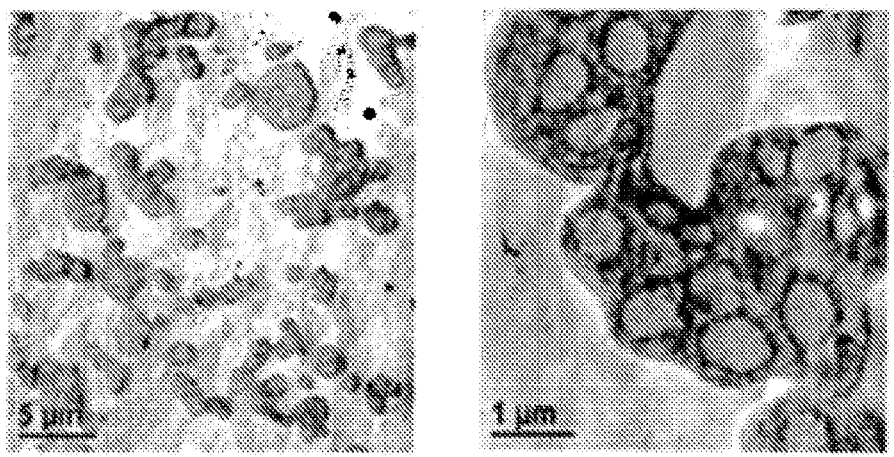
FIG. 10 shows a TEM Micrograph of Profax Ultra SG853 Polypropylene Impact Copolymer at 5 µm and 1 µm scales.

The samples are analyzed by TEM to observe the influence of the diblock on the overall iPP/EPR rubber morphology. FIG. 10 shows the TEM image of ProFax Ultra SG853 impact copolymer (LyondellBasell Polyolefins) consisting of an isotactic PP continuous phase and 17 wt % rubber phase, containing 58 wt % $C_2$ in the rubber.

The TEM micrograph shown at the 5 µm scale, shows large EPR domains ranging from 2-5 µm.

At 1 µm magnification, the EPR domain has a heterogeneous composition distribution of ethylene and propylene as shown from the dark and light colored domains present within the particle. This is a classical example of a dispersed morphology containing two phases (iPP and EP rubber) that are immiscible with each other.

Figure 11:
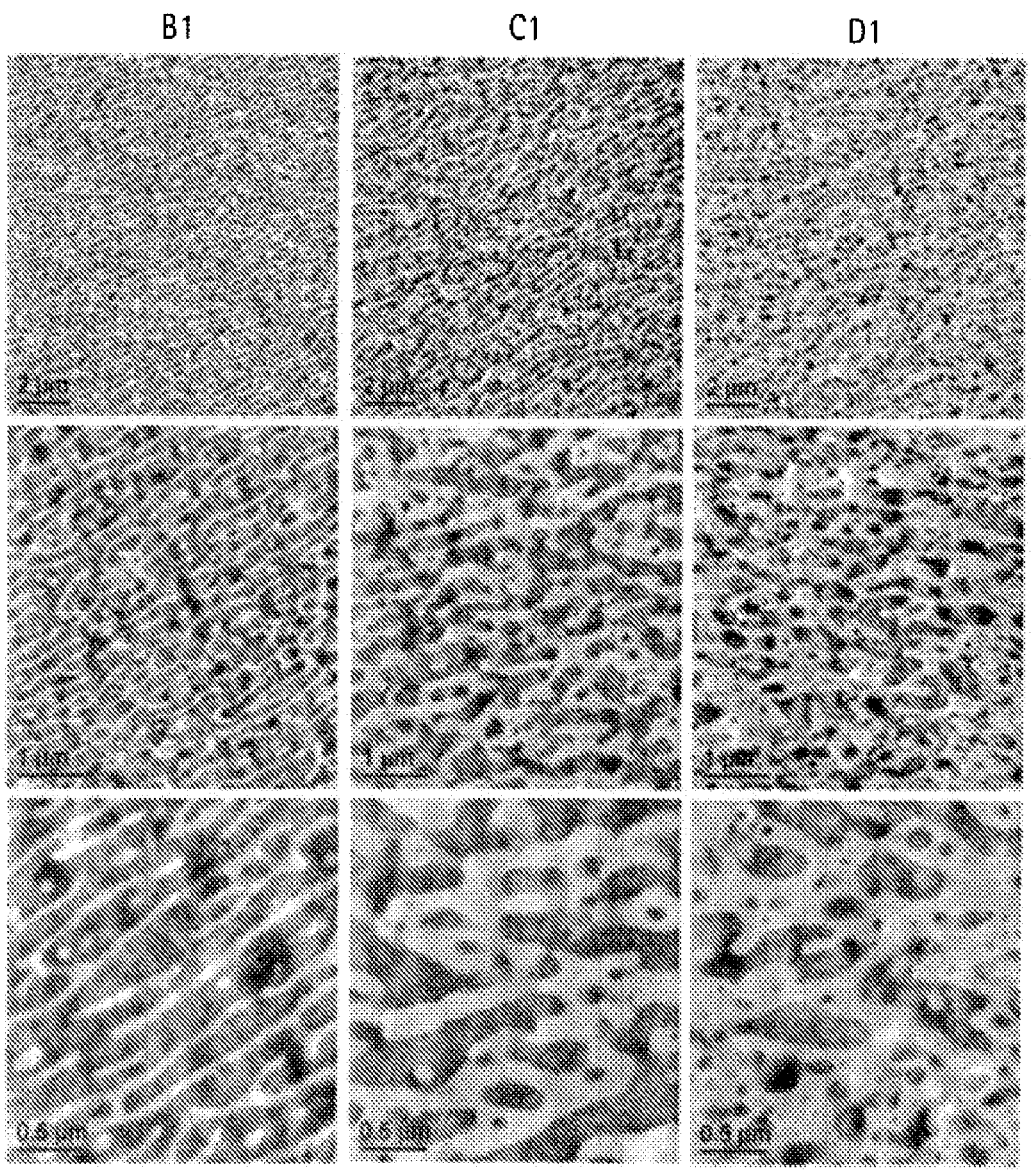
FIG. 11 shows TEM Micrographs of Examples B1, C1 and D1 at 2 µm, 1 µm and 0.5 µm scales.

FIG. 11 shows the TEM micrographs of compression molded films of B1, C1, and D1 at the 2, 1, and 0.5 µm scale. In stark contrast to the image from the impact copolymer, all three polymers show a finer dispersion of particles with very small domains. For B1, a continuous EPR phase is observed along with elongated PP domains on the order of 80-100 nm in width. For C1, a mixed continuity between the iPP and EPR phases was observed with domain sizes on the 200-250 nm. For D1, a PP continuous phase is observed along with spherical and some elongated EPR domains on the size 150-300 nm.

Figure 12:
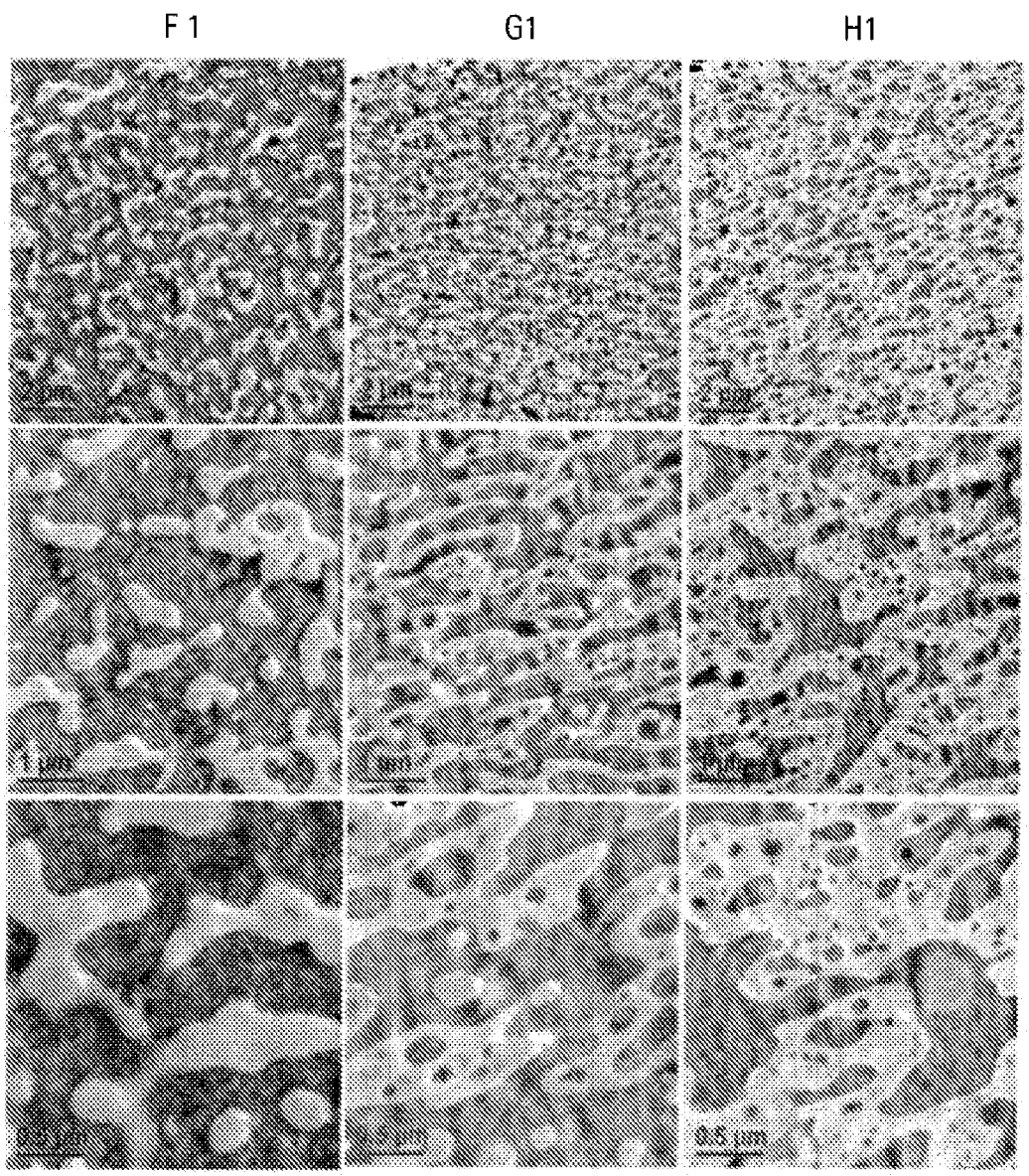
FIG. 12 shows TEM Micrographs of Examples F1, G1 and H1 at 2 µm, 1 µm and 0.5 µm scales.

FIG. 12 shows the TEM micrographs of compression molded films of F1, G1, and H1 at the 2, 1, and 0.5 µm scale. In stark contrast to the image from the impact copolymer, all three polymers show a finer dispersion of particles with very small domains. For F1, a continuous EPR phase is observed along with elongated PP domains on the order of 200-400 nm in width. For C1, a mixed continuity between the iPP and EPR phases was observed with domain sizes on the 200-300 nm. For H1, a PP continuous phase is observed along with spherical and some elongated EPR domains on the size 150-300 nm.

It is surprising to observe such well-dispersed and small domains as shown in these micrographs from polymers that were compression molded from pellets. Normally to get a fine morphology (not near the scales shown here), specialized extrusion and compounding histories are required. Even if the size scales are approached using blending, the morphologies may not be stable; phase coarsening and agglomeration can occur with the thermal aging, as shown by the impact copolymer in which the rubber domains are elongated and some of them chain-linked together.

The morphology of the diblock copolymer was further investigated by examining the polymer fractions obtained from xylene fractionation. As explained above, the insoluble fraction contains iPP-EP diblock and free iPP homopolymer while the soluble fraction contains, the non-crystallizable EP rubber.

Figure 13:
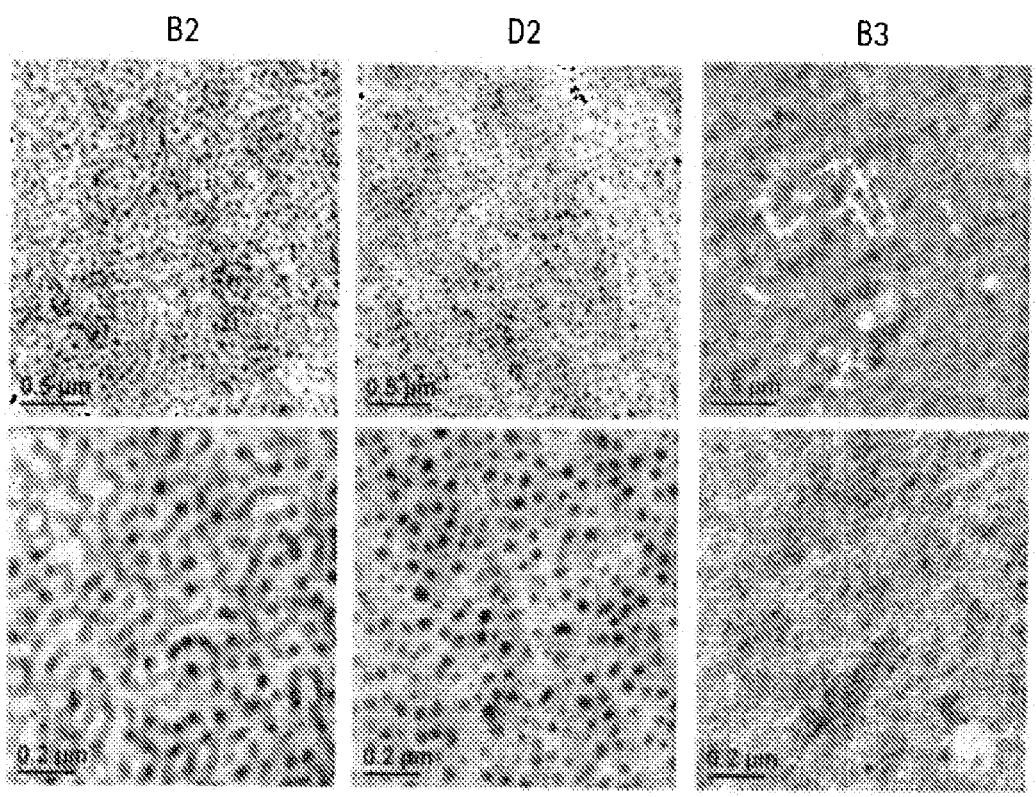
FIG. 13 shows TEM micrographs of Examples B2, D2 and B3 at 0.5 µm and 0.2 µm scales.

FIG. 13 shows the TEM micrographs of the insoluble fractions from B1 and D1 and also the soluble fraction from B1. Remarkably, the morphology observed in the insoluble fraction is even finer and more distinct than that of the whole polymer. The B1 insoluble fraction shows a mixture of worm-like and spherical EPR domains, on the size-scale of 50 nm in width. The D1 insoluble fraction shows small spherical domains that are also about 50 nm in diameter. For reference, the B1 xylene soluble fraction shows the typical granular lamellar structure that is expected of an EP elastomer containing 65 wt % $C_2$. Again, the morphologies of the insoluble fractions are distinct and appear to be microphase separated.

Figure 14:
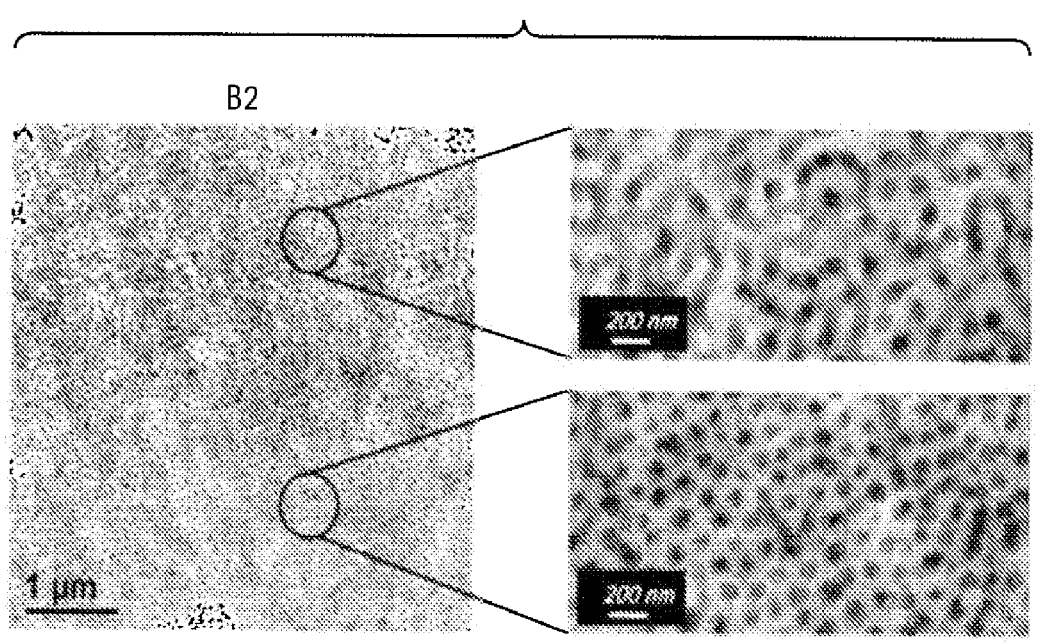
FIG. 14 shows Example B2 at 1 µm and 200 nm scales.
Figure 15:
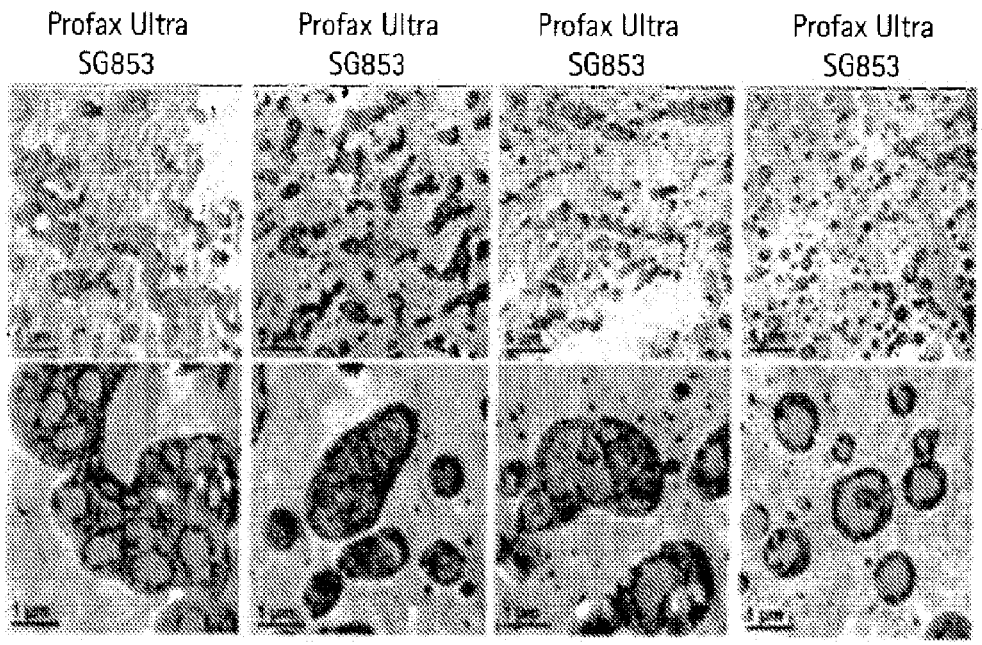
FIG. 15 shows TEM comparisons of Profax UltraSG853 modified with Examples D2 and C2.

It is interesting to compare the TEM micrographs of the B1 insoluble fraction, FIG. 15, to that of an sPP-EP-sPP triblock containing 71 wt % sPP, such as that shown in FIG. 7 of Macromolecules, Vol. 38, No. 3, page 857, 2005. In this figure, the sPP-EP-sPP triblock was produced via anionic polymerization and the micrograph is from a film annealed at 160° C. for over one week. The sample was annealed in the melt for a total of 8 days—the first 4 days at 200° C. to erase any previous thermal history and then an additional 4 days at a final temperature 160° C. High-vacuum ovens ($<10^{-7}$ mbar) were used to prevent degradation by oxidation. Melt morphology was preserved by quickly quenching the samples after annealing. The authors of the article associate the phase separated microstructure to hexagonally packed cylinders. Although the B1 insoluble fraction is prepared from a compression molded film that is fast quenched, the morphology resembles that of an ordered structure perhaps with some hexagonally packed cylinders (FIG. 14).

Preferably, compositions of polypropylene, an elastomer and the block composite show a reduction in particle size of the dispersed phase greater than 50% when compared to the particle size of the blend of PP and elastomer alone, more preferably greater than 100%. Also, preferably, the compositions show a reduction in particle size to less than 0.5 µm, preferably less than 300 nm, more preferably 200 nm, and even more preferably 100 nm.

Impact Modification Studies

For this study, the xylene insoluble polymer fractions from the relevant Examples were used in order to determine BCI present in the fractions. Table 3 shows the analytical properties of the xylene insoluble (XI) fractions that were used in this study. ProFax Ultra SG853 impact copolymer (ICP) (LyondellBasell Polyolefins) (55MFR, 16.8 wt % EP rubber, 58 wt % $C_2$ in EPR) was used for the majority component in the blends. Comparative A is a random propylene/ethylene copolymer (2MFR, 15 wt % $C_2$, density 0.863 g/mL, Tg –30° C.). The inventive polymer fractions B2 and D2 and Comparative A are added at the 2, 6, and 10 wt % level based on total weight of polymer. The blends were prepared on a Haake Minilab II that is a recirculating twin screw extruder (TSE) with a 5 gram capacity. The materials were blended together at 190° C. for 8 min. The samples were then subsequently compression molded and submitted for TEM imaging.

Figure 16:
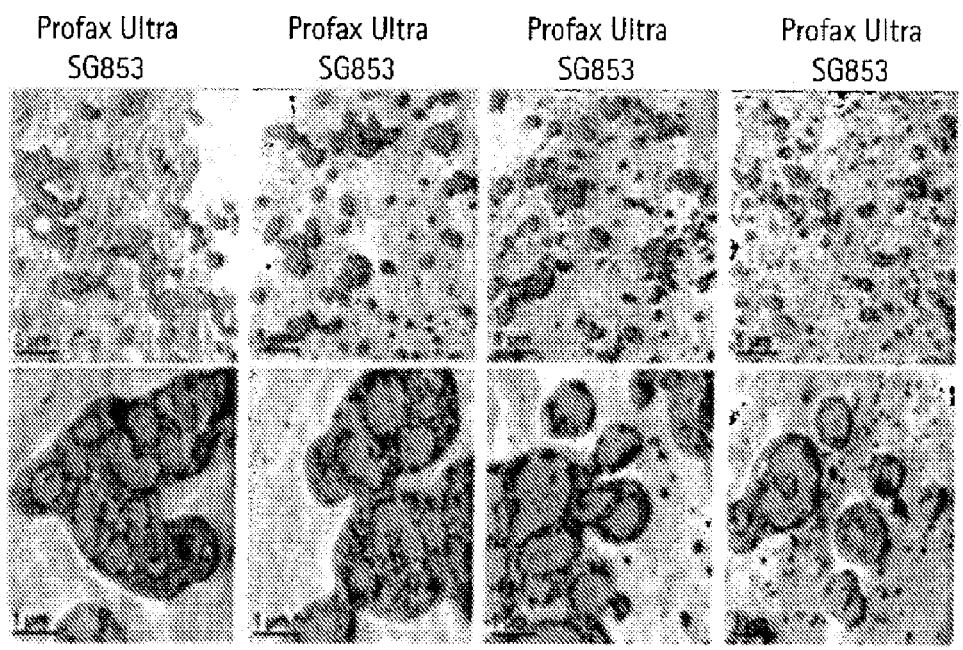
FIG. 16 shows TEM comparisons of Profax Ultra SG853 modified with Example B2.

FIGS. 15 and 16 show a comparison of TEM images of the ICP blended with the D2 fraction and B2 fraction. The micrographs clearly show a PP continuous phase (light colored phase) and a dispersed rubber phase (dark colored). When viewing the micrographs from left to right, it may be seen that size and dispersion of the rubber domains decrease dramatically with the increasing concentration of the D2 or the B2 fraction.

Beginning with the ICP alone, the rubber domains are approximately 5 µm in size and show evidence of coalescence and agglomeration. As the concentration of Example D2 was increased from 2 to 10%, the size of the rubber domains decreased to less than 1 The micrographs clearly show that by increasing the amount of Example D2, the rubber size distribution becomes narrower, and the rubber particles are better dispersed and more spherical with little evidence of agglomeration. Uniquely, at the 1 µm scale, a bimodal size population of rubber domains was observed; both micro (less than 100 nm) domains and macro (1-5 µm). It is believed that the domains less than 100 nm in size can be attributed to the iPP-EP diblock while the larger domains are from the ICP. It is apparent that the iPP-EP diblock is effective in compatibilizing the rubber domains from the ICP.

Comparing Example D2 and Example B2, B2 appears to be less effective in dispersing and reducing the size of the particles. While the effect is consistent with reducing the size of the rubber domains, some agglomeration and non-spherical domains are observed even at the 10% level. The differences in effectiveness observed between Examples D2 and B2 suggest that the amount of the iPP block present also contributes to the compatibilization. Example D2 contains almost equal amounts of iPP and EP while Example B2 contains smaller iPP blocks (30% of the total length).

The observed reduction in particle size is consistent with the compatibilization of the PP matrix and rubber domains by the iPP-EP diblock. The iPP-EP diblock reduces the interfacial energy between the two distinct phases and promotes particle break-up and a finer equilibrium morphology.

Example D2 and B2 polymer fractions have a BCI of 0.35 and 0.42, with the balance being iPP homopolymer. Therefore, at the 10% level of addition, the estimated amount of diblock added for Examples D2 and B2 is only 3.5 and 4.2%, respectively.

The fact that the morphology of the rubber dispersion is significantly impacted at these low levels, suggests that the diblock is acting as a true compatibilizer and is ultra-efficient at dispersing the rubber.

Figure 17:
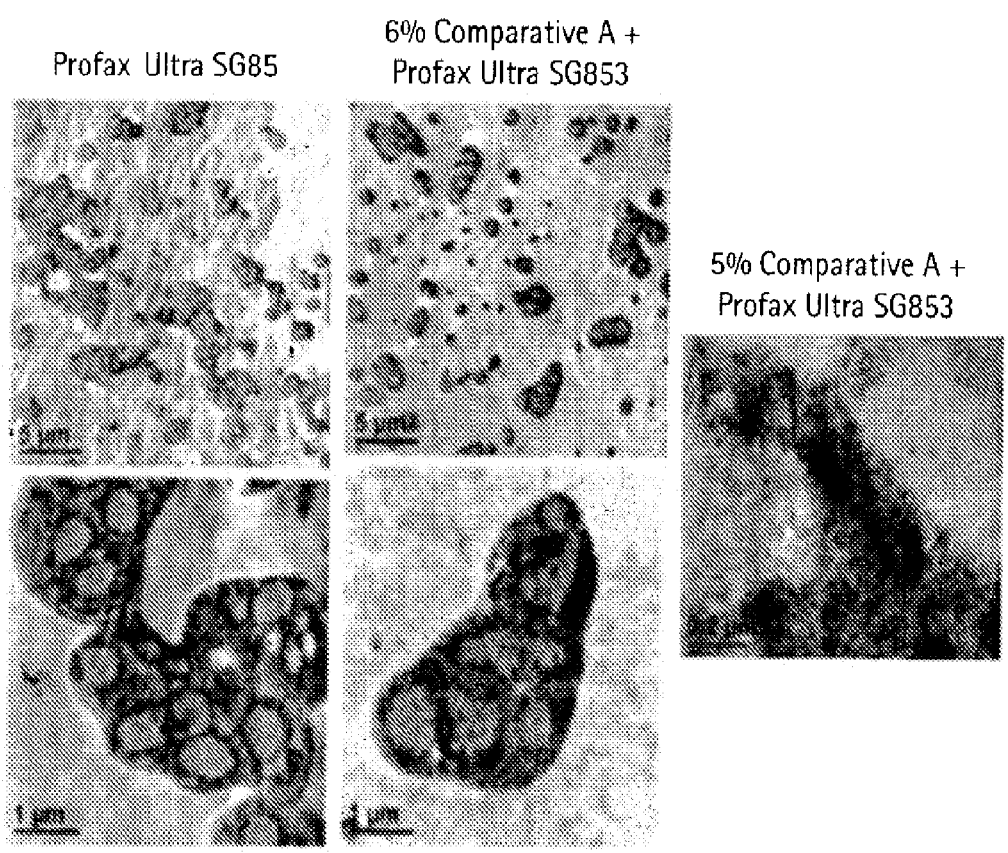
FIG. 17 shows TEM comparisons of Profax Ultra SG853 unmodified and modified with Comparative Example A.

As a control to the observed results, a blend of Comparative A with the ICP was also made. FIG. 17 shows that Comparative A added at the 6% level can also have some influence on the observed rubber morphology. Some of the particles are reduced to the submicron level but a mixture of large and small particles, as well as some agglomeration of the rubber domains is still observed. However, in addition to the reduction in the size of the rubber domains, the iPP matrix showed evidence of "dirty lamellae" which is defined as the intermixing of the P/E rubber domains and the iPP matrix. This is observed with the darkened pattern of the PP matrix; the alternating light and dark regions in the micrograph suggest that the P/E domains are miscible with the PP and result in plasticization/weakening of the PP matrix. The modulus of this sample would be predicted to be lower for this sample as compared to the inventive samples.

Figure 18:
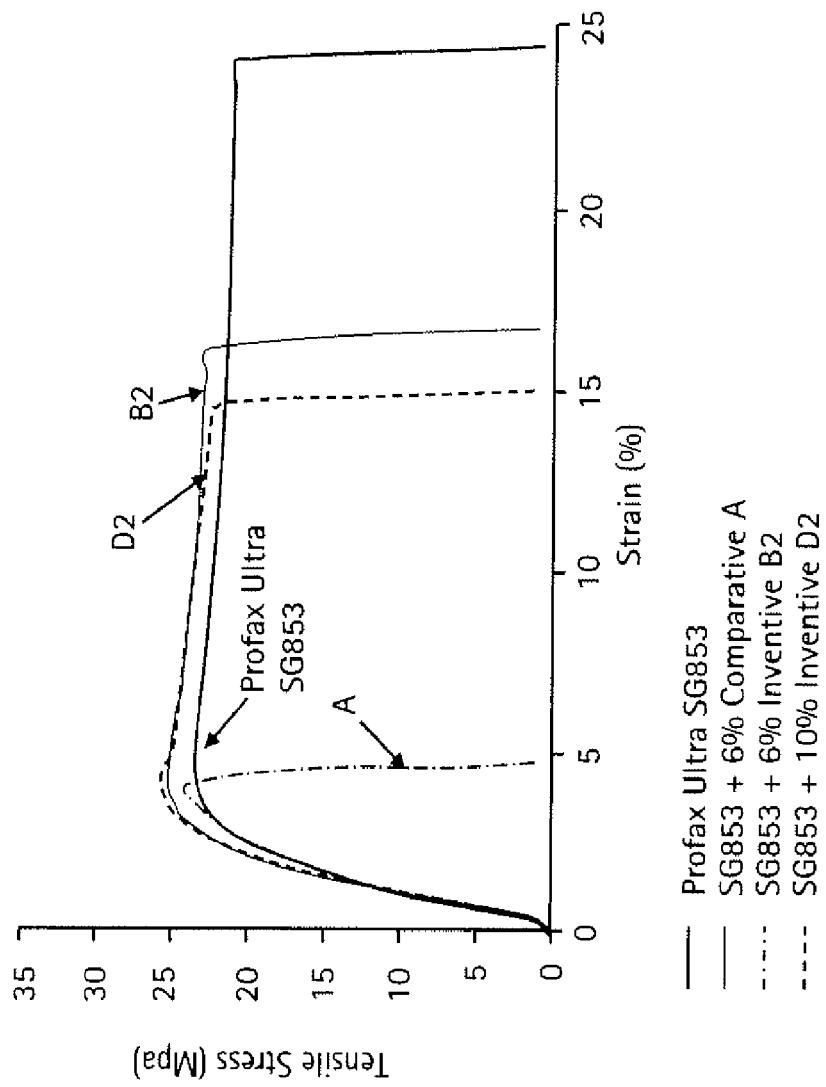
FIG. 18 shows stress-strain curves of Profax Ultra SG853 unmodified and modified with Comparative Example A, Example B2 and Example D2.
Figure 19:
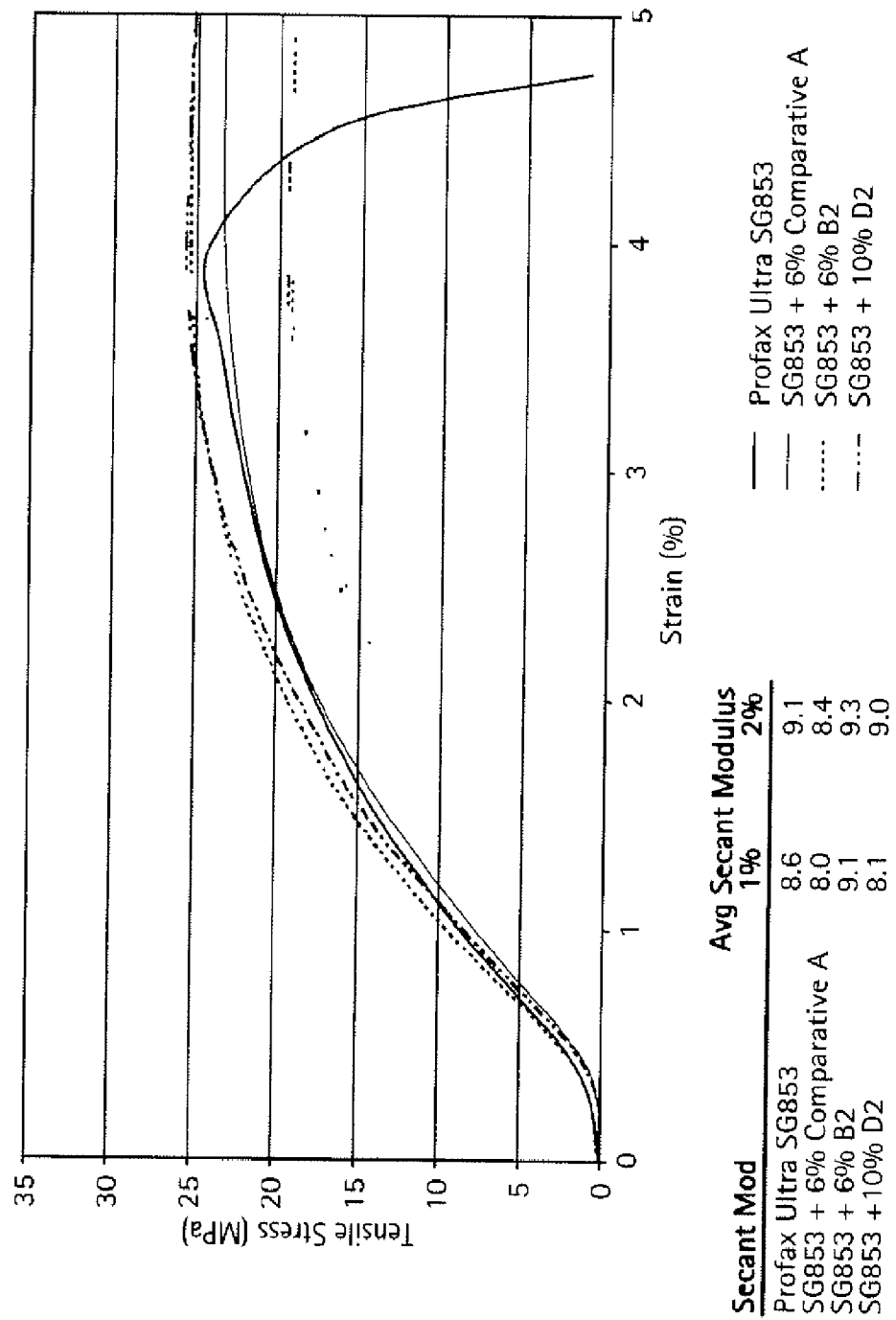
FIG. 19 shows stress-strain curves of Profax Ultra SG853 unmodified and modified with Comparative Example A, Example B2 and Example D2 from 0-5% Strain.

FIGS. 18 and 19 show the stress vs. strain curves from the microtensile testing of some of the compression molded films. FIG. 18 shows the full curve up to the ultimate breaking point while FIG. 19 shows the strain in the initial region. All of the samples showed a high modulus indicative of their high PP content. At the 2% modulus, it is shown that the ICP and the blends with the diblock have a similar modulus while the blend with Comparative A shows a slightly lower modulus.

Figure 20:
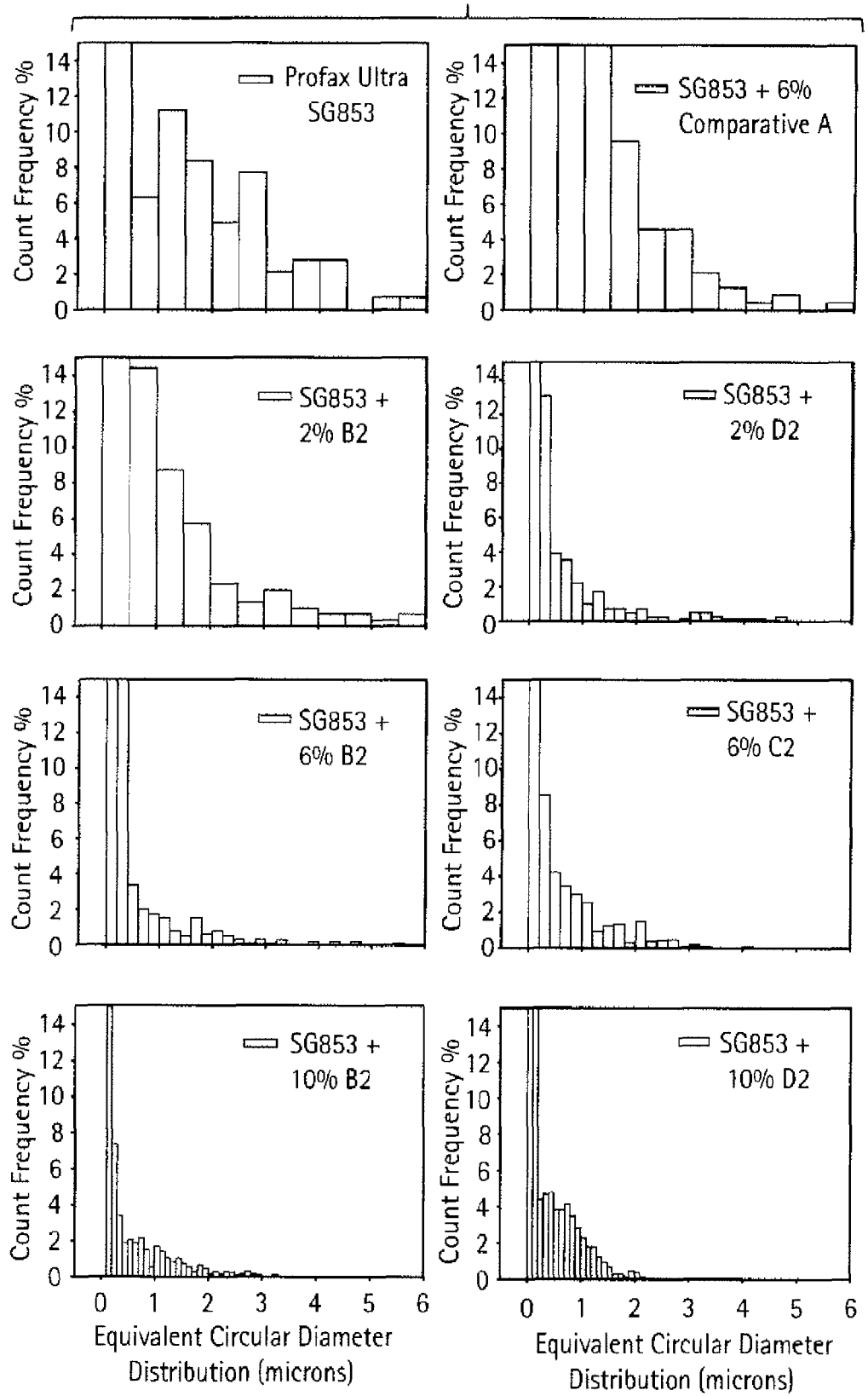
FIG. 20 shows the Particle Size Distribution plots for Profax Ultra SG853 unmodified and modified with varying amounts of Examples B2 and D2.

FIG. 20 compares the particle size distributions of the blends containing the ICP, Examples B2, C2 and D2 as well as Comparative A. Note that the particle sizes are reported as equivalent circular diameters as many of the particles have oblong shapes. The ICP and blend with 6% Comparative A both show very broad particle size distributions with particles up to 6 μm. With the addition of either D2 or B2, the particle size distribution becomes narrower with the increasing amount of compatibilizer. For the blends with D2 or B2, as the level of each compatibilizer increased, the population of large size particles between 2-6 μm were reduced or eliminated. Comparing the blends with B2 versus D2, D2 shows the most dramatic reduction in the particle size distribution; the particles have all been reduced to be less than 2 μm. A high population of tiny particles that are below 100 nm are also observed, as evidenced by the tall spike below 1 μm. This tall spike accounts for the tiny black specs or nanodomains from the iPP-EP block copolymers.

But based on these findings, only 3-5% of pure iPP-EP diblock may be used to compatibilize a PP/EP rubber blend.

High Clarity Impact PP

The nanoscale size of the rubber domains for the inventive blends are unprecedented for a typical PP/elastomer blend and are smaller than the wavelengths of visible light (400-700 nm). Blends of 75% PP homopolymer (D221.00, 35MFR hPP (The Dow Chemical Company)) and 25% of the xylene insoluble fractions containing iPP-EP diblock and iPP homopolymer were made and tested for their optical and physical properties. For comparison, control blends with Comparative B, an ethylene/octene elastomer (ENGAGE™ 8150 (The Dow Chemical Company), MI 0.5, density 0.868 g/cc) and Comparative A were included also. Table 4 shows the properties of these polymers. Table 5 shows the properties of the diblock fractions, Examples F2 and H2.

The blends were prepared on a Haake Minilab II that is a recirculating TSE with a 5 gram capacity and then compression molded into films for optical measurements, TEM morphology, tensile properties, and dynamic mechanical analysis. The materials were blended together at 190° C. for 8 min.

TABLE 4

Properties of D221.00, Comparative B and Comparative A.

| Example | Density (g/cc) | MFR or MI | Total wt % C$_2$ (NMR) | Tm (° C.) | Tc (° C.) | Heat of Fusion (J/g) | Tg (° C.) |
|---|---|---|---|---|---|---|---|
| D221.00 PP | 0.900 | 35 | 0 | 161 | 122 | 80 | 0 |
| Comparative A | 0.863 | 2 | 15 | — | — | — | −30 |
| Comparative B | 0.865 | 0.5 | 64.5 | 58 | 45 | 47.3 | −50 |

Film Transmission/Clarity/Haze Data

Figure 21:
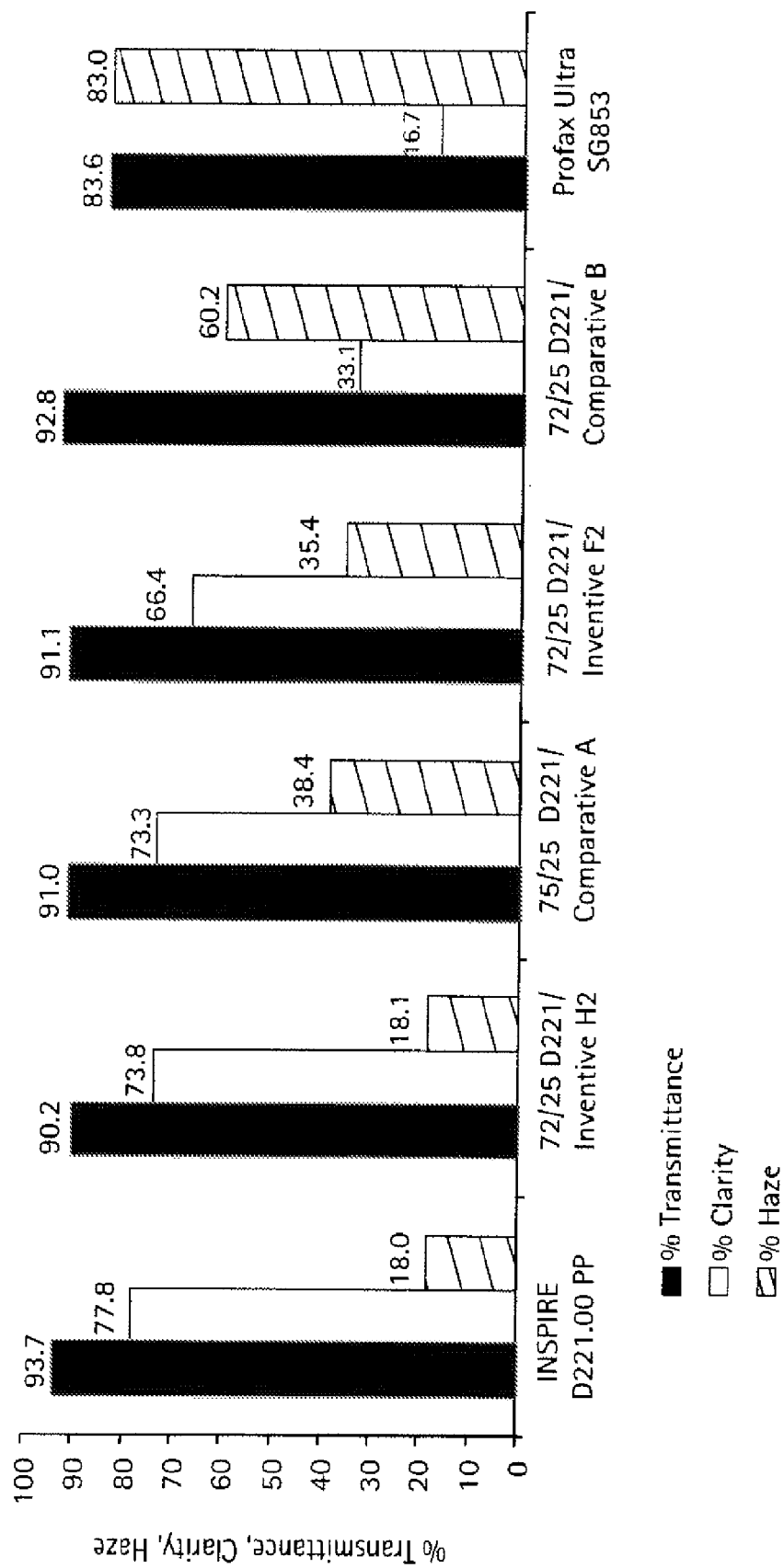
FIG. 21 shows Transmittance, Clarity and Haze for INSPIRE D221, unmodified and modified with Examples H2 and F2, and Comparative Examples A and B, and for Profax Ultra SG853.

Table 6 and FIG. 21 show the transmittance, clarity, and haze measurements for the blended PP films with Examples F2 and H2. The PP homopolymer and the PP/elastomer blends show similar light transmittance between 90-94%. The PP homopolymer exhibit a baseline of 78% clarity and 18% haze. Remarkably, the blend with Example H2 exhibits 74% clarity and 18% haze, similar to that of the PP homopolymer. The blend with Example F2 shows lower clarity and haze than the H2, suggesting better compatibilization is achieved with a diblock that has a composition closer to 50/50 iPP-EP. The blends containing Comparative A have similar clarity but higher haze than the PP homopolymer. The blends with Comparative B and the ICP had the lowest clarity and highest haze.

TABLE 6

Optical Properties of Films containing PP/iPP-EP diblocks

| Sample | Transmittance (%) | Clarity (%) | Haze (%) |
|---|---|---|---|
| D221.00 PP Homopolymer | 93.7 | 77.8 | 18.0 |
| 72/25 D221/H2 | 90.2 | 73.8 | 18.1 |
| 75/25 D221/Comparative A | 91.0 | 73.3 | 38.4 |
| 72/25 D221/F2 | 91.1 | 66.4 | 35.4 |
| 72/25 D221/Comparative B | 92.8 | 33.1 | 60.2 |

Figure 22:
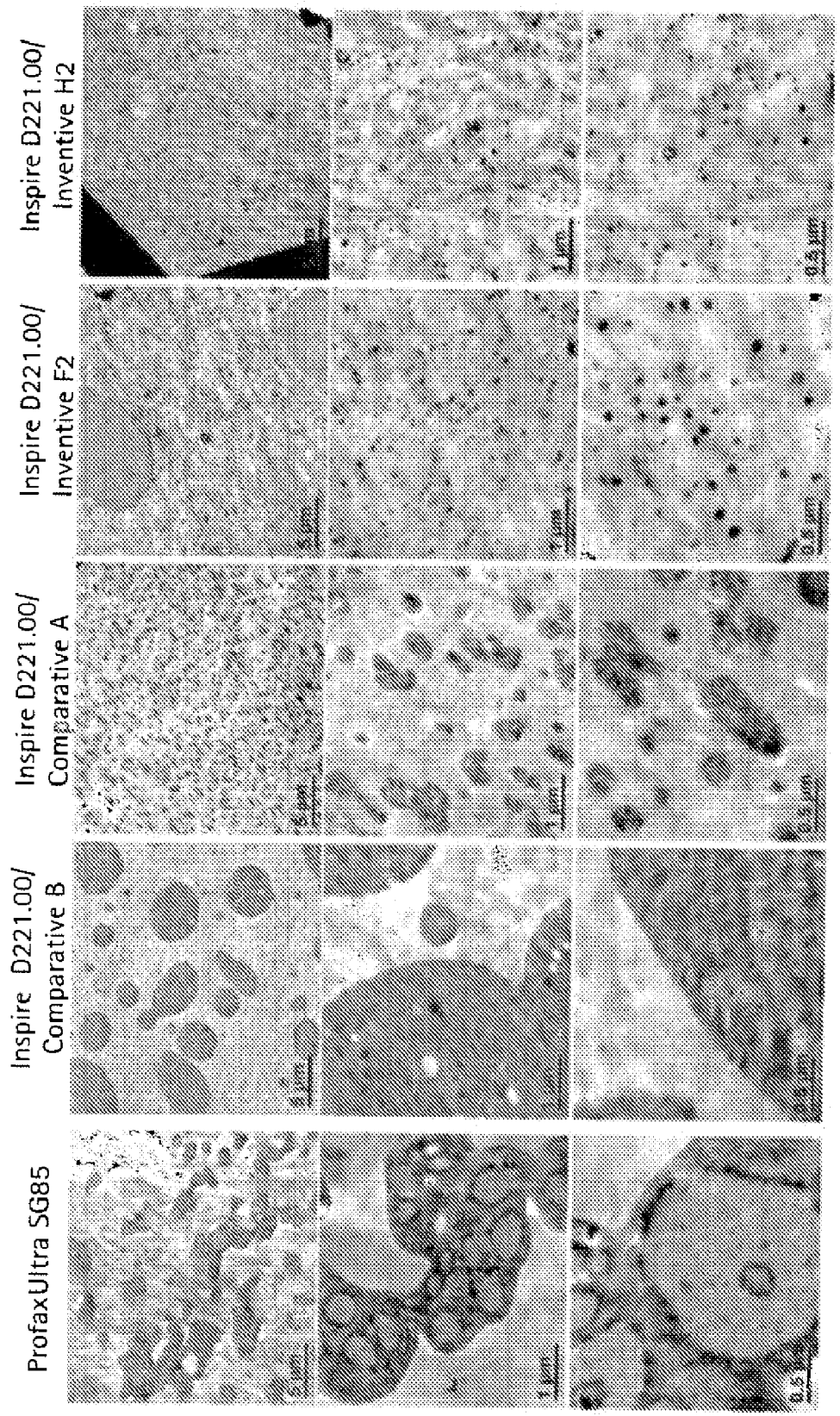
FIG. 22 shows TEM comparisons of Profax Ultra SG853 and INSPIRE D221 unmodified and modified with Comparatives A and B and Examples F2 and H2.
Figure 23:
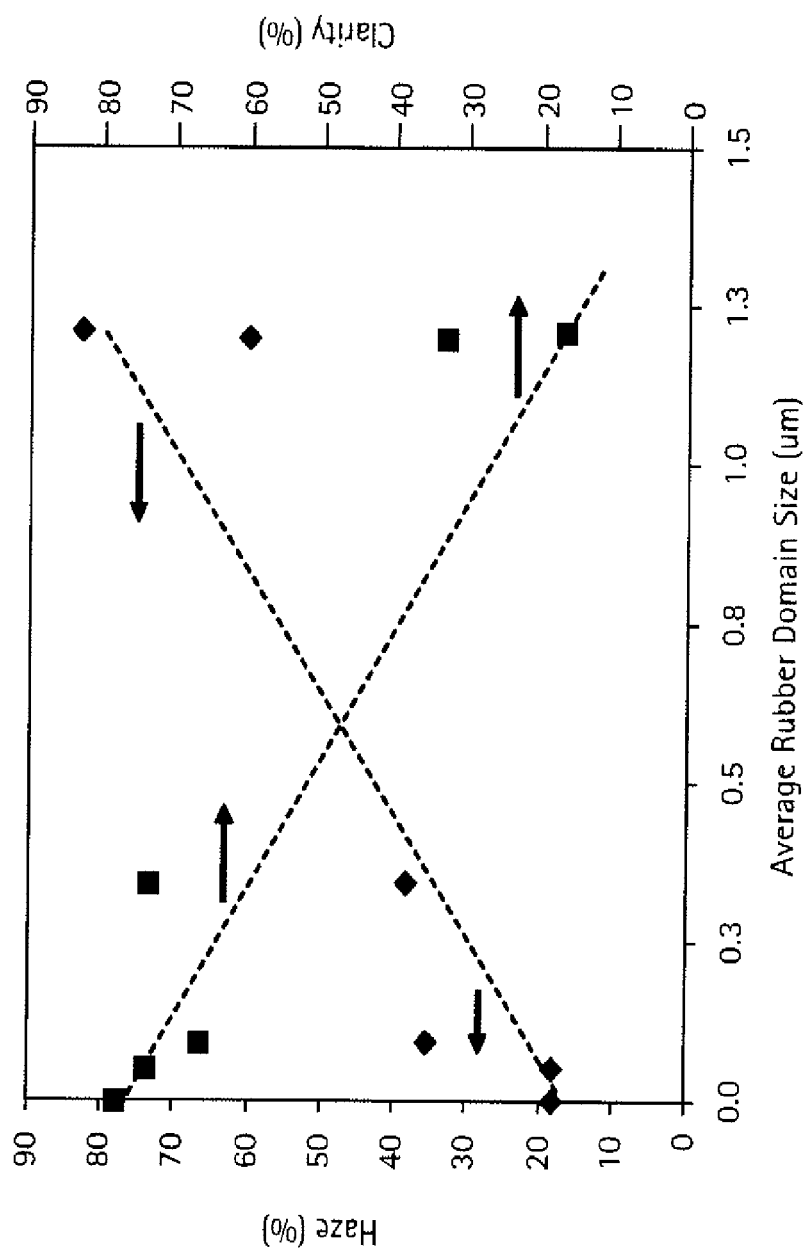
FIG. 23 shows Haze and Clarity as a function of Average Rubber Domain Size.

FIG. 22 shows the TEM micrographs of the blends at the 5 μm, 1 μm, and 0.5 μm scale. Organized from left to right, the samples are ordered according to increasing clarity and decreasing haze. The micrographs clearly show that the size and dispersion of the rubber domains relate to the observed optical properties. The PP homopolymer blend with Comparative B elastomer shows the presence of immiscible and incompatible phases. It is believed that due to the large rubber domain sizes observed (on the order of 5 μm), this film shows the lowest clarity and highest haze. The blend with Example H2 shows the highest clarity and lowest haze, comparable to that of the PP homopolymer alone. The morphology of this sample shows a very fine dispersion of rubber particles that are less than 100 nm in size. It is believed that because of their small size, they act as point sources for Rayleigh scattering which scatters light uniformly without deteriorating the clarity and haze of the matrix PP. The sizes of the rubber domains in blends with Comparative B are on the order of 500-1000 nm. FIG. 23 shows the relationship of the rubber domain size and the % Haze and % Clarity of the films. As the rubber domain sizes are decreased, the haze decreases and the clarity increases of the film. There appears to be a direct relationship with the size of the rubber domain and the observed optical properties. Preferably, the compositions of polypropylene and up to 6 wt % elastomer and the block composite have a measured haze of less than 20% as measured on a 1 mm thick article.

TABLE 5

Properties of Fractions

| Sample Obtained from Xylene Fractionation | Composition Xylene Insoluble Fraction | | | | Analytical Properties of Fraction | | | | | |
|---|---|---|---|---|---|---|---|---|---|---|
| | Wt % iPP Hard in Diblock | Wt % EP Soft Diblock | Est % iPP-EP Diblock | Wt % C$_2$ in EP Soft | Total wt % C$_2$ | Mw (kg/mol) PP Conventional | Mw/Mn | Tm (° C.) | Tc (° C.) | Heat of Fusion (J/g) |
| F2 | 30 | 70 | 29 | 38.5 | 8.3 | 207 | 2.3 | 136.5 | 99 | 80 |
| H2 | 60 | 40 | 29 | 38.1 | 4.4 | 371 | 2.5 | 142 | 106 | 83.5 |

Figure 24:
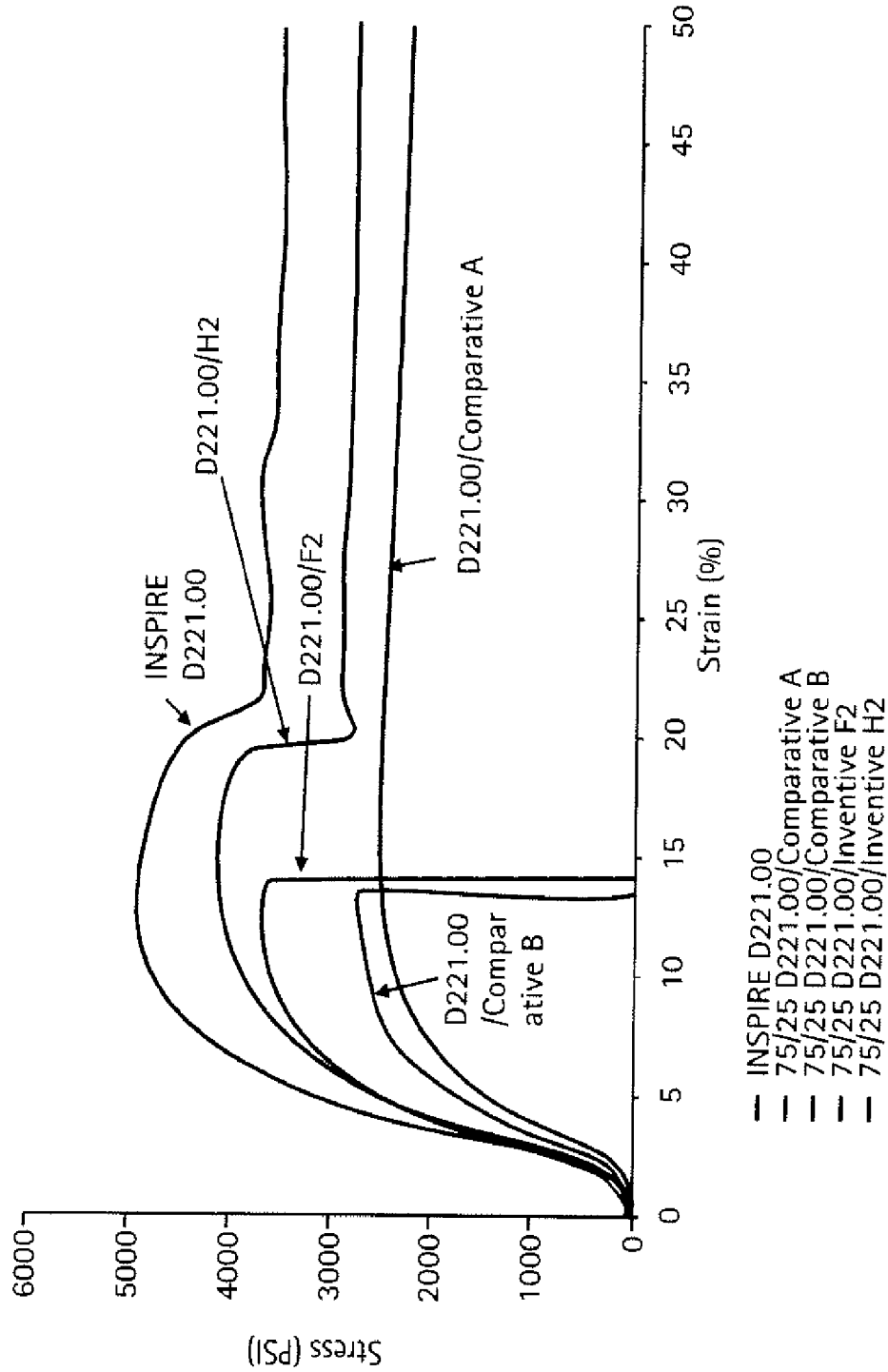
FIG. 24 shows stress vs strain curves of INSPIRE D221 unmodified and modified with Comparative Examples A and B and Examples F2 and H2.
Figure 25:
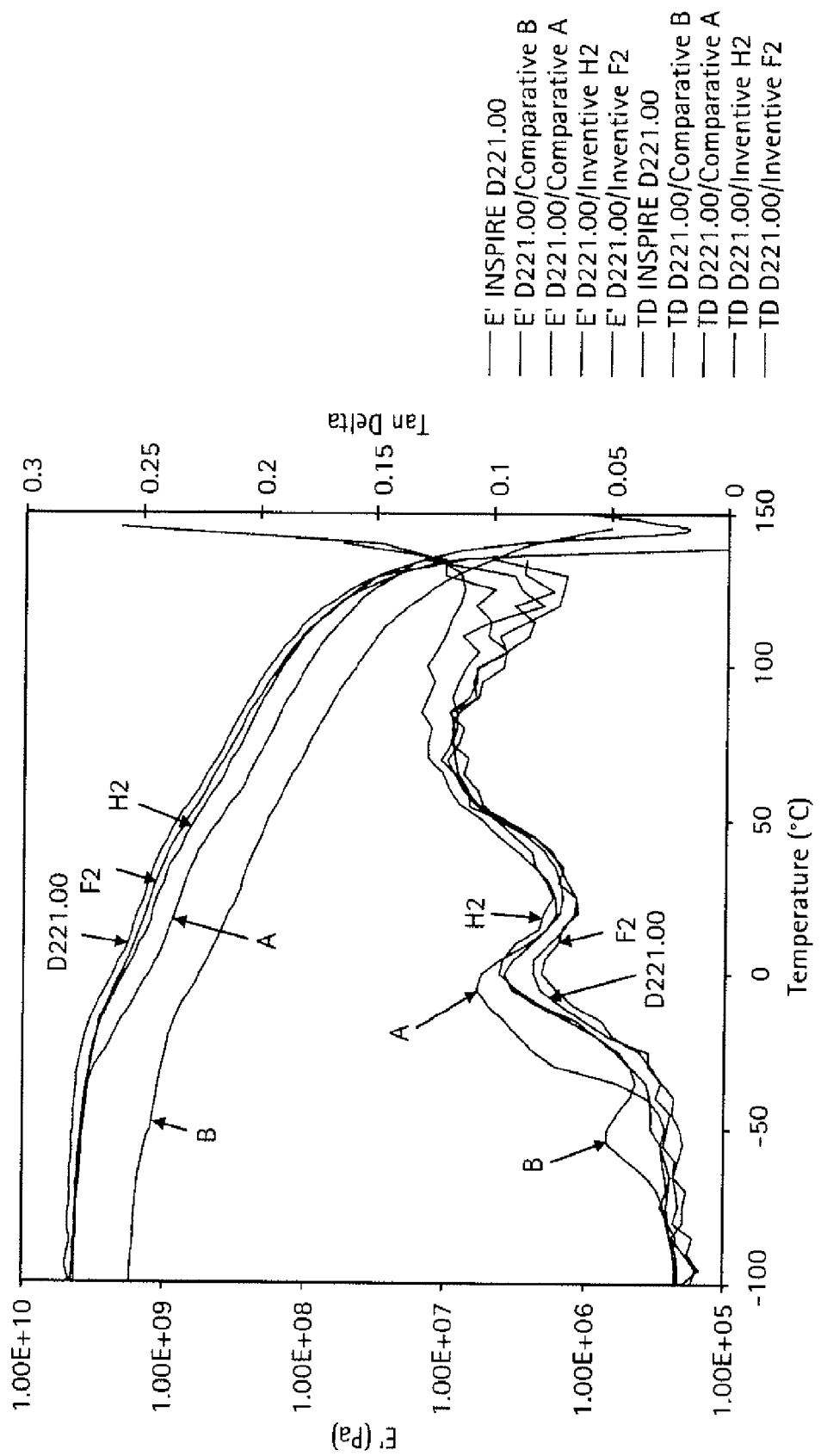
FIG. 25 shows modulus and tan delta for INSPIRE D221 unmodified and modified with Comparative Examples A and B and Examples F2 and H2.

Table 7 summarizes the properties of the blends. Comparing the 10% tensile moduli, the PP blends with Example H2 or F2 showed a similar modulus (within 10%) to the PP homopolymer itself. However, the blends with Comparative B or Comparative A, showed a significant decrease in modulus; 30% lower than the PP homopolymer. FIG. 24 shows the tensile curves up to 50% elongation. FIG. 25 shows the dynamic mechanical behavior of the various blends. The room temperature G' values confirm the observations from the tensile testing. Other than the differences in modulus, the G' of the samples decreased with increasing temperature until 140° C. which suggests the temperature resistance of the samples is dominated by the iPP homopolymer. An advantage of the inventive Examples which contain an amorphous EP soft block is a lower glass transition temperature when compared to PP homopolymer or even a propylene/ethylene elastomer. These blends have improved impact properties at both room temperature and subambient temperatures than PP homopolymer. In the past, the addition of elastomer reduced the modulus and the clarity of polypropylene. To obtain clear films, refractive index matching of the materials was necessary instead of fundamentally reducing the rubber domain sizes to avoid the scattering of the visible wavelengths of light.

TABLE 7

Properties of PP/iPP-EP Blends

| Example Blend | Tensile 10% Modulus (psi) | RT G' (×10⁸ Pa) | DSC Rubber Tg (° C.) | Avg Rubber Domain Size (μm ± σ) |
|---|---|---|---|---|
| D221 PP Homopolymer | 3850 ± 780 | 14 | 0 | N.A. |
| 75 wt %/25 wt % D221/Comparative B | 2500 ± 210 | 3.0 | −50 | 1.21 ± 2.1 |
| 75 wt %/25 wt % D221/Comparative A | 2300 ± 190 | 7.8 | −20 | 0.34 ± 0.2 |
| 75 wt %/25 wt % D221/H2 | 3820 ± 220 | 11 | −52 | 0.05 ± 0.01 |
| 75 wt %/25 wt % D221/F2 | 3440 ± 130 | 12.5 | −52 | 0.09 ± 0.03 |

The blends listed in Table 8 were prepared on a twin screw extruder and tested for their physical properties. The TPO blends contain between 51.5 to 62% of Profax Ultra SG853 (available from LyondellBasell Polyolefins) which is a 55 MFR impact copolymer with a measured weight % of rubber of 17%. Table 8 shows the compositions of Hard TPO compounds containing Profax Ultra SG853, Comparatives C and D, and JetFil 700C talc; Compounds TPO-4 through TPO-6 contain 5 and 15% inventive example B1, Compounds TPO-11 through TPO-14 contain 5 and 15% inventive example D1. For comparison, Compounds TPO-1C and TPO-2C, and Compounds TPO-7 through TPO-10 contain 1% and 3% Comparative Example A. Comparative C is an ethylene/octene copolymer (ENGAGE™ 8200 (The Dow Chemical Company) MI 5.0, density 0.870 g/cc). Comparative D is ethylene/octene copolymer (ENGAGE™ 8180 (The Dow Chemical Company) MI 0.5, density 0.863 g/cc). Each of the formulations also contain either Comparative C or Comparative D elastomer.

For the compounds containing the inventive examples, the total amount of 'active' compatibilizer can be calculated by multiplying the Block Composite Index of the inventive example by the total weight % that is added. For compounds 4 through 6, the weight % of inventive compatibilizer is estimated to be 0.8 and 2.4 wt %. For compounds 11 through 14, the weight % of inventive compatibilizer is estimated to be 1.1 and 3.3 wt %. For comparison, the level of the comparative compatibilizer (example A) was added at 1 and 3 wt %.

Table 9 summarizes the MFR, and Flexural modulus, Chord Modulus, Heat Distortion Temperature, and Gloss properties of the compounds containing Profax Ultra SG853, Comparative C or Comparative D elastomer, and either inventive B1 or D1 or comparative Example A.

TABLE 8

TPO Formulations

| Raw Material Description | TPO-1C | TPO-2C | TPO-3 | TPO-4 | TPO-5 | TPO-6 | TPO-7C | TPO-8C |
|---|---|---|---|---|---|---|---|---|
| Profax Ultra SG853 | 62.3 | 62.3 | 60.5 | 56.9 | 60.5 | 56.9 | 62.3 | 62.3 |
| Comparative C | 17.5 | | 14.3 | 7.9 | | | 16.5 | 14.5 |
| Comparative D | | 17.5 | | | 14.3 | 7.9 | | |
| Inventive B1 | | | 5.0 | 15.0 | 5.0 | 15.0 | | |
| Inventive D1 | | | | | | | | |
| Comparative A | | | | | | | 1.0 | 3.0 |
| JetFil 700C Talc | 20.0 | 20.0 | 20.0 | 20.0 | 20.0 | 20.0 | 20.0 | 20.0 |
| Irganox B225 | 0.20 | 0.20 | 0.20 | 0.20 | 0.20 | 0.20 | 0.20 | 0.20 |
| Total Weight % | 100.0 | 100.0 | 100.0 | 100.0 | 100.0 | 100.0 | 100.0 | 100.0 |
| Total Rubber Wt % | 28.0 | 28.0 | 28.0 | 28.0 | 28.0 | 28.0 | 28.0 | 28.0 |
| Wt % Compatibilizer | 0.0 | 0.0 | 0.8 | 2.4 | 0.8 | 2.4 | 1.0 | 3.0 |

| Raw Material Description | TPO-9C | TPO-10C | TPO-11 | TPO-12 | TPO-13 | TPO-14 |
|---|---|---|---|---|---|---|
| Profax Ultra SG853 | 62.3 | 62.3 | 58.7 | 51.5 | 58.7 | 51.5 |
| Comparative C | | | 16.1 | 13.3 | | |
| Comparative D | 16.5 | 14.5 | | | 16.1 | 13.3 |
| Inventive B1 | | | | | | |
| Inventive D1 | | | 5.0 | 15.0 | 5.0 | 15.0 |

TABLE 8-continued

| TPO Formulations | | | | | | |
|---|---|---|---|---|---|---|
| Comparative A | 1.0 | 3.0 | | | | |
| JetFil 700C Talc | 20.0 | 20.0 | 20.0 | 20.0 | 20.0 | 20.0 |
| Irganox B225 | 0.20 | 0.20 | 0.20 | 0.20 | 0.20 | 0.20 |
| Total Weight % | 100.0 | 100.0 | 100.0 | 100.0 | 100.0 | 100.0 |
| Total Rubber Wt % | 28.0 | 28.0 | 28.0 | 28.0 | 28.0 | 28.0 |
| Wt % Compatibilizer | 1.0 | 3.0 | 1.1 | 3.3 | 1.1 | 3.3 |

TABLE 9

| TPO Compound Properties | | | | | | | | |
|---|---|---|---|---|---|---|---|---|
| Compound # | TPO-1C | TPO-2C | TPO-3 | TPO-4 | TPO-5 | TPO-6 | TPO-7C | TPO-8C |
| MFR @ 230° C. (g/min) | 29.4 | 20.3 | 29.3 | 27.4 | 20.4 | 24.7 | 28.0 | 28.8 |
| Flex Mod (ASTM, MPa) | 1597 | 1732 | 1619 | 1586 | 1637 | 1593 | 1706 | 1592 |
| Chord Mod (MPa) | 1697 | 1793 | 1776 | 1615 | 1707 | 1566 | 1655 | 1681 |
| Heat Distortion Temperature (° C.) | 94.7 | 95.9 | 91.9 | 91.6 | 93.9 | 90.9 | 94.3 | 83.7 |
| Gloss (60°) | 33.7 | 14.7 | 28.1 | 33.8 | 19.7 | 28.1 | 28.9 | 27.2 |
| Compound # | TPO-9C | | TPO-10C | TPO-11 | | TPO-12 | TPO-13 | TPO-14 |
| MFR @ 230° C. (g/min) | 21.0 | | 21.4 | 24.4 | | 18.0 | 17.8 | 13.6 |
| Flex Mod (ASTM, MPa) | 1711 | | 1641 | 1583 | | 1414 | 1546 | 1510 |
| Chord Mod (MPa) | 1760 | | 1684 | 1642 | | 1479 | 1625 | 1526 |
| Heat Distortion Temperature (° C.) | 91.4 | | 92.5 | 88.4 | | 80.3 | 84.6 | 88.4 |
| Gloss (60°) | 13.6 | | 12.9 | 28.8 | | 31.4 | 18.4 | 27.5 |

Figure 26:
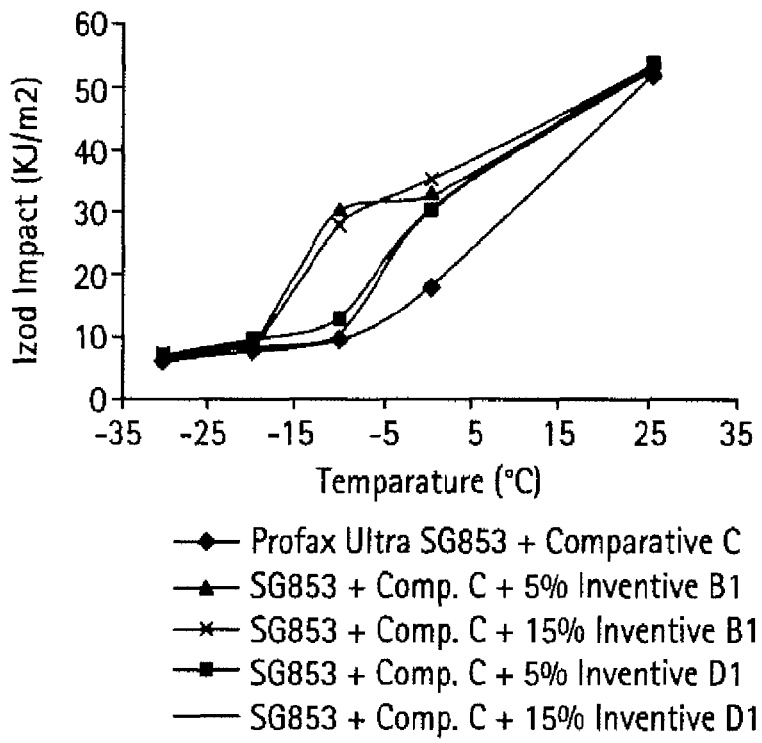
FIG. 26 shows Izod Impact versus Temperature for Comparative C and Inventive Examples B1 and D1.

FIG. 26 shows that the Izod impact energy versus temperature for hard TPO compounds containing inventive example B1 and D1 at the 5 and 15% level with Profax Ultra SG853 and Comparative C. Compounds containing B1 and D1 show greatly improved, impact strength at 0, −10, and −20° C. This indicates that the transition temperature from ductile-to-brittle failure is significantly lower than comparative compound containing Comparative C. The data shows that the impact strength is higher at subambient temperatures for the 15% level of B1 and D1 than the 5% level of B1 and D1. This indicates that the ductile-to-brittle transition temperature is lower at the 15% level of B1 and D1 than the 5% level of B1 and D1. Preferably, the compositions have an Izod strength in kJ/m$^2$ as measured by ASTM D256 or ISO180 at 0° C. or 23° C. that is at least 10% higher than that of the composition without the inventive examples; and exhibit a flexural modulus that is less than 10% reduced as compared to that of the composition without the inventive examples.

Figure 27:
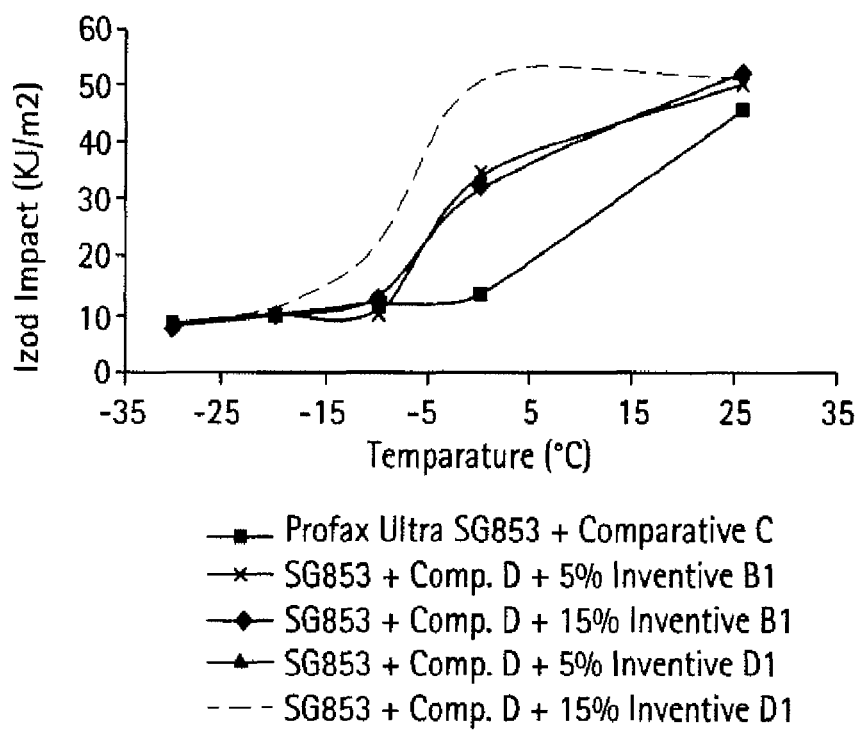
FIG. 27 shows Izod Impact versus Temperature for Comparative D and Inventive Examples B1 and D1.

FIG. 27 shows that the Izod impact energy versus temperature for hard TPO compounds containing inventive example B1 and D1 at the 5 and 15% level with Profax Ultra SG853 and Comparative D. Compounds containing B1 and D1 show greatly improved, impact strength at 0, −10, and −20° C. This indicates that the transition temperature from ductile-to-brittle failure is significantly lower than comparative compound containing Comparative D and even lower than in the previous case with Comparative C. The data shows that the impact strength is higher at subambient temperatures for the 15% level of B1 and D1 than the 5% level of B1 and D1. This indicates that the ductile-to-brittle transition temperature is lower at the 15% level of B1 and D1 than the 5% level of B1 and D1.

Figure 28:
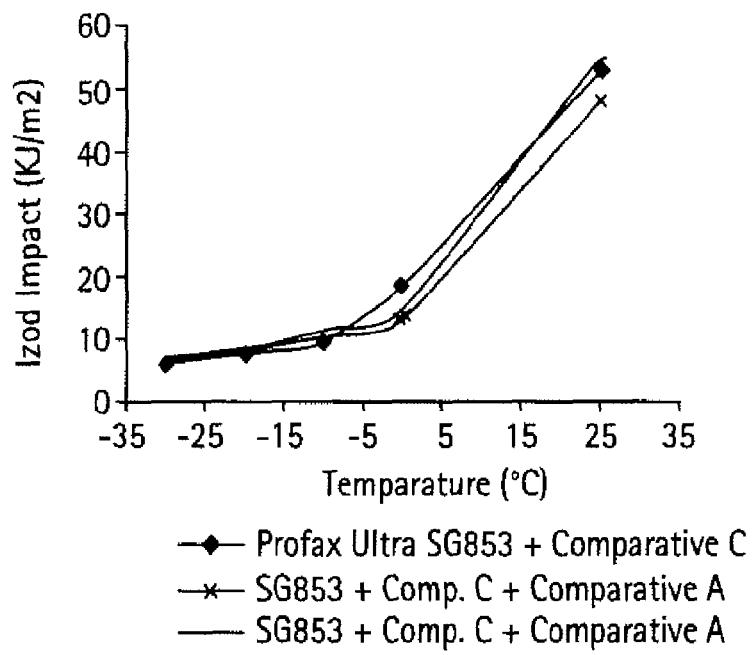
FIG. 28 shows Izod Impact versus Temperature for Comparative C and Comparative Example A.

FIG. 28 shows the Izod impact energy versus temperature for hard TPO compounds containing 1 and 3% of comparative Example A with Profax Ultra SG853 and Comparative C. The compounds with the comparative Example A showed lower impact strength at 25° C. than the compound containing Comparative C. The data shows that the ductile-to-brittle temperature was unaffected or worse with the addition of the comparative Example A.

Figure 29:
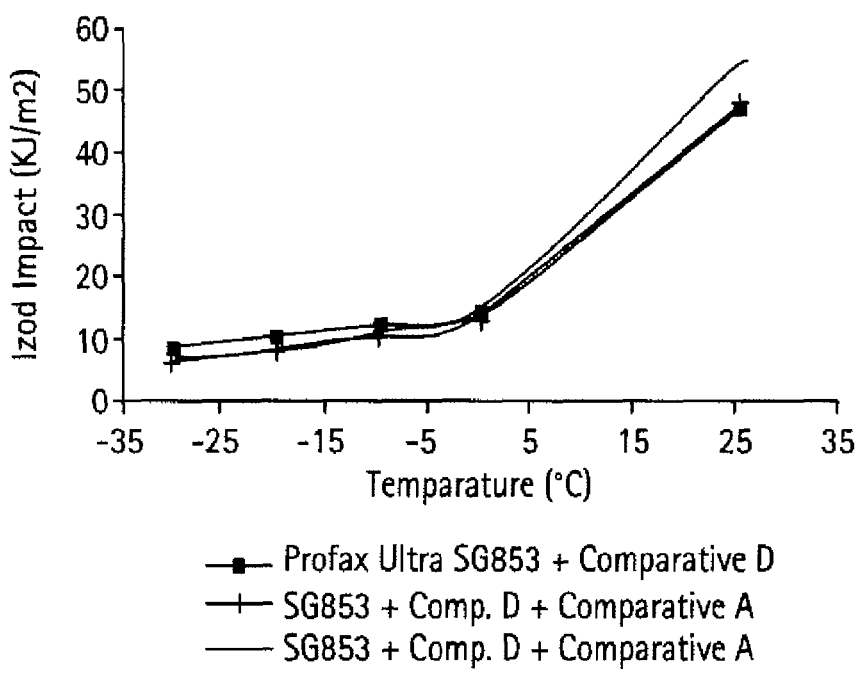
FIG. 29 shows Izod Impact versus Temperature for Comparative D and Comparative Example A.

FIG. 29 shows the Izod impact energy versus temperature for hard TPO compounds containing 1 and 3% of comparative Example A with Profax Ultra SG853 and Comparative D. The compounds with the comparative Example A showed lower impact strength at 25° C. than the compound containing Comparative D. The data shows that the ductile-to-brittle temperature was unaffected or worse with the addition of the comparative Example A.

Table 10 and Table 11 show the impact testing performance at 25° C., 0° C., −10° C., −20° C., and −30° C. as tested by the IZOD, Charpy, and instrumented dart methods. The trend of the impact energy measured by the Charpy and Instrument dart method is consistent with the IZOD method, showing that the compounds containing the inventive examples B1 and D1 with either Comparative C or Comparative D showed a significant improvement in low temperature impact strength. Preferably, the compositions demonstrate an improvement in impact strength as measured by Izod or Charpy of 10% over the composition without the inventive block composite examples.

In all cases, the addition of the inventive example significantly improved the low temperature impact strength. The results are surprising since the weight % of inventive compatibilizer that was added was between 0.8 to 1.1 wt % for the B1 and 2.4 to 3.3 wt % for the D1. This dramatic of an effect that is observed at these low levels of compatibilizer suggest that these agents are highly efficient at compatibilizing the polypropylene and the elastomer (ethylene-propylene rubber, and Comparatives B-D) that is present in these compounds.

TABLE 10

| Compound # | TPO-1C | TPO-2C | TPO-3 | TPO-4 | TPO-5 | TPO-6 | TPO-7C | TPO-8C |
|---|---|---|---|---|---|---|---|---|
| Izod Impact Strength, kJ/m$^2$ | | | | | | | | |
| 23° C., RT | 52.0 | 46.2 | 53.3 | 52.4 | 50.5 | 52.6 | 47.3 | 54.0 |
| 0° C. | 18.0 | 14.1 | 30.1 | 35.1 | 34.5 | 32.5 | 13.1 | 14.5 |
| −10° C. | 9.4 | 12.2 | 10.5 | 27.9 | 10.8 | 13.0 | 10.2 | 11.0 |
| −20° C. | 7.8 | 10.1 | 8.6 | 9.0 | 10.1 | 10.2 | 7.7 | 8.1 |
| −30° C. | 6.2 | 8.7 | 6.1 | 7.3 | 8.3 | 7.9 | 6.3 | 6.9 |
| Charpy Impact Energy, kJ/m$^2$ | | | | | | | | |
| 23° C., RT | 46.2 | 50.9 | 50.7 | 48.0 | 59.3 | 54.9 | 45.6 | 53.4 |
| 0° C. | 19.6 | 15.6 | 28.1 | 31.4 | 37.7 | 36.7 | 23.0 | 21.2 |
| −10° C. | 6.7 | 7.4 | 7.0 | 7.3 | 9.3 | 8.3 | 7.2 | 7.2 |
| −20° C. | 5.7 | 6.7 | 6.5 | 6.6 | 7.6 | 7.4 | 5.5 | 5.9 |
| −30° C. | 4.5 | 6.0 | 5.3 | 5.0 | 6.6 | 5.4 | 4.7 | 4.7 |

| Compound # | TPO-9C | TPO-10C | TPO-11 | TPO-12 | TPO-13 | TPO-14 |
|---|---|---|---|---|---|---|
| Izod Impact Strength, kJ/m$^2$ | | | | | | |
| 23° C., RT | 59.0 | 43.5 | 53.8 | 52.8 | 51.5 | 47.4 |
| 0° C. | 9.5 | 12.1 | 30.4 | 32.6 | 51.6 | 46.7 |
| −10° C. | 13.2 | 11.6 | 12.8 | 30.2 | 21.9 | 53.8 |
| −20° C. | 9.5 | 10.4 | 9.5 | 9.3 | 11.5 | 13.7 |
| −30° C. | 7.6 | 7.9 | 7.0 | 7.2 | 8.7 | 9.0 |
| Charpy Impact Energy, kJ/m$^2$ | | | | | | |
| 23° C., RT | 56.3 | 58.4 | 54.5 | 56.7 | 66.7 | 66.8 |
| 0° C. | 19.5 | 15.6 | 33.5 | 37.8 | 49.0 | 52.4 |
| −10° C. | 8.4 | 7.7 | 7.3 | 22.7 | 43.6 | 46.9 |
| −20° C. | 7.2 | 7.0 | 7.0 | 7.4 | 10.9 | 37.8 |
| −30° C. | 5.9 | 6.1 | 5.6 | 5.3 | 7.8 | 7.2 |

TABLE 11

| Compound # | TPO-1C | TPO-2C | TPO-3 | TPO-4 | TPO-5 | TPO-6 | TPO-7C | TPO-8C |
|---|---|---|---|---|---|---|---|---|
| Instrument Dart Impact (% Ductile Failure) | | | | | | | | |
| 23° C., RT | 100 | 100 | 100 | 100 | 100 | 100 | 100 | 100 |
| 0° C. | 60 | 100 | 100 | 100 | 100 | 100 | 100 | 100 |
| −10° C. | 100 | 100 | 100 | 100 | 100 | 100 | 100 | 100 |
| −20° C. | 80 | 100 | 100 | 100 | 80 | 100 | 100 | 60 |
| −30° C. | 0 | 0 | 20 | 40 | 0 | 60 | 0 | 20 |
| Instrument Dart Impact Energy (Joules) | | | | | | | | |
| 23° C., RT | 29.9 | 32.2 | 31.0 | 30.5 | 32.2 | 32.9 | 32.5 | 31.3 |
| 0° C. | 33.2 | 38.3 | 36.7 | 39.3 | 37.5 | 37.7 | 39.1 | 38.4 |
| −10° C. | 38.6 | 37.2 | 39.3 | 40.5 | 40.2 | 41.1 | 40.0 | 42.9 |
| −20° C. | 39.2 | 37.6 | 43.7 | 41.0 | 40.1 | 41.7 | 39.2 | 41.4 |
| −30° C. | 8.1 | 38.0 | 32.9 | 40.8 | 37.6 | 41.2 | 29.5 | 41.8 |

| Compound # | TPO-9C | TPO-10C | TPO-11 | TPO-12 | TPO-13 | TPO-14 |
|---|---|---|---|---|---|---|
| Instrument Dart Impact (% Ductile Failure) | | | | | | |
| 23° C., RT | 100 | 100 | 100 | 100 | 100 | 100 |
| 0° C. | 100 | 100 | 100 | 100 | 100 | 100 |
| −10° C. | 100 | 80 | 100 | 100 | 100 | 100 |
| −20° C. | 100 | 20 | 100 | 100 | 100 | 100 |
| −30° C. | 20 | 0 | 40 | 80 | 80 | 60 |
| Instrument Dart Impact Energy (Joules) | | | | | | |
| 23° C., RT | 33.6 | 33.3 | 29.7 | 32.0 | 30.3 | 32.2 |
| 0° C. | 36.5 | 39.6 | 38.0 | 37.7 | 38.8 | 38.5 |
| −10° C. | 39.3 | 40.9 | 41.9 | 41.4 | 41.4 | 41.0 |
| −20° C. | 40.7 | 39.0 | 41.9 | 38.2 | 42.4 | 45.1 |
| −30° C. | 41.8 | 43.4 | 42.1 | 36.0 | 39.4 | 43.2 |

High Temperature Liquid Chromatography

Figure 30:
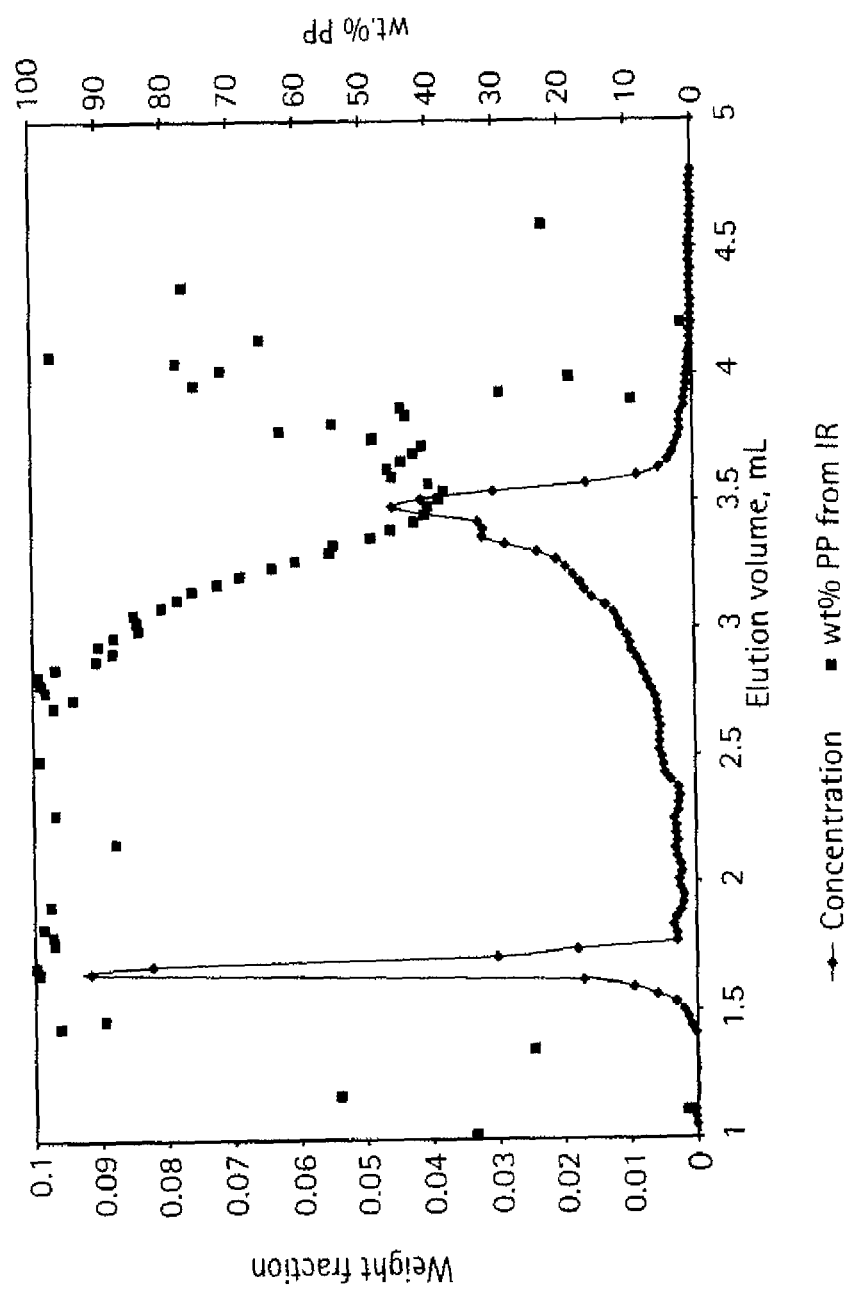
FIG. 30 shows High Temperature Liquid Chromatography Separation of Example D1.

FIG. 30 shows the HTLC chromatogram of example D1; shown is the separation of the polymer by weight fraction vs elution volume. The chromatogram shows a peak eluting between 1.3 mL and 2 mL which corresponds to isotactic polypropylene or a propylene-rich species as the wt % PP indicates that is measured by the infra-red composition; this is similar in composition to the hard block. The area for this peak is 28.1 wt %. The polymer eluting from 2 mL to 4.5 mL corresponds to the diblock polymer and the ethylene-rich polymer which is similar in composition to the soft block.

Figure 31:
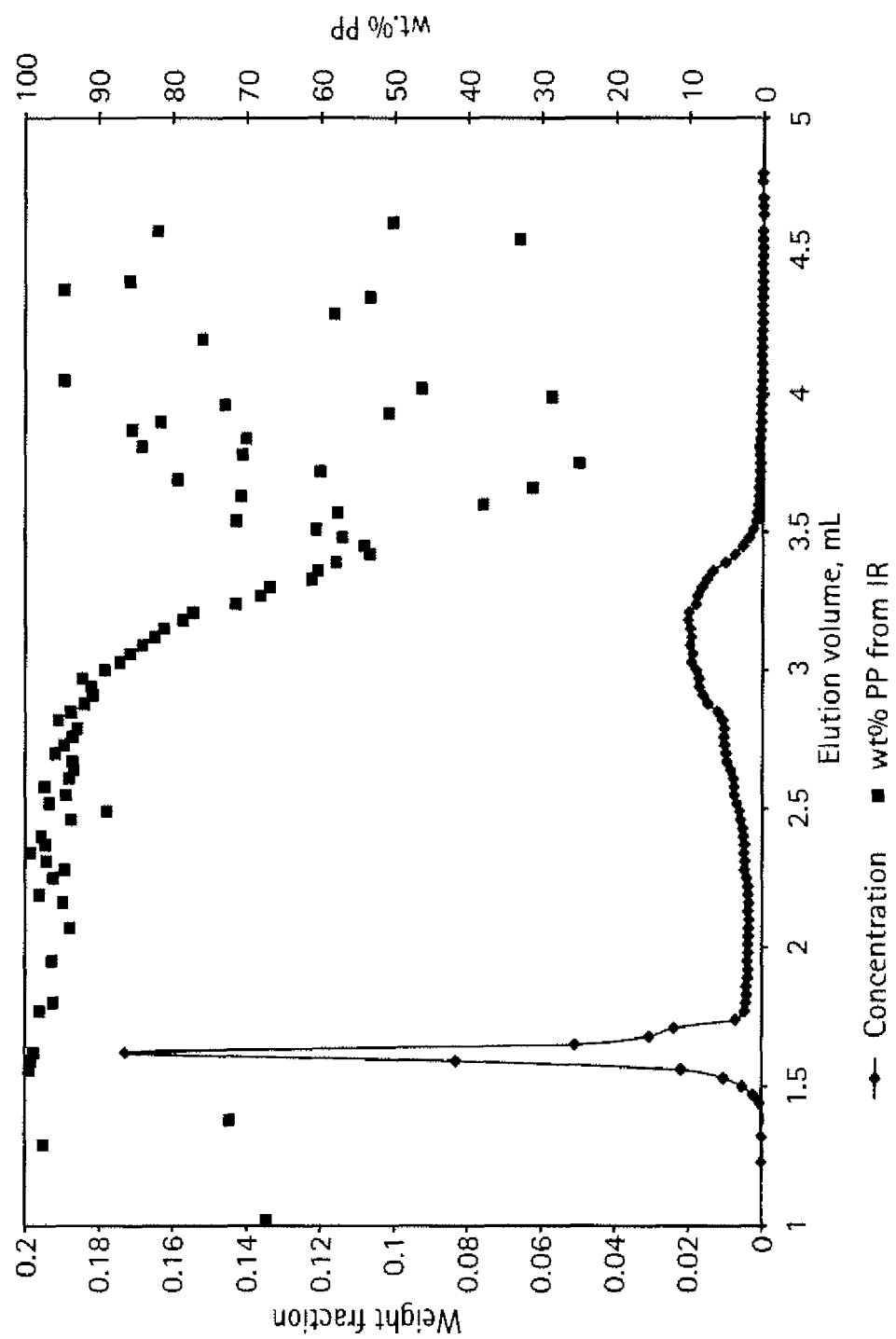
FIG. 31 shows High Temperature Liquid Chromatography Separation of Example D2.

FIG. 31 shows the HTLC chromatogram of example D2; shown is the separation of the polymer by weight fraction vs elution volume. The chromatogram shows a peak eluting between 1.3 mL and 2 mL which corresponds to isotactic polypropylene or a propylene-rich species as the wt % PP indicates that is measured by the infra-red composition; this is similar in composition to the hard block. The area for this peak is 44.1 wt %. The polymer eluting from 2 mL to 4.5 mL corresponds to the diblock polymer and the ethylene-rich polymer which is similar in composition to the soft block.

Figure 32:
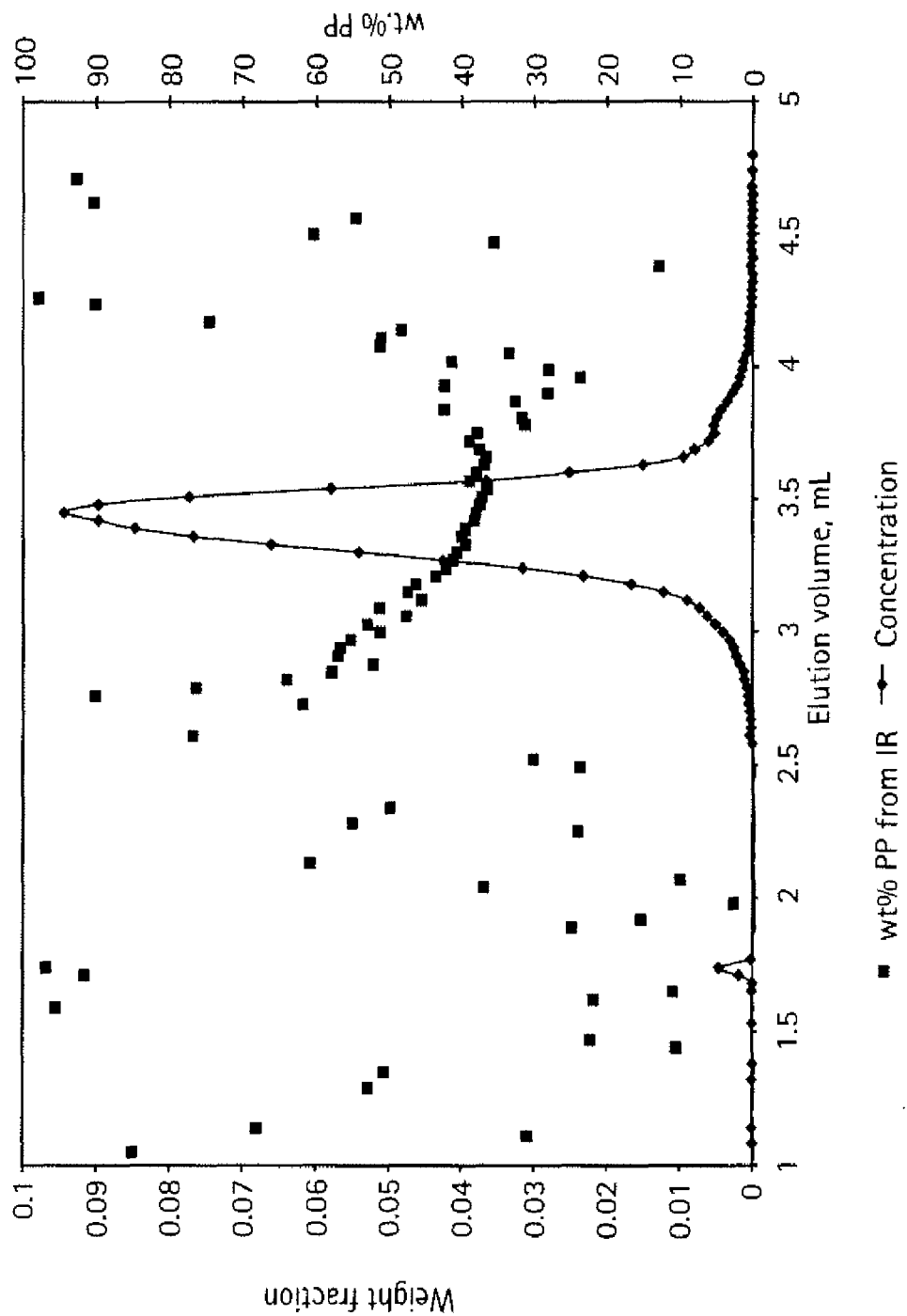
FIG. 32 shows High Temperature Liquid Chromatography Separation of Example D3.

FIG. 32 shows the HTLC chromatogram of example D3; shown is the separation of the polymer by weight fraction vs elution volume. The chromatogram shows a very little polymer between 1.3 mL and 2 mL which indicates that little or no isotactic polypropylene or a propylene-rich species is present. The area for this peak is less than 0.1 wt %. The polymer eluting from 2 mL to 4.5 mL corresponds to ethylene-rich polymer which is similar in composition to the soft block.

Description of Examples BB1-HH1

Examples BB1-HH1 were prepared similarly to A1 through AB1 as described in Tables 12A and 12B. The individual reactor conditions were modified to control the lengths and compositions of the diblocks as described below. A similar catalyst is used as in Examples A1 through AB1. CSA-1, a similar MMAO cocatalyst, and solvent are used as in Examples A1 through AB1. All examples have an iPP hard block. Runs BB1 through GG1 have a semi-crystalline, ethylene-propylene soft block containing 60-65 wt % C2 while HH1 has an amorphous, ethylene-propylene soft block containing 40 wt % C2. BB1 has a wt % iPP hard block of 30 wt %. CC1, DD1, EE1 have wt % iPP hard blocks of around 60 wt %. FF1, GG1, and HH1 have wt % iPP hard blocks of around 50 wt %. Examples BB1 through HH1 are were produced in the presence of hydrogen in the first and second reactor. MMAO was only added to the first reactor. The CSA was added to the Reactor 1 and the flow varied from 5.6 to 15.0 g/hr depending on the MFR of the polymer produced. Table 13 and 14 show the analytical properties and estimated block composite index for examples BB1 through HH1.

TABLE 12A

First reactor process conditions to produce diblock copolymers BB1 through HH1.

First Reactor Process Conditions

| Example | Solvent feed, kg/hr | Propylene feed, kg/hr | Ethylene feed, kg/hr | Hydrogen feed, SCCM | Temp, C. | Catalyst conc., ppm Hf | Catalyst solution flow, kg/hr | Cocatalyst conc., ppm |
|---|---|---|---|---|---|---|---|---|
| BB1 | 166.4 | 6.2 | 9.8 | 13 | 95 | 19.9 | 0.164 | 199 |
| CC1 | 104.1 | 3.6 | 6.0 | 13 | 95 | 9.9 | 0.109 | 199 |
| DD1 | 104.1 | 4.2 | 6.0 | 13 | 95 | 9.9 | 0.345 | 149 |
| EE1 | 65.9 | 4.0 | 6.0 | 13 | 95 | 9.9 | 0.377 | 149 |
| FF1 | 65.9 | 5.0 | 9.1 | 15 | 95 | 44.9 | 0.068 | 300 |
| GG1 | 66.4 | 4.8 | 9.1 | 20 | 96 | 14.9 | 0.186 | 199 |
| HH1 | 65.9 | 8.6 | 5.6 | 10 | 86 | 14.9 | 0.168 | 199 |

First Reactor Process Conditions

| Example | Cocatalyst solution flow, kg/hr | CSA Flow, g Zn/hr | MMAO flow, g/hr Al | Propylene Conversion, % | Calculated Split, % | Catalyst Efficiency, (gPoly/gM)*10E6 |
|---|---|---|---|---|---|---|
| BB1 | 0.136 | 10.4 | 0.43 | 91 | 70 | 4.72 |
| CC1 | 0.045 | 6.1 | 0.25 | 90 | 42 | 8.74 |
| DD1 | 0.173 | 5.6 | 0.23 | 95 | 44 | 2.95 |
| EE1 | 0.191 | 15.0 | 0.62 | 95 | 43 | 2.72 |
| FF1 | 0.136 | 11.0 | 0.69 | 96 | 51 | 4.56 |
| GG1 | 0.177 | 9.0 | 0.37 | 95 | 51 | 4.89 |
| HH1 | 0.173 | 7.9 | 0.33 | 97 | 52 | 5.70 |

TABLE 12B

Second reactor process conditions to produce diblock copolymers BB1 through HH1.

Second Reactor Process Conditions

| Run ID | Solvent feed, kg/hr | Propylene feed, kg/hr | Hydrogen feed, SCCM | Temp, C. | Catalyst conc., ppm Hf | Catalyst Solution Flow, kg/hr | Cocatalyst Conc., ppm | Cocatalyst solution flow, kg/hr | MMAO flow, g/hr Al | Propylene Conversion, % | Catalyst Efficiency (gPoly/gM)*10E6 |
|---|---|---|---|---|---|---|---|---|---|---|---|
| BB1 | 83.6 | 7.4 | 10 | 95 | 59.9 | 0.59 | 1000 | 0.36 | 0 | 90 | 0.26 |
| CC1 | 156.0 | 14.4 | 10 | 93 | 59.9 | 0.55 | 1000 | 0.32 | 0 | 90 | 0.42 |
| DD1 | 155.9 | 14.5 | 10 | 93 | 195.6 | 0.23 | 2000 | 0.23 | 0 | 89 | 0.27 |

TABLE 12B-continued

Second reactor process conditions to produce diblock copolymers BB1 through HH1.

Second Reactor Process Conditions

| Run ID | Solvent feed, kg/hr | Propylene feed, kg/hr | Hydrogen feed, SCCM | Temp, C. | Catalyst conc., ppm Hf | Catalyst Solution Flow, kg/hr | Cocatalyst Conc., ppm | Cocatalyst solution flow, kg/hr | MMAO flow, g/hr Al | Propylene Conversion, % | Catalyst Efficiency (gPoly/gM)*10E6 |
|---|---|---|---|---|---|---|---|---|---|---|---|
| EE1 | 155.8 | 14.5 | 10 | 92 | 195.6 | 0.23 | 2000 | 0.23 | 0 | 91 | 0.32 |
| FF1 | 65.9 | 13.9 | 19 | 105 | 195.6 | 0.32 | 2000 | 0.32 | 0 | 96 | 0.20 |
| GG1 | 65.7 | 13.7 | 10 | 105 | 195.6 | 0.45 | 1000 | 0.73 | 0 | 96 | 0.15 |
| HH1 | 65.8 | 13.4 | 10 | 105 | 195.6 | 0.45 | 1000 | 0.91 | 0 | 96 | 0.14 |

TABLE 13

Analytical Summary Examples BB1 through HH1

| Example | Wt % from Extraction | MFR @ 230° C. | Mw Kg/mol | Mw/Mn | Wt % $C_2$ | Tm (° C.) | Tc (° C.) | Melt Enthalpy (J/g) | Tg (° C.) by DSC | Wt % PP from HTLC Separation |
|---|---|---|---|---|---|---|---|---|---|---|
| BB1 | 62.3 | 7.6 | 132 | 2.31 | 42.4 | 128 | 74.5 | 52 | −46 | 13.0 |
| CC1 | 29.1 | 1.7 | 202 | 2.53 | 26.9 | 134 | 91 | 67 | −47 | 32.5 |
| DD1 | 34.2 | 8.0 | 144 | 3.57 | 26.5 | 141 | 98 | 65.5 | −50 | NM |
| EE1 | 33.7 | 35.4 | 105 | 3.50 | 26.2 | 141 | 97 | 60.5 | −49 | NM |
| FF1 | 31.1 | 4.1 | 103 | 2.9 | 33.8 | 139 | 93 | 66 | −44 | 21.5 |
| GG1 | 29.4 | 1.9 | 218 | 3.1 | 33.6 | 138 | 97 | 52 | −49 | NM |
| HH1 | 32.1 | 1.7 | 235 | 3.1 | 20.6 | 137 | 98 | 55 | −51 | NM |

TABLE 14

Block Composite Index Estimations for Examples BB1 through FF1

| Example | wt fraction iPP Hard | Wt fraction EP Soft | Block Composite Index |
|---|---|---|---|
| BB1 | 0.30 | 0.70 | 0.19 |
| CC1 | 0.60 | 0.40 | 0.32 |
| DD1 | 0.60 | 0.40 | 0.27 |
| EE1 | 0.60 | 0.40 | 0.29 |
| FF1 | 0.50 | 0.50 | 0.43 |

Elastomer Particle Stability in Melt State

The following materials were made as described in Table 15. The compositions were compounded using a 25 mm Werner & Pfleiderer fully intermesh self wiping twin screw extruder. Two types of compounding screw configurations were used in this study. One was a high shear mixing screw which contains two kneading sections and 5 distributive mixing sections along the length of the screw. The second screw configuration was a mild mixing screw which had 1 kneading section and 1 distributive mixing section along the length of the screw. The compounding conditions used are tabulated in Table 16. The feed rates in Table 16 show the set point and the actual feed rates for each component. Feeder 1 was used to feed the polypropylene resin (D221.00) and Feeder 2 was used for feeding the rubber (Comparative D and Inventive Example CC1). The compounded materials were extruded into strands, water quenched, and chopped into pellets.

TABLE 15

Compound formulations

| | Sample ID | |
|---|---|---|
| Ingredients | MS-1C Weight % | MS-2 Weight % |
| D-221.00 PP | 71.9 | 65.9 |
| Comparative D | 28 | 24 |
| Inventive CC1 | 0 | 10 |
| B-225 (ppm) | 1000 | 1000 |
| Total % | 100 | 100 |

TABLE 16

Compounding Conditions Used for Preparing the Formulated Compounds.

| | MS-1C | MS-2 |
|---|---|---|
| Zone 1 (° C.) | 140 | 140 |
| Zone 2 (° C.) | 180 | 180 |
| Zone 3 (° C.) | 200 | 200 |
| Zone 4 (° C.) | 200 | 200 |
| Zone 5 (° C.) | 200 | 200 |
| Zone 6 (° C.) | 200 | 200 |
| Zone 7 (° C.) | 200 | 200 |
| Zone 8 (° C.) | 200 | 200 |
| Screw Speed (RPM) | 500 | 500 |
| Main Torque (%) | 62 | 59 |
| PSI | 56 | 67 |
| Melt (° C.) | 219 | 223 |
| Feeder #1 (real time) | 35.77 | 33 |
| Feeder #1 (set point) | 35.95 | 32.95 |
| Feeder #3 (real time) | 13.86 | 17.14 |
| Feeder #3 (set point) | 14.05 | 17.05 |

The compounded pellets were then fed into an 80 ton Arburg injection molding machine where ASTM D-638 standard TYPE I dogbone tensile specimens were made. In order to evaluate the effectiveness of the di-block as a compatibilizer, the injection molding experiment was conducted in such a way that the compound was melted and kept at the melt state ahead of the plasticating screw in the injection molding barrel, also termed as a cushion, for an extended amount of time. This was accomplished by increasing the dose of the molding as shown in Table 17, where the cycle was increased by a factor of 2 and 3. So, the material was kept in the molten state in the injection molding for 1 cycle, was then injection molded into the tensile bar specimen. The material that was kept in the injection molding at a molten state for 1+2 cycle times, was then molded into a tensile bar specimen. Subsequently, the materials that were kept in the molten state in the injection molding machine for 1+2+3 cycle times, were then molded into a tensile bar specimen.

TABLE 17

Injection Molding Conditions for Tensile Bar Specimen

| | Sample | | | | | |
|---|---|---|---|---|---|---|
| Treatment | MS-1C 1 cycle | MS-1C 2 cycle | MS-1C 3 cycle | MS-2 1 cycle | MS-2 2 cycle | MS-2 3 cycle |
| Barrel and Mold Temperatures | | | | | | |
| Zone 1 Temp. T801 (° F.) | 440 | 440 | 440 | 440 | 440 | 440 |
| Zone 2 Temp. T802 (° F.) | 440 | 440 | 440 | 440 | 440 | 440 |
| Zone 3 Temp. T803 (° F.) | 440 | 440 | 440 | 440 | 440 | 440 |
| Zone 4 Temp. T804 (° F.) | 440 | 440 | 440 | 440 | 440 | 440 |
| Nozzle Temp. T805 (° F.) | 440 | 440 | 440 | 440 | 440 | 440 |
| Mold Temperature (° F.) | 100 | 100 | 100 | 100 | 100 | 100 |
| Extruder | | | | | | |
| RPM v401 (m/min) | 20 | 20 | 20 | 20 | 20 | 20 |
| Backpressure p401 (Bar) | 69 | 69 | 69 | 69 | 69 | 69 |
| Dosage V403 (ccm) | 35 | 70 | 104 | 35 | 70 | 104 |
| Real Dosage V403 (ccm) | 37 | 72 | 104 | 37 | 72 | 104 |
| Optimal Injection | | | | | | |
| Injection Speed #1 Q301 (ccm/s) | 40 | 40 | 40 | 40 | 40 | 40 |
| Transfer Position V311 (ccm) | 15 | 49 | 81 | 15 | 49 | 81 |
| Pressure at transfer p358I (bar) | 464 | 463 | 456 | 490 | 486 | 488 |
| Fill Time t305m (s.) | 0.68 | 0.7 | 0.7 | 0.68 | 0.7 | 0.7 |
| Cushion V3211 (ccm) | 12.4 | 46.6 | 78.1 | 13 | 46.7 | 78.6 |
| Hold | | | | | | |
| Pressure #1 p321 (Bar) | 400 | 400 | 400 | 400 | 400 | 400 |
| Time | | | | | | |
| Hold Time #1 t321 (s.) | 20 | 20 | 20 | 20 | 20 | 20 |
| Cool Time t400 (s.) | 20 | 20 | 20 | 20 | 20 | 20 |
| Dosage Time t402m (s.) | 3.1 | 3.2 | 3.6 | 3 | 3.1 | 3.4 |
| Cycle Time t902 (s.) | 48.7 | 48.7 | 48.7 | 48.7 | 48.7 | 48.7 |

The resultant morphology of these molded tensile bar specimen were determined using the Atomic Force Microscopy technique in the Tapping mode. The obtained micrograph is then digitized and the weighted average rubber particle size is determined and reported here as a weighted average equivalent diameter of the rubber particle size, also defined here as the weight average rubber particle size. The analysis was undertaken at 3 separate locations in the core of the tensile bar specimen and the reported value was the weight average rubber particle size obtained from these three locations. The results are summarized in Table 18. Inventive MS-2 obtained a small rubber particle size using the mild screw design. It also maintained its size (2.85 μm) with respect to hot melt soak time for a longer time (over 2 cycle). For the Comparative MS-1C, using a high shear mixing screw, the rubber particle size as obtained showed an increase in size with respect to the amount of soak time in the melt state at cycle 2, where it appeared to reach an equilibrium rubber size of about 5.2 μm. Similarly, using a mild mixing screw, the rubber particle size approached the equilibrium rubber particle size almost immediately.

TABLE 18

Skin Weight Average Rubber Particle Size as a Function of Heat Soak Time

| Residence Time at High Temp | MS-1C (High Shear Screw) | MS-1C (Mild Screw) | MS-2 (Mild Screw) |
|---|---|---|---|
| | Weight Average Rubber Particle Size (skin), μm | | |
| 1 cycle | 4.46 | 4.95 | 2.85 |
| 2 cycle | 5.24 | 5.4 | 2.87 |
| 3 cycle | 5.22 | 5.2 | 3.25 |

Table 19 tabulated the notched Izod impact strength of these specimens as a function of various heat soak times. As seen, the Izod impact strength correlates with the weighted average rubber particle size. The Inventive MS-2 composition exhibited ductile Izod impact at room temperature under all process treatments whereas the Comparative MS-1C composition exhibited brittle impact at room temperature under all process treatments.

TABLE 19

Notched Izod Impact Strength.

| Injection Molding Treatment | Temperature, ° C. | MS-1C (High Shear Screw) | MS-1C (Mild Screw) | MS-2 (Mild Screw) |
|---|---|---|---|---|
| | | Notched Izod Impact strength, ft-lb/in | | |
| 1 Cycle | RT | 1 | 0.9 | 11.3 |
| | 10 | 0.86 | 0.9 | 10 |
| | 0 | 0.75 | 0.8 | 10.5 & 2.5 (DBTT) |
| | −10 | 0.73 | 0.7 | 2.2 |
| | −20 | 0.72 | 0.7 | 1.9 |
| | −30 | | | 2 |

TABLE 19-continued

Notched Izod Impact Strength.

| Injection Molding Treatment | Temperature, °C. | MS-1C (High Shear Screw) | MS-1C (Mild Screw) | MS-2 (Mild Screw) |
|---|---|---|---|---|
| | | Notched Izod Impact strength, ft-lb/in | | |
| 2 Cycle | RT | 0.97 | 0.9 | 11.1 |
| | 10 | 0.89 | 0.9 | 9.8 & 3.2 (DBTT) |
| | 0 | 0.74 | 0.8 | 2.4 |
| | −10 | 0.68 | 0.7 | 1.9 |
| | −20 | 0.67 | 0.6 | 2 |
| | −30 | | | 1.9 |
| 3 Cycle | Ambient | 0.92 | 0.9 | 11.3 |
| | 10 | 0.93 | 0.9 | 9.9 & 3.4 (DBTT) |
| | 0 | 0.81 | 0.8 | 2.4 |
| | −10 | 0.71 | 0.7 | 2 |
| | −20 | 0.76 | 0.7 | 1.9 |
| | −30 | | | 2 |

High Clarity Impact Modified Blends

The blends listed in Table 20 were prepared on a twin screw extruder and tested for their flexural modulus, optical properties, and impact strength. The blends contain between 5.6 to 6.8 wt % of impact modifier added to a 50 MFR PP (R7021-50NA, available from The Dow Chemical Company). Comparative examples HC-1C and HC-2C use Kraton G1643M (available from Kraton Polymers USA) and ENGAGE™ 8402 (available from The Dow Chemical Company, MI 30, density 0.902 g/cc) as impact modifiers at a 6% level. Inventive Examples HC-3 and HC-4 use either BB1 or CC1 alone or in a blend with ENGAGE™ 8402 also around a 6% level.

Table 21 shows the properties of the blends shown in Table 20. 1% Secant Flexural modulus testing of the examples shows that the inventive examples HC-3, HC-4, HC-5, and HC-6 have 10% higher modulus than the Kraton G1643M. Comparing the optical properties of clarity, haze, and transmittance, all the blends had similar values except for Example HC-3 and HC-4 which contains 6% of BB1 and CC1 diblock alone as the impact modifier.

Comparing the impact properties of the blends with BB1 and CC1 diblock alone as the impact modifier shows that the CC1 diblock has higher IZOD impact strength at 23° C. than the comparative Example HC-2C (with ENGAGE™ 8402). Despite CC1 having a higher wt % of hard block and longer block lengths of the hard block, it demonstrated better impact and optical properties than the BB1.

Comparing the properties of the blends of examples HC-5 and HC-6 to the comparative Kraton G1643M control, the blends with 50% BB1 and CC1 with ENGAGE™ 8402 as the impact modifier resulted in higher flexural modulus, similar optics, and similar impact properties at 23 and 0° C. In fact, Example HC-5 contains 5.6 wt % of the impact modifying polymers which is 0.4 wt % lower than comparative examples. This suggests that similar or better properties can be achieved with the inventive example BB1 at a lower impact modifier loading than the comparative controls.

TABLE 20

High Clarity Impact Modified Blends

| Raw Material Description | Comparative Example HC-1C | Comparative Example HC-2C | Inventive Example HC-3 | Inventive Example HC-4 | Inventive Example HC-5 | Inventive Example HC-6 |
|---|---|---|---|---|---|---|
| R7021-50NA PP | 93.8 | 93.8 | 93.8 | 93.8 | 94.2 | 93.0 |
| Kraton G1643M | 6.0 | | | | | |
| EG8402 (30MI, 0.902 g/cc) | | 6.0 | | | 2.8 | 3.4 |
| BB1 | | | 6.0 | | 2.8 | |
| CC1 | | | | 6.0 | | 3.4 |
| Irganox B225 (0.2%) | 0.20 | 0.20 | 0.20 | 0.20 | 0.20 | 0.20 |
| Total Weight % | 100.0 | 100.0 | 100.0 | 100.0 | 100.0 | 100.0 |

TABLE 21

Properties of blends

| Properties | Comparative Example HC-1C | Comparative Example HC-2C | Inventive Example HC-3 | Inventive Example HC-4 | Inventive Example HC-5 | Inventive Example HC-6 |
|---|---|---|---|---|---|---|
| MFR | 36.2 | 39.4 | 36.1 | 35.6 | 37.5 | 36.9 |
| 1% Secant Flex Mod (ASTM, MPa) | 834 | 926 | 824 | 952 | 929 | 911 |
| Optics (1 mm film) | | | | | | |
| Clarity (%) | 97 | 97 | 89 | 96 | 98 | 98 |
| Haze (%) | 15 | 13 | 60 | 23 | 15 | 15 |
| Transmittance (%) | 89 | 89 | 87 | 87 | 89 | 89 |
| Izod Strength, kJ/m$^2$ | | | | | | |
| 23° C. | 7.2 | 4.9 | 5.1 | 6.4 | 6.4 | 6.4 |
| 0° C. | 4.3 | 2.9 | 4.0 | 4.2 | 4.4 | 3.9 |

Effect of MFR of the Inventive Diblock on Impact Properties of TPO Blends

The blends listed in Table 22 were prepared on a twin screw extruder and tested for their flexural modulus and impact strength. The blends contain 70% of Profax Ultra SG853 Polypropylene Impact Copolymer (available from Lyondell-Basell Polyolefins) and 20% of an impact modifier, and 10% of Jetfil 700C talc. The control blend contains ENGAGE 8180 copolymer alone as the impact modifier while the inventive examples contained a blend of 40% of the inventive diblock (CC1, DD1, EE1) and 60% ENGAGE 8180. The properties of the blends are shown in Table 23. Comparative example TPO-15C has a MFR of 22.3, a chord modulus of 1400 MPa and Charpy impact strength of 7.1 and 6.7 measured at 23° C. and 0° C., respectively. All of the inventive examples TPO-16, TPO-17 and TPO-18 exhibit similar and up to 5% higher modulus than the comparative example. All of the inventive examples exhibit significantly higher Charpy impact strength than the comparative control; improvements are shown from 100% to 500% in 23° C. impact strength. Inventive examples EE1, DD1, and CC1 illustrate the effect of the MFR of the diblock on the impact properties. CC1 diblock has an MFR of 1.7 and when used as an impact modifier in the blend shows a 23° C. impact strength of 51 kJ/m². DD1 diblock has an MFR of 8 and when used as an impact modifier in the blend shows a 23° C. impact strength of 19.8 kJ/m². EE1 diblock has an MFR of 35 and when used as an impact modifier in the blend shows a 23° C. impact strength of 16.2 kJ/m². Overall, this data shows that inventive diblocks can have a significant improvement in impact strength of these blends, however, inventive diblocks with an MFR lower than 8 have the greatest improvement.

TABLE 22

Blends for TPO

| Raw Material Description<br>Compounding # | TPO-15C w/EG8180<br>1-20% EG8180<br>Control | TPO-16<br>w/EE1 | TPO-17<br>w/DD1 | TPO-18<br>w/CC1 |
|---|---|---|---|---|
| Profax Ultra SG853 | 69.8 | 69.8 | 69.8 | 69.8 |
| ENGAGE ™ 8180 | 20.0 | 12.0 | 12.0 | 12.0 |
| EE1 (35 MFR) | | 8.0 | | |
| DD1 (7.6 MFR) | | | 8.0 | |
| CC1 (1.7 MFR) | | | | 8.0 |
| JetFil 700C Talc | 10.0 | 10.0 | 10.0 | 10.0 |
| Irganox B225 (0.2%) | 0.20 | 0.20 | 0.20 | 0.20 |
| Total Weight % | 100.0 | 100.0 | 100.0 | 100.0 |

TABLE 23

Effect of MFR of the Inventive Diblock on Impact Properties of TPO Blends

| Property Data | TPO-15C w/EG8180 | TPO-16 w/EE1 | TPO-17 w/DD1 | TPO-18 w/CC1 |
|---|---|---|---|---|
| MFR | 22.3 | 27.8 | 27.0 | 22.8 |
| Chord Mod (MPa) | 1403 | 1404 | 1468 | 1475 |
| Charpy Impact Energy, kJ/m2 | | | | |
| 23° C. | 7.1 | 16.2 | 19.8 | 51.2 |
| 0° C. | 6.7 | 8.6 | 8.7 | 9.7 |

Impact Modifier Compatibilization of a PP Impact Copolymer with Greater than 100 MFR The blends listed in Table 24 were prepared on a twin screw extruder and tested for their flexural modulus and impact strength. The blends contain 91-100% of a Profax Ultra SC973 (available from LyondellBasell Polyolefins) which is a 105 MFR impact copolymer with a measured weight % of rubber of 15%. This 105MFR impact copolymer was blended and compatibilized with 3, 6, and 9% of inventive example FF1. The properties of the compatibilized blends are compared to the Profax Ultra SC973 which was compounded by itself in the extruder with the same level of antioxidant as the inventive blends.

Properties of the blends in Table 24 are shown in Table 25. Inventive examples HFIM-1, HFIM-2, and HFIM-3 show that with increasing level of diblock from 0 to 9%, the impact IZOD impact strength at 23° C. and 0° C. increased dramatically. Compared to the comparative example, at 23° C., the impact strength improved by 34%, 70%, and 90% with the addition of 3%, 6%, and 9% of the inventive diblock, respectively.

TABLE 24

Blends

| Raw Material Description | Profax Ultra SC973 Control | HFIM-1 w/3% FF1 | HFIM-2 w/6% FF1 | HFIM-3 w/9% FF1 |
|---|---|---|---|---|
| Pro-fax Ultra SC973 (105MFR) | 100 | 97.0 | 94.0 | 91.0 |
| FF1 | | 3.0 | 6.0 | 9.0 |
| Irganox B225 (0.2%) | 0.2 | 0.20 | 0.20 | 0.20 |
| Total Weight % | 100.2 | 100.2 | 100.2 | 100.2 |

TABLE 25

Properties

| | Profax Ultra SC973 Control | HFIM-1 w/3% FF1 | HFIM-2 w/6% FF1 | HFIM-3 w/9% FF1 |
|---|---|---|---|---|
| Flex Chord Mod (MPa) | 1448 | 1391 | 1266 | 1156 |
| Izod (ISO) Energy, kJ/m2 | | | | |
| 23° C. | 3.15 | 4.81 | 5.64 | 5.99 |
| 0° C. | 2.94 | 4.66 | 4.61 | 4.83 |

Effect of Diblock Soft Block Composition on Impact Properties of TPO Blends

Figure 33:
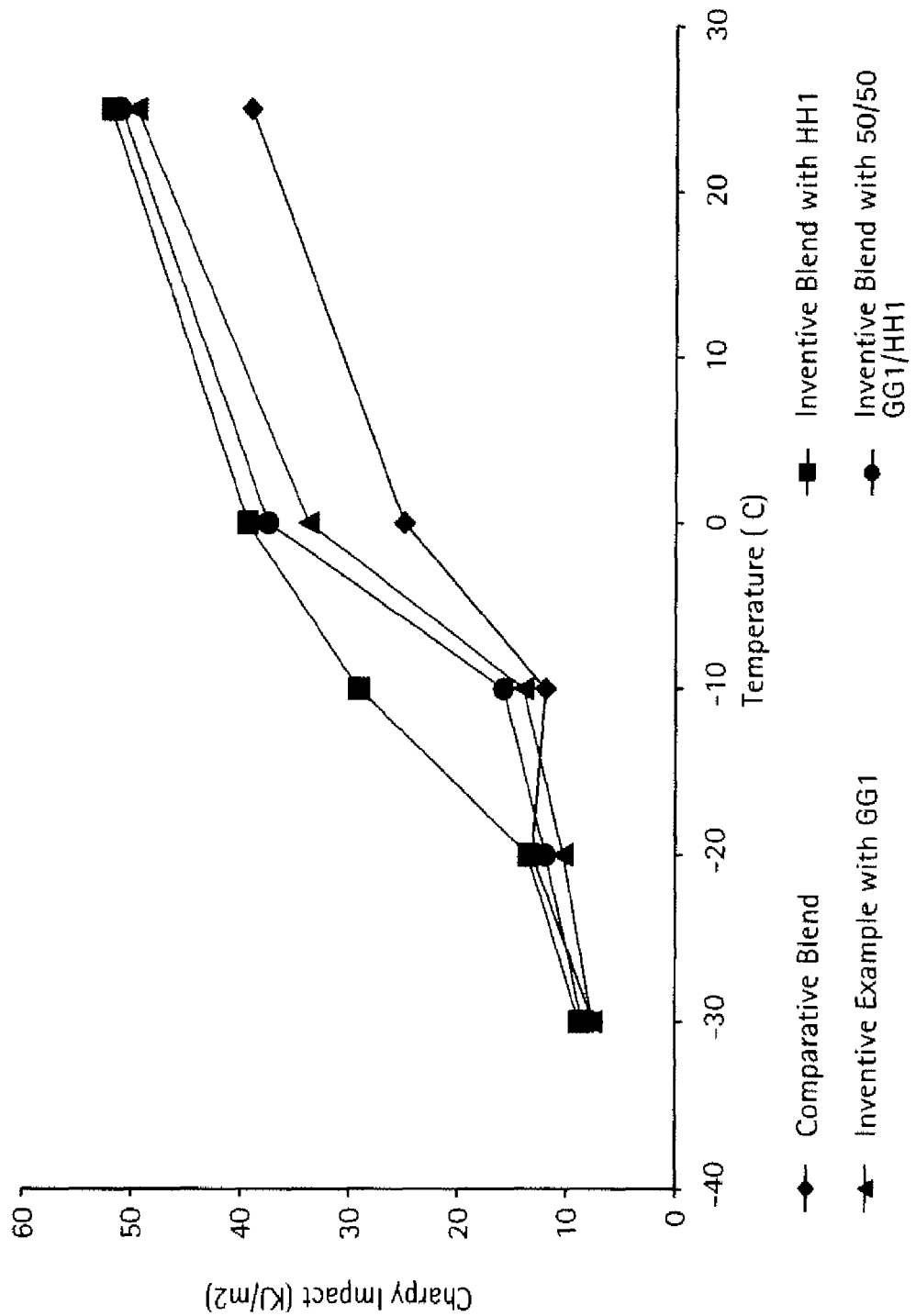
FIG. 33 shows Charpy Impact Strength of inventive and comparative blends.

The blends listed in Table 26 were prepared on a twin screw extruder and tested for their flexural modulus and impact strength. The TPO blends contain between 59 to 62% of Profax Ultra SG853 (available from LyondellBasell Polyolefins) which is a 55 MFR impact copolymer with a measured weight % of rubber of 17%. The comparative and inventive examples were impact modified with an additional amorphous random ethylene-propylene copolymer that was polymerized by a metallocene catalyst. 20% Jetfil talc is also present in the blends. The inventive examples TPO-20, TPO-21, and TPO-22 show the effect of adding 7.5% of inventive diblocks GG1, HH1, and a 50/50 wt % blend of GG1 and HH1, respectively. Table 27 shows the properties of the blends in Table 26. Compared to the comparative blend with no compatibilizer, the inventive blends showed a modulus decrease of less than 6%. However, very strikingly, FIG. 33 shows that the Charpy impact strength improves dramatically with the addition of the inventive diblock. At 23° C. and 0° C., the impact strength of the inventive blends is 30-35% greater than that of the comparative blend. At −10° C., the blend with inventive diblock HH1 shows a 140% improvement to that of the comparative blend. It is understood that the observed decrease in impact strength between 23 and −30° C. occurs due to differences in the ductile to brittle transition temperatures of the individual blends; compared to the control blend, in these examples, the addition of the inventive diblock compatibilizer results in a decrease in the ductile to brittle transition temperature by, at the least, 5 to 15° C.

TABLE 26

| Raw Material Description | TPO-19C | TPO-20 w/GG1 | TPO-21 w/HH1 | TPO-22 w/GG1/HH1 |
|---|---|---|---|---|
| Profax SG853 | 62.3 | 58.9 | 58.9 | 58.9 |
| Metallocene EP Random Copolymer (containing 50 wt % C$_2$, 1MI) | 17.5 | 13.4 | 13.4 | 13.4 |
| GG1 | | 7.5 | | 3.75 |
| HH1 | | | 7.5 | 3.75 |
| JetFil 700C Talc | 20.0 | 20.0 | 20.0 | 20.0 |
| Irganox B225 (0.2%) | 0.20 | 0.20 | 0.20 | 0.20 |
| Total Weight % | 100.0 | 100.0 | 100.0 | 100.0 |

TABLE 27

Impact Properties of TPO Blends with diblocks with different compositions

| Property Data | TPO-19C | TPO-20 w/GG1 | TPO-21 w/HH1 | TPO-22 w/GG1/HH1 |
|---|---|---|---|---|
| MFR | | | | |
| Chord Mod (MPa) | 1739 | 1666 | 1663 | 1634 |
| Charpy Impact Energy, kJ/m2 | | | | |
| 23° C. | 38.9 | 49.5 | 51.8 | 50.9 |
| 0° C. | 24.9 | 33.7 | 39.3 | 37.4 |
| −10° C. | 11.9 | 13.9 | 29.1 | 15.8 |
| −20° C. | 13.1 | 10.3 | 13.5 | 11.9 |
| −30° C. | 7.5 | 7.6 | 8.8 | 8.5 |

Impact Modified Properties of Ethylene-Butene Rubber in TPO Blends

The blends listed in Table 28 were prepared on a twin screw extruder and tested for their Melt Flow, flexural modulus and impact strength. The blends contain 57-62% of Profax Ultra SG853 Polypropylene Impact Copolymer (available from LyondellBasell Polyolefins) and 12.4 to 17.5% of an ethylene-butene elastomer, ENGAGE™ 7467 (available from The Dow Chemical Company, MI 1.2, density 0.862 g/cc), and 20% of Jetfil 700C talc. The control blend contains ENGAGE™ 7467 alone as the impact modifier while the inventive example contains a blend of 10% of CC1 diblock and 12.4% of ENGAGE™ 7467. The total weight basis of the ethylene-alpha olefin elastomer present in the comparative blend and inventive blend is 28% and 26%, respectively. This includes the amount of ethylene-propylene rubber from the impact copolymer, the added ethylene-butene rubber, and the ethylene-propylene rubber from the soft block of the inventive diblock. Properties of the blends of Table 28 are shown in Table 29. Comparing the modulus of the comparative blend and inventive blend, a slight decrease in modulus was observed; a decrease of less than 6%. Comparing the Charpy impact strength of the comparative and inventive blend, the blend shows higher impact strengths for all the temperatures tested (23° C. to −20° C. At 23° C., the inventive blend has 23% greater impact strength than the comparative blend. At 0° C., the inventive blend has 200% greater impact strength than the comparative blend. It is believed that the observed decrease in impact strength between 23 and −20° C. occurs due to differences in the ductile to brittle transition temperatures of the individual blends; compared to the control blend, in this example, the addition of the inventive diblock compatibilizer results in a decrease in the ductile to brittle transition temperature by, at the least, 10 to 15° C.

TABLE 28

Blends

| Raw Material Description | TPO-23C ENGAGE 7467 | TPO-24 w/ENGAGE + CC1 |
|---|---|---|
| Profax SG853 | 62.3 | 57.4 |
| ENGAGE 7467 (0.865 g/cc, 1MI) | 17.5 | 12.4 |
| CC1 | | 10.0 |
| JetFil 700C Talc | 20.0 | 20.0 |
| Irganox B225 (0.2%) | 0.20 | 0.20 |
| Total Weight % | 100.0 | 100.0 |

TABLE 29

Impact modified properties of Ethylene-butene rubber in TPO Blends

| | TPO-23C ENGAGE 7467 | TPO-24 w/ENGAGE + CC1 |
|---|---|---|
| MFR | 22.3 | 20.2 |
| Chord Mod (MPa) | 1893 | 1778 |
| Charpy Impact Energy, kJ/m2 | | |
| 23° C. | 42.1 | 51.9 |
| 0° C. | 11.3 | 34.6 |
| −10° C. | 7.8 | 8.9 |
| −20° C. | 6.9 | 8.5 |

SEBS Compatibilization

The blends listed in Table 30 were prepared using a Haake Brabender. 1 mm compression molded films were then prepared for morphology analysis by transmission electron microscopy. The comparative blend, SEBS 1C, contains 80% Polypropylene H110N (2MFR homopolymer, available from The Dow Chemical Company) and 20% of SEBS Kraton G1643M (available from Kraton Polymers USA). The inventive blend, SEBS 2, contains 72% of the PP H110N, 20% of G1643M, and 7.5% of inventive example FF1.

Figure 34:
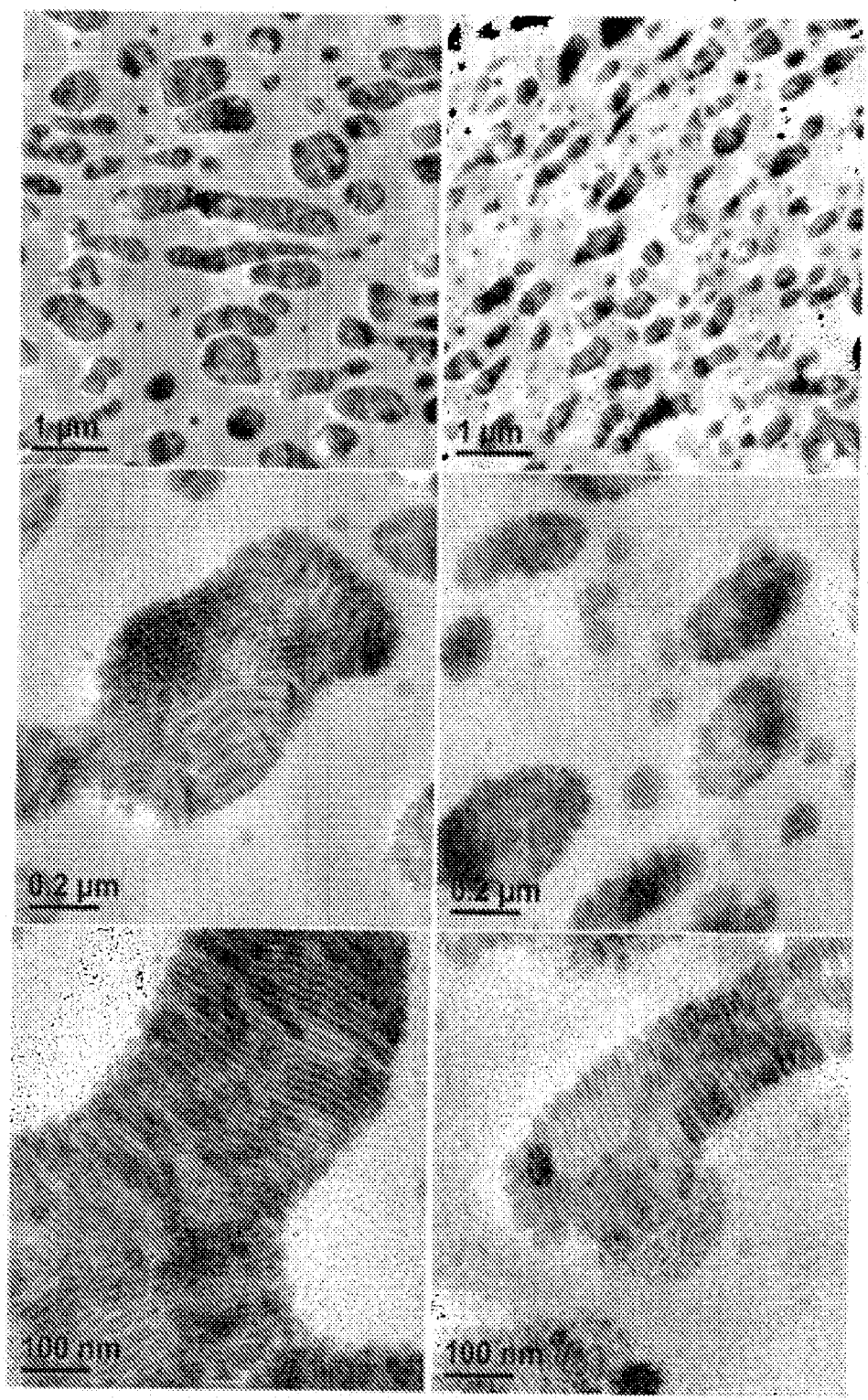
FIG. 34 shows TEM micrographs at the 1 µm, 0.2 µm, and 100 nm resolutions for comparative and inventive blends.

FIG. 34 compares the TEM micrographs at the 1 μm, 0.2 μm, and 100 nm resolutions for the comparative PP/SEBS blend and the inventive blend containing the additional FF1 diblock. The samples were stained with 2% aqueous ruthenium tetraoxide solution for 3 hrs at ambient temperature. It is evident that dispersion of the SEBS polymer improves with the addition of the inventive diblock. The micrograph of the inventive blend shows a finer dispersion and break-up of the SEBS particles similar to what was observed in a polypropylene impact copolymer containing ethylene-alpha olefin rubber.

Table 31 shows that the maximum dispersed particle size in the inventive blend was 0.65 μm and its size was reduced by 58% when compared to the comparative blend which shows a maximum dispersed particle size of 1.64 μm. Correspondingly, the mean average particle size of the dispersed SEBS phase was reduced by 49% from 0.43 μm to 0.22 μm when compared to the comparative blend.

Similar to the improvements in properties observed for the polypropylene impact copolymers containing the inventive diblock, it is expected that these compatibilized PP/SEBS blends will show an improvement in impact strength greater than 10%, improved clarity and reduced haze, and higher modulus than the comparative blend without the diblock compatibilizer.

TABLE 30

Formulations with SEBS

| Raw Material Description | SEBS 1C | SEBS 2 |
|---|---|---|
| H110N PP | 79.8 | 72.3 |
| Kraton ™ G1643M | 20.0 | 20.0 |
| FF1 | 0.0 | 7.5 |
| Irganox B225 | 0.20 | 0.20 |
| Total Weight % | 100.0 | 100.0 |

TABLE 31

Dispersed particle sizes

| Compositions | Min. (um) | Max. (um) | Mean (um) | Std. Dev. (um) |
|---|---|---|---|---|
| SEBS 1C | 0.05 | 1.64 | 0.43 | 0.24 |
| SEBS 2 | 0.06 | 0.65 | 0.22 | 0.13 |

*All dimensions reported as equivalent circular diameter of dispersed phases

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

We claim:

1. A formulated composition comprising:
    a) polypropylene;
    b) a compatibilizer; and,
    c) an elastomer
    wherein the composition exhibits an Izod strength in kJ/m² as measured by ASTM D256 or ISO180 at 0° C. or 23° C. that is at least 10% higher than that of the composition without (b); and exhibits a flexural modulus that is less than 10% reduced as compared to that of the composition without (b)
    wherein the compatibilizer comprises a block composite wherein the block composite comprises a soft copolymer, a hard polymer and a diblock copolymer having a soft segment and a hard segment, wherein the hard segment of the block copolymer is the same composition as the hard polymer in the block composite and the soft segment of the block copolymer is the same composition as the soft copolymer of the block composite; and wherein the block composite has an Mw/Mn of 1.7 to 3.5, the blocks of the diblock copolymers are joined end-to-end and the hard polymer comprises propylene units present in an amount greater than 90 mol percent.

2. The composition of claim 1 wherein (b) has a Tm>100° C. and the composition has a dispersed rubber weight average particle size of <1 µm.

3. The composition of claim 1 wherein (b) is a block composite having a Block Composite Index≥0.10.

4. The composition of claim 3 wherein the block composite comprises a diblock having an isotactic polypropylene block and an ethylene-propylene block.

5. The composition of claim 4 wherein the isotactic polypropylene block is present in an amount of 25 wt % to 75 wt % of the diblock.

6. The composition of claim 4 wherein the ethylene content of the ethylene-propylene block is 40 wt % to 85 wt %.

7. The composition of claim 3 wherein the block composite has a melt flow rate at 230° C. and 2.16 kg of 0.5 to 8 dg/min.

8. The composition of claim 1 wherein the block composite is present in an amount of 0.5 wt % to 20 wt % of the weight of the composition and the composition has a ductile to brittle transition temperature of at least 2° C. less as compared to the composition without (b).

9. The composition of claim 1 wherein the polypropylene is selected from the group consisting of low density polypropylene, high density polypropylene, high melt strength polypropylene, high impact polypropylene, isotactic polypropylene, syndiotactic polypropylene and combinations thereof.

10. An article comprising the composition of claim 1.

11. The composition of claim 1 wherein the elastomer is selected from the group consisting of ethylene/α-olefin random copolymers, ethylene/α-olefin block interpolymers, hydrogenated block copolymers and combinations thereof.

* * * * *